United States Patent
Yeap et al.

(10) Patent No.: US 9,231,928 B2
(45) Date of Patent: Jan. 5, 2016

(54) VALIDATION METHOD AND SYSTEM FOR USE IN SECURING NOMADIC ELECTRONIC TRANSACTIONS

(75) Inventors: Tet Hin Yeap, Ottawa (CA); William G. O'Brien, Nanalmo (CA); Sean MacLean Murray, Ottawa (CA)

(73) Assignee: BCE Inc., Montreal (CA)

( * ) Notice: Subject to any disclaimer, the term of this patent is extended or adjusted under 35 U.S.C. 154(b) by 540 days.

(21) Appl. No.: 13/140,656

(22) PCT Filed: Dec. 18, 2008

(86) PCT No.: PCT/CA2008/002224
§ 371 (c)(1),
(2), (4) Date: Jun. 17, 2011

(87) PCT Pub. No.: WO2010/069033
PCT Pub. Date: Jun. 24, 2010

(65) Prior Publication Data
US 2011/0246780 A1    Oct. 6, 2011

(51) Int. Cl.
*H04L 29/06* (2006.01)
*G06Q 20/02* (2012.01)
*G06Q 20/32* (2012.01)
(Continued)

(52) U.S. Cl.
CPC .......... *H04L 63/0492* (2013.01); *G06Q 20/02* (2013.01); *G06Q 20/32* (2013.01); *G06Q 20/3829* (2013.01); *G06Q 20/40* (2013.01); *G06Q 20/425* (2013.01); *H04L 9/3215* (2013.01); *H04L 9/3247* (2013.01); *H04L 9/3271* (2013.01); *H04L 63/0869* (2013.01); *H04L 63/18* (2013.01); *H04L 2209/56* (2013.01); *H04L 2209/805* (2013.01)

(58) Field of Classification Search
CPC .................................................. H04L 63/0492
See application file for complete search history.

(56) References Cited

U.S. PATENT DOCUMENTS 4,771,458 A    9/1988  Citta et al.
5,222,137 A    6/1993  Barrett et al.
(Continued)

FOREIGN PATENT DOCUMENTS

CA    2 290 170 C    6/2005
EP    1 626 363 A1   2/2006
(Continued)

OTHER PUBLICATIONS

Dominikus et al.; mCoupons: An Application for Near Field Communication (NFC); Published in: Advanced Information Networking and Applications Workshops, 2007, AINAW '07. 21st International Conference on (vol. 2 ); Date of Conference: May 21-23, 2007; pp. 421-428; IEEE Xplore.*

(Continued)

*Primary Examiner* — Bradley Holder
(74) *Attorney, Agent, or Firm* — Gowling Lafleur Henderson LLP

(57) ABSTRACT

A method involving a communication device, which comprises sending a request to a communication device; receiving a response from the communication device over a local communication path; deriving a received data set from said response; determining at least one data set that had been previously transmitted to the communication device over a wireless portion of a second communication path different from the local communication path; and validating the response based on the received data set and the at least one previously transmitted data set.

29 Claims, 31 Drawing Sheets

(51) Int. Cl.
*G06Q 20/38* (2012.01)
*G06Q 20/40* (2012.01)
*G06Q 20/42* (2012.01)
*H04L 9/32* (2006.01)

(56) References Cited

U.S. PATENT DOCUMENTS

| | | | |
|---|---|---|---|
| 5,491,750 A | 2/1996 | Bellare et al. | |
| 5,694,471 A | 12/1997 | Chen et al. | |
| 5,778,069 A | 7/1998 | Thomlinson et al. | |
| 5,805,702 A | 9/1998 | Curry et al. | |
| 5,822,430 A | 10/1998 | Doud | |
| 5,832,090 A | 11/1998 | Raspotnik | |
| 5,892,900 A | 4/1999 | Ginter et al. | |
| 5,966,082 A | 10/1999 | Cofino et al. | |
| 6,141,695 A | 10/2000 | Sekiguchi et al. | |
| 6,393,564 B1 | 5/2002 | Kanemitsu et al. | |
| 6,778,096 B1 | 8/2004 | Ward et al. | |
| 6,842,106 B2 | 1/2005 | Hughes et al. | |
| 6,950,522 B1 | 9/2005 | Mitchell et al. | |
| 6,981,151 B1 | 12/2005 | Groeneveld et al. | |
| 6,983,381 B2* | 1/2006 | Jerdonek | 726/5 |
| 7,000,114 B1 | 2/2006 | Hasebe et al. | |
| 7,178,169 B1 | 2/2007 | Salmonsen et al. | |
| 7,246,744 B2 | 7/2007 | O'Brien et al. | |
| 7,365,636 B2 | 4/2008 | Doi et al. | |
| 7,492,258 B1 | 2/2009 | Shoarinejad et al. | |
| 7,673,799 B2 | 3/2010 | Hart et al. | |
| 7,800,499 B2 | 9/2010 | Rehman | |
| 7,876,220 B2 | 1/2011 | Aldridge | |
| 7,895,437 B2* | 2/2011 | Ganesan et al. | 713/171 |
| 7,937,583 B2 | 5/2011 | Thornton et al. | |
| 7,941,663 B2 | 5/2011 | Sarikaya | |
| 7,953,974 B2 | 5/2011 | Yamamura et al. | |
| 8,074,889 B2 | 12/2011 | Beenau et al. | |
| 8,131,007 B2* | 3/2012 | Tewfik et al. | 382/100 |
| 8,214,642 B2* | 7/2012 | Baentsch et al. | 713/168 |
| 8,291,229 B2* | 10/2012 | Vuillaume et al. | 713/176 |
| 8,565,675 B2* | 10/2013 | Bangs et al. | 455/41.1 |
| 2002/0041683 A1 | 4/2002 | Hopkins et al. | |
| 2002/0087867 A1 | 7/2002 | Oberle et al. | |
| 2002/0095507 A1 | 7/2002 | Jerdonek | |
| 2002/0112174 A1 | 8/2002 | Yager et al. | |
| 2002/0147917 A1 | 10/2002 | Brickell | |
| 2002/0184509 A1 | 12/2002 | Scheidt et al. | |
| 2003/0120925 A1 | 6/2003 | Rose et al. | |
| 2003/0147536 A1* | 8/2003 | Andivahis et al. | 380/277 |
| 2003/0169885 A1 | 9/2003 | Rinaldi | |
| 2003/0182565 A1 | 9/2003 | Nakano et al. | |
| 2003/0204743 A1 | 10/2003 | Devadas et al. | |
| 2004/0066278 A1 | 4/2004 | Hughes et al. | |
| 2004/0181681 A1 | 9/2004 | Salisbury | |
| 2004/0252025 A1 | 12/2004 | Silverbrook et al. | |
| 2005/0123133 A1 | 6/2005 | Stewart et al. | |
| 2005/0154896 A1 | 7/2005 | Widman et al. | |
| 2005/0190892 A1 | 9/2005 | Dawson et al. | |
| 2006/0049256 A1 | 3/2006 | von Mueller et al. | |
| 2006/0069814 A1* | 3/2006 | Abraham et al. | 710/8 |
| 2006/0116899 A1 | 6/2006 | R. Lax et al. | |
| 2006/0124756 A1 | 6/2006 | Brown | |
| 2006/0235805 A1 | 10/2006 | Peng et al. | |
| 2006/0271386 A1 | 11/2006 | Bhella | |
| 2007/0008135 A1 | 1/2007 | Sajkowsky | |
| 2007/0022045 A1 | 1/2007 | Lapstun et al. | |
| 2007/0023508 A1 | 2/2007 | Brookner | |
| 2007/0057768 A1 | 3/2007 | Zeng et al. | |
| 2007/0085689 A1 | 4/2007 | Brommer et al. | |
| 2007/0095928 A1 | 5/2007 | Balinsky et al. | |
| 2007/0103274 A1 | 5/2007 | Berthold | |
| 2007/0104215 A1 | 5/2007 | Wang et al. | |
| 2007/0145135 A1* | 6/2007 | Jogand-Coulomb et al. | 235/451 |
| 2007/0145152 A1* | 6/2007 | Jogand-Coulomb et al. | 235/492 |
| 2007/0190939 A1* | 8/2007 | Abel | 455/41.2 |
| 2007/0194882 A1 | 8/2007 | Yokota et al. | |
| 2007/0198436 A1 | 8/2007 | Weiss | |
| 2007/0214474 A1 | 9/2007 | McClenny et al. | |
| 2007/0234058 A1 | 10/2007 | White | |
| 2007/0235539 A1* | 10/2007 | Sevanto et al. | 235/451 |
| 2007/0250707 A1* | 10/2007 | Noguchi | 713/164 |
| 2007/0255952 A1 | 11/2007 | Zhou | |
| 2007/0263560 A1* | 11/2007 | Saarisalo et al. | 370/328 |
| 2007/0277044 A1 | 11/2007 | Graf et al. | |
| 2008/0011835 A1 | 1/2008 | Kwon et al. | |
| 2008/0013807 A1 | 1/2008 | Bonalle et al. | |
| 2008/0061935 A1 | 3/2008 | Melendez et al. | |
| 2008/0065877 A1* | 3/2008 | Son et al. | 713/151 |
| 2008/0081608 A1* | 4/2008 | Findikli et al. | 455/425 |
| 2008/0090520 A1* | 4/2008 | Camp et al. | 455/41.2 |
| 2008/0090595 A1* | 4/2008 | Liu et al. | 455/461 |
| 2008/0092230 A1* | 4/2008 | Addy | 726/19 |
| 2008/0212771 A1* | 9/2008 | Hauser | 380/44 |
| 2008/0244271 A1 | 10/2008 | Yu | |
| 2008/0266055 A1 | 10/2008 | Turner et al. | |
| 2009/0044012 A1 | 2/2009 | Bishop et al. | |
| 2009/0046773 A1* | 2/2009 | Scherr | 375/238 |
| 2009/0048971 A1 | 2/2009 | Hathaway et al. | |
| 2009/0159666 A1 | 6/2009 | O'Brien et al. | |
| 2009/0160615 A1 | 6/2009 | O'Brien et al. | |
| 2009/0160649 A1 | 6/2009 | O'Brien et al. | |
| 2009/0161872 A1 | 6/2009 | O'Brien et al. | |
| 2009/0216679 A1 | 8/2009 | Yeap et al. | |
| 2009/0240946 A1 | 9/2009 | Yeap et al. | |
| 2010/0073147 A1 | 3/2010 | Guajardo Merchan et al. | |
| 2010/0135491 A1 | 6/2010 | Bhuyan | |
| 2010/0150342 A1 | 6/2010 | Richards et al. | |
| 2010/0185865 A1 | 7/2010 | Yeap et al. | |
| 2010/0205047 A1 | 8/2010 | Khoo | |
| 2011/0185180 A1 | 7/2011 | Gullberg | |
| 2011/0264907 A1 | 10/2011 | Betz et al. | |

FOREIGN PATENT DOCUMENTS

| | | | |
|---|---|---|---|
| EP | 1 708 468 A1 | 10/2006 | |
| EP | 1 941 698 B1 | 10/2011 | |
| WO | 99/43113 A1 | 8/1999 | |
| WO | 2006/024816 A2 | 3/2006 | |
| WO | 2006/039771 A1 | 4/2006 | |
| WO | 2007/038896 A2 | 4/2007 | |

OTHER PUBLICATIONS

Madlmayr; A mobile trusted computing architecture for a near field communication ecosystem; Published in: Proceeding iiWAS '08 Proceedings of the 10th International Conference on Information Integration and Web-based Applications & Services; Nov. 24-26, 2008; pp. 563-566; ACM Digital Library.*

Non-Final Office Action issued by the United States Patent and Trademark Office on Mar. 5, 2012 in connection with U.S. Appl. No. 12/343,268, 21 pages.

Final Office Action issued by the United States Patent and Trademark Office on Mar. 21, 2012 in connection with U.S. Appl. No. 12/314,455, 25 pages.

International Search Report issued by the Canadian Intellectual Property Office on Sep. 30, 2008 in connection with International Patent Application Serial No. PCT/CA2007/002343, 32 pages.

Written Opinion of the International Searching Authority issued by the Canadian Intellectual Property Office on Sep. 30, 2008 in connection with International Patent Application Serial No. PCT/CA20071002343, 8 pages.

3M, "3M Digital Materials Flow Management", Copyright © 2000, 3M IPC., 3M Library Systems, St. Paul, MN, U.S.A., www.3M.com/library, 2 pages.

Fred Niederman et al., "Examining RFID Applications in Supply Chain Management", Communications of the ACM, Jul. 2007, vol. 50, No. 7, pp. 93-101.

Redsky Network Discovery, "Real-Time Location Identification for IP Phones", © 2006 RedSky Technologies, Inc., Chicago, IL, U.S.A., www.redskyE911.com, 2 pages.

Smart Card Alliance Identity Council, "Contactless Smart Cards vs. EPC Gen 2 RFID Tags: Frequently Asked Questions", Jul. 2006, Smart Card Alliance © 2006, 6 pages.

(56) References Cited

OTHER PUBLICATIONS

Javed Sikander, "RFID Enabled Retail Supply Chain", Apr. 2005, © 2007 Microsoft Corporation, http://msdn2.microsoft.com/en-us/library/ms954628(d=printer).aspx, 21 pages.

Marcel Queisser et al., "Cataloging RFID Privacy and Security", Databases and Distributed Systems Group, Germany, as early as Apr. 18, 2007, 6 pages.

Tom Kevan, "Sorting out the RFID tag debate: read-only or read/write? Weigh all the elements carefully to get the right results—RFID/ADC", http://findarticles.com/p/articles/mi_m0DIS/is_12_4/ai_112366616/print, as early as Jan. 8, 2007, 2 pages.

International Search Report issued by the Canadian Intellectual Property Office on Feb. 17, 2009 in connection with International Patent Application Serial No. PCT/CA2008/002225, 3 pages.

Written Opinion of the International Searching Authority issued by the Canadian Intellectual Property Office on Feb. 17, 2009 in connection with International Patent Application Serial No. PCT/CA2008/002225, 6 pages.

International Search Report issued by the Canadian Intellectual Property Office on Aug. 20, 2009 in connection with International Patent Application Serial No. PCT/CA2008/002224, 3 pages.

Written Opinion of the International Searching Authority issued by the Canadian Intellectual Property Office on Aug. 20, 2009 in connection with International Patent Application Serial No. PCT/CA2008/002224, 6 pages.

International Search Report issued by the Canadian Intellectual Property Office on Aug. 31, 2009 in connection with International Patent Application Serial No. PCT/CA2008/002226, 3 pages.

Written Opinion of the International Searching Authority issued by the Canadian Intellectual Property Office on Aug. 31, 2009 in connection with International Patent Application Serial No. PCT/CA2008/002226, 5 pages.

Non-Final Office Action issued by the United States Patent and Trademark Office on Oct. 15, 2009 in connection with U.S. Appl. No. 12/314,458, 6 pages.

European Search Report issued by the European Patent Office and completed on Feb. 26, 2010 in connection with European Patent Application Serial No. 09 180 219.9, 10 pages.

Zhou Wang et al., "Cooperation Enhancement for Message Transmission in VANETs", Wireless Personal Communications, Kluwer Academic Publishers, DO, vol. 43, No. 1, Dec. 20, 2006, iSSN: 1572-834X, pp. 141-156.

Final Office Action issued by the United States Patent and Trademark Office on Apr. 5, 2010 in connection with U.S. Appl. No. 12/314,458, 4 pages.

Final Office Action issued by the United States Patent and Trademark Office on Oct. 19, 2010 in connection with U.S. Appl. No. 12/873,623, 6 pages.

Non-Final Office Action issued by the United States Patent and Trademark Office on Apr. 5, 2011 in connection with U.S. Appl. No. 12/314,457, 17 pages.

Notice of Allowance issued by the United States Patent and Trademark Office on Sep. 20, 2011 in connection with U.S. Appl. No. 12/314,457, 11 pages.

Non-Final Office Action issued by the United States Patent and Trademark Office on Dec. 1, 2011 in connection with U.S. Appl. No. 12/314,456, 27 pages.

Non-Final Office Action issued by the United States Patent and Trademark Office on Dec. 1, 2011 in connection with U.S. Appl. No. 12/314,455, 25 pages.

Non-Final Office Action issued by the United States Patent and Trademark Office on Dec. 16, 2011 in connection with U.S. Appl. No. 12/343,187, 15 pages.

Non-Final Office Action issued by the United States Patent and Trademark Office on Feb. 8, 2012 in connection with U.S. Appl. No. 12/643,225, 18 pages.

Extended European Search Report issued by the European Patent Office on Nov. 28, 2011 in connection with European Patent Application Serial No. 07855623.0, 11 pages.

Extended European Search Report issued by the European Patent Office on Jan. 23, 2012 in connection with European Patent Application Serial No. 08865340.7, 6 pages.

Final Office Action issued by the United States Patent and Trademark Office on Jul. 6, 2012 in connection with U.S. Appl. No. 12/314,456, 20 pages.

Final Office Action issued by the United States Patent and Trademark Office on Aug. 6, 2012 in connection with U.S. Appl. No. 12/343,268, 27 pages.

Final Office Action issued by the United States Patent and Trademark Office on Sep. 4, 2012 in connection with U.S. Appl. No. 12/343,187, 17 pages.

Final Office Action issued by the United States Patent and Trademark Office on Sep. 13, 2012 in connection with U.S. Appl. No. 12/643,225, 24 pages.

Examiner's Report (i.e., Office Action) issued by the Canadian Intellectual Property Office on Jul. 20, 2012 in connection with Canadian Patent Application Serial No. 2,689,824, 2 pages.

Non-Final Office Action issued by the United States Patent and Trademark Office on Nov. 9, 2012 in connection with U.S. Appl. No. 13/001,013, 23 pages.

Notice of Allowance and Fee(s) Due issued by the United States Patent and Trademark Office on Dec. 3, 2012 in connection with U.S. Appl. No. 12/343,268, 9 pages.

Non-Final Office Action issued by the United States Patent and Trademark Office on Dec. 19, 2012 in connection with U.S. Appl. No. 12/314,456, 17 pages.

Non-Final Office Action issued by the United States Patent and Trademark Office on Dec. 17, 2013 in connection with U.S. Appl. No. 12/314,456, 19 pages.

Office Action mailed on Jun. 11, 2014 in connection with U.S. Appl. No. 13/957,903, 19 pages.

Examiner's Report issued on Jul. 15, 2014 in connection with Canadian Patent Application 2,747,553, 4 pages.

\* cited by examiner

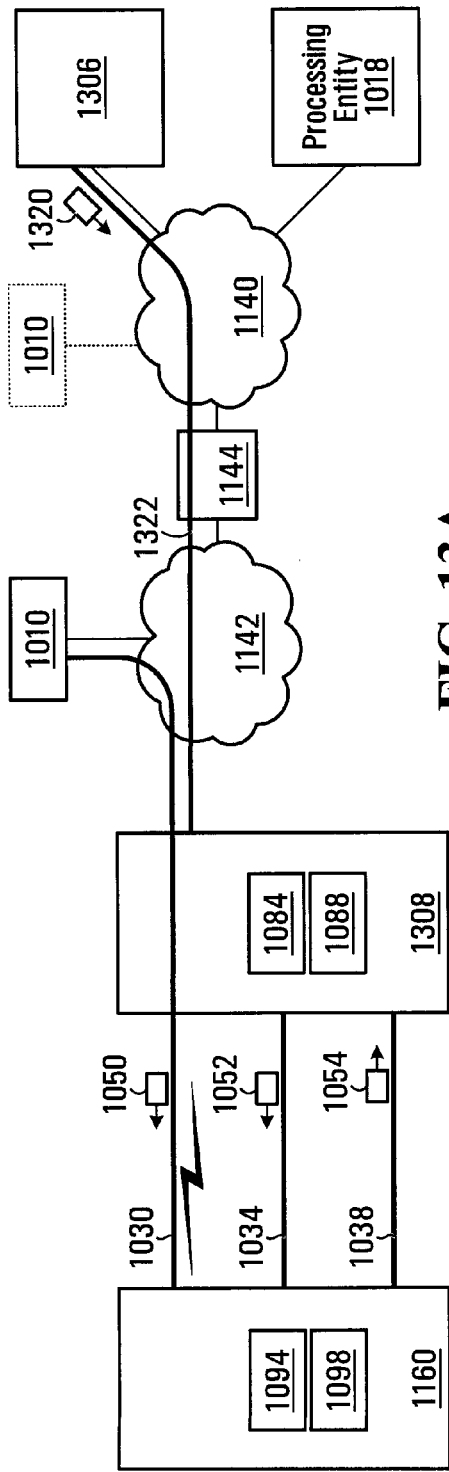
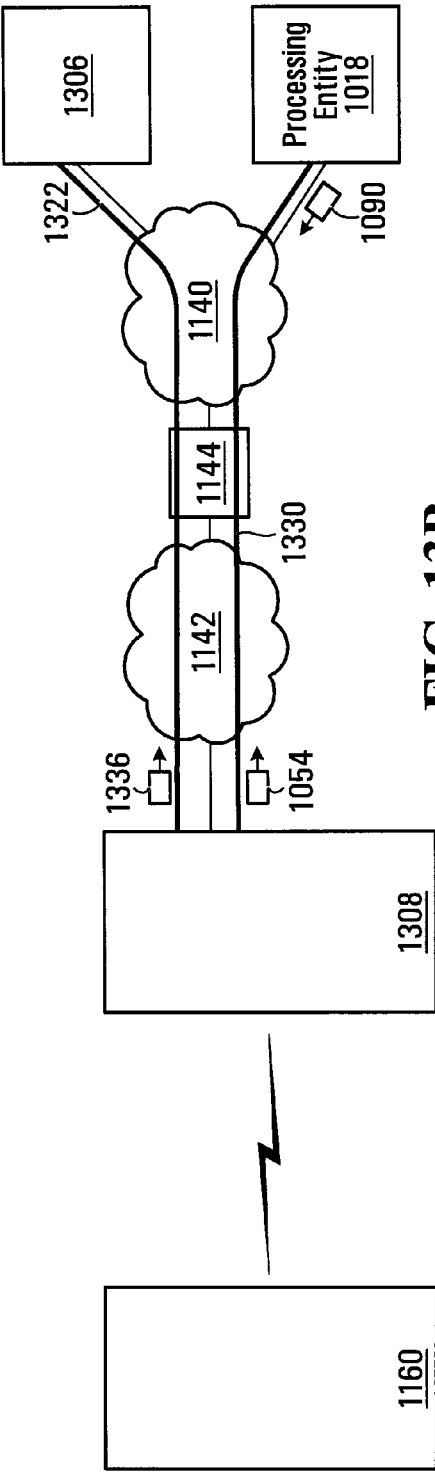
FIG. 13A
FIG. 13B

VALIDATION METHOD AND SYSTEM FOR USE IN SECURING NOMADIC ELECTRONIC TRANSACTIONS

FIELD OF THE INVENTION

The present invention relates generally to electronic transactions and, in particular, to methods and systems for improving the security of electronic transactions attempted using a variety of devices and over a wide range of locations.

BACKGROUND

Electronic transactions are those that are approved or denied based on the exchange of electronic information. However, such information can be fraudulently obtained, duplicated and used to the benefit of the fraudster. For example, purchases made over the Internet can often be completed successfully simply by providing the number of a valid credit card account and corresponding account information (such as a billing address of the legitimate account holder). If the purchase involves goods that can be shipped and collected before the legitimate account holder realizes what has transpired, then fraud will have taken place. Similarly, on-site purchases can be made using debit or credit cards that have been cloned from their originals. In the case of cards requiring a Personal Identification Number (PIN), such information is also sometimes not difficult to obtain. Thus, fraudsters have ample opportunity to purchase goods or withdraw cash before fraud will be noticed and declared by the legitimate account holder.

Aside from user inconvenience, one of the main commercial issues with fraud committed in these and other circumstances is the cost to the transaction guarantor, who typically has a policy of reimbursing the legitimate account holder for the financial loss that occurred between the first fraudulent transaction and the time when fraud was reported. This can amount to millions, if not billions, of dollars annually in reimbursements by financial institutions throughout the world. Also, certain merchants who have the misfortune of being the vehicle of fraudulent activity may be blacklisted by various financial institutions and may therefore lose out on many important future transactions.

One commonality in the above scenarios that facilitates the act of fraud is the lack of transaction validation. That is to say, very little can be done by a financial institution to ensure that the account information presented by a prospective purchaser is authentic and has been issued to him or her. Aside from verifying whether a card associated with the account information has been reported lost or stolen and checking transaction limits and patterns, the financial institution is at the mercy of the merchant to perform additional inspection of names, signatures, holograms and the like. However, these measures tend to be inconsistently applied by various merchants, if they are applied at all. In an Internet commerce context, an electronic merchant may request a comparison between the geographic location of the would-be purchaser and certain authorized locations associated with the account information. However, such measures have little effect when the account holder has authorized nomadic transactions, i.e., transactions that have the potential to be made from multiple candidate locations. As such, it may be impossible to tell if a purchase being attempted from, e.g., a mobile hotspot, is being made by the legitimate account holder or a fraudster.

Against this background, there is a need in the industry for an improved transaction validation paradigm.

SUMMARY OF THE INVENTION

The inventors have recognized that a communication device with two communication paths can be used to enhance the security of nomadic electronic transactions. One communication path is used to receive validation information for validation of electronic transactions, while the other communication path is used to release responses to requests, where the responses include the validation information.

Therefore, in a first aspect, the present invention seeks to provide a method involving a communication device, comprising: sending a request to a communication device; receiving a response from the communication device over a local communication path; deriving a received data set from said response; determining at least one data set that had been previously transmitted to the communication device over a second communication path different from the local communication path; and validating the response based on the received data set and the at least one previously transmitted data set.

In a second aspect, the present invention seeks to provide a method of validating a response received from a communication device over a local communication path, the response having been sent by the communication device in response to a request sent thereto. The method comprises: deriving a received data set from the response; determining at least one data set that had been previously transmitted to the communication device over a second communication path different from the local communication path; and validating the response based on the received data set and the at least one previously transmitted data set.

In a third aspect, the present invention seeks to provide a computer-readable storage medium comprising a set of instructions for execution by a processing entity, wherein execution of the set of instructions by the processing entity causes the processing entity to execute a method of validating a response received from a communication device over a local communication path, the response having been sent by the communication device in response to a request sent thereto, the method comprising: deriving a received data set from the response; determining at least one data set that had been previously transmitted to the communication device over a second communication path different from the local communication path; and validating the response based on the received data set and the at least one previously transmitted data set.

In a fourth aspect, the present invention seeks to provide a system, comprising: a control server configured to generate at least one particular data set for transmission to a particular communication device over a first communication path; transmit/receive equipment configured to send a request to a detected communication device over a local communication path different from the first communication path and to obtain a response from the detected communication device over the local communication path; and a processing entity communicatively coupled to the transmit/receive equipment and to the control server, the processing entity configured to derive a received data set from the response; wherein upon identifying the detected communication device as the particular communication device, the processing entity is configured to validate the response based on the received data set and the at least one particular data set.

BRIEF DESCRIPTION OF THE DRAWINGS

In the accompanying drawings:

FIG. 13A illustrates further detail added to FIG. 11, for the case where an additional communication path is established between the communication device and system-side equipment leading to a processing entity, for the case where the transaction takes place over a data network.

FIGS. 13B and 13C illustrate interaction between the processing entity and the control server in the architecture of FIG. 13A, in accordance with two non-limiting implementations.

It is to be expressly understood that the description and drawings are only for the purpose of illustration of certain embodiments of the invention and are an aid for understanding. They are not intended to be a definition of the limits of the invention.

DETAILED DESCRIPTION

Figure 1:
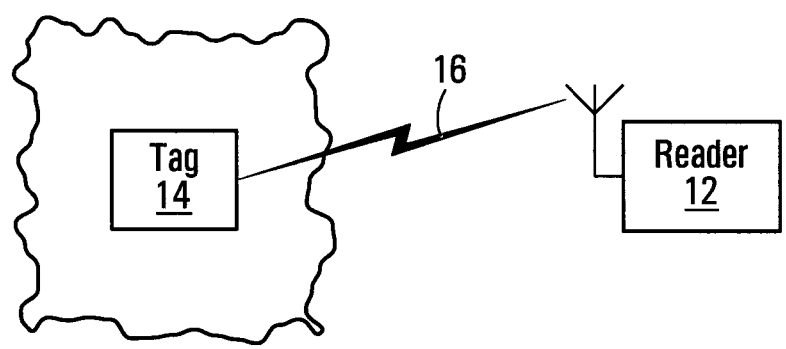
FIG. 1 is a block diagram of a system comprising a reader and a tag, in accordance with a non-limiting embodiment of the present invention.

With reference to FIG. 1, there is shown a system comprising a reader 12 and a tag 14. Communication between the reader 12 and the tag 14 occurs over a contact-less medium 16. In a specific non-limiting embodiment, the contact-less medium 16 is a wireless medium that may include a spectrum of radio frequencies. Depending on the application at hand, the tag 14 could be affixed to: an item for sale, goods during transportation, a person's clothing, an animal, a piece of equipment (including communications equipment such as wireless communications equipment) and so on. For its part, the reader 12 can be fixed or mobile. In the fixed scenario, the reader 12 could be located at any desired position within a building, vehicle, warehouse, campus, etc. In the mobile scenario, the reader 12 could be implemented in a handheld or portable unit, for example.

Figure 2:
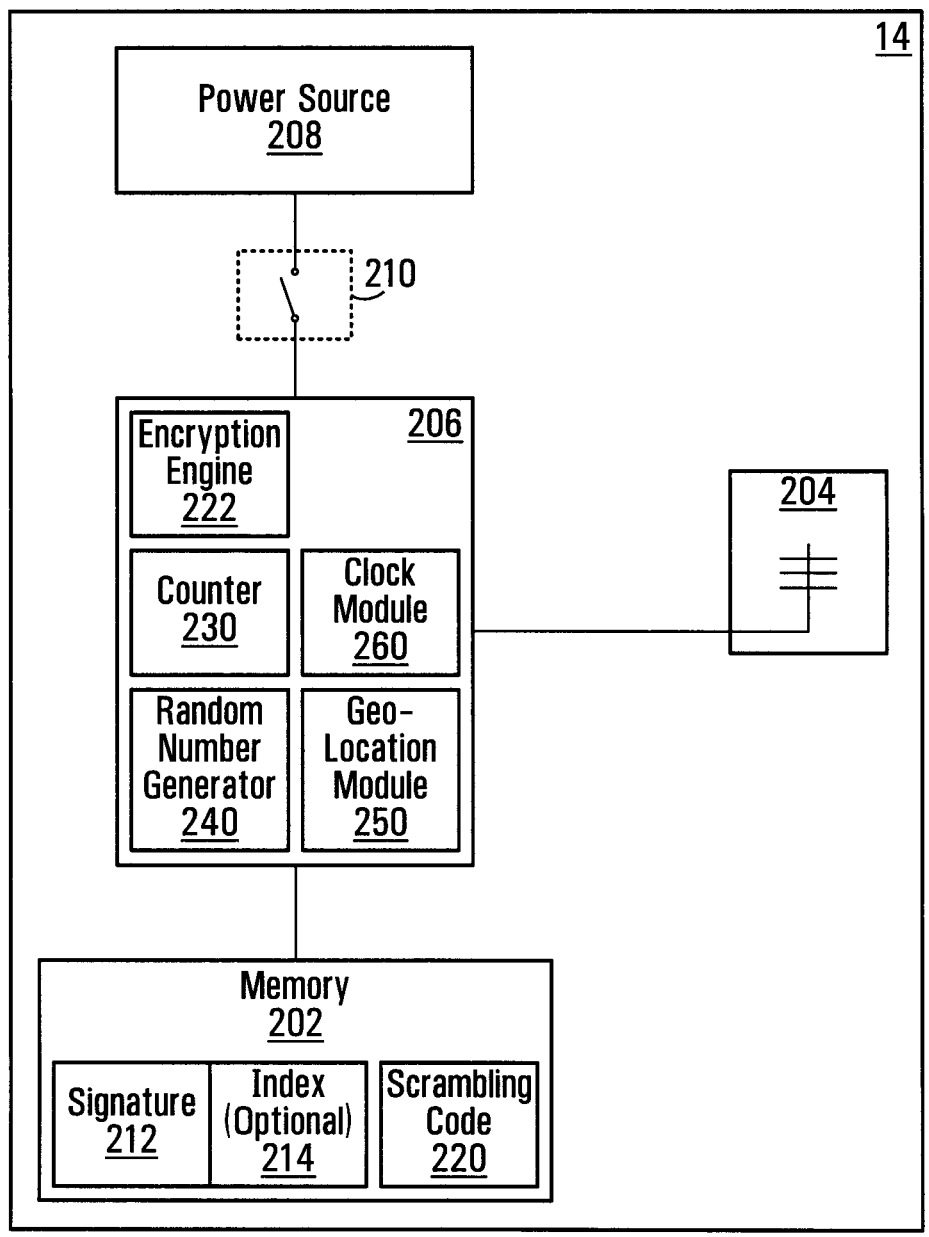
FIG. 2 is a block diagram showing details of the tag, in accordance with a non-limiting embodiment of the present invention.

FIG. 2 shows details of the tag 14, in accordance with a specific non-limiting embodiment of the present invention. The tag 14 comprises a memory 202, a transceiver 204 (including an antenna), a controller 206 and a power source 208.

The memory 202 stores a current signature 212. In addition, the memory 202 may store a program for execution by the controller 206, including computer-readable program code for causing the controller 206 to execute various steps and achieve wide-ranging functionality. In a non-limiting embodiment, the current signature 212 can take the form of a bit pattern having a certain number of bits. In accordance with an embodiment of the present invention, the bit pattern exhibited by the current signature 212 is dynamic, that is to say the current signature 212 changes over time.

The controller 206 executes various functions that allow communication to take place via the transceiver 204 between the tag 14 and an external reader such as the reader 12. In what follows, communications will hereinafter be referred to as occurring with the reader 12 although it will be appreciated that the tag 14 may communicate similarly with other external readers that it encounters.

As part of its functionality, the controller 206 is operative to retrieve the current signature 212 from the memory 202 and to release the current signature 212 via the transceiver 204. Alternatively, depending on the computational capabilities of the controller 206, the controller 206 can be operative to compute the current signature 212 on demand and to release via the transceiver 204 the current signature 212 so computed.

It is recalled that in this embodiment, the current signature 212 is dynamic. Accordingly, the controller 206 is operative to communicate with the memory 202 in order to change the bit pattern of the current signature 212 stored in the memory 202. This can be achieved by executing diverse functionality that will be described in greater detail later on, and which may include implementing functional elements such as an encryption engine 222, a counter 230, a pseudo-random number generator 240, a geo-location module 250 and a clock module 260, among others.

The configuration of the power source 208 and its interrelationship with the controller 206 depend on whether the tag 14 is categorized as "passive", "active" or somewhere in between. Specifically, the tag 14 may be designed as "passive", whereby transmissions of the current signature 212 via the transceiver 204 are effected in response to detection of a burst of energy via the transceiver 204, such burst of energy typically coming from the reader 12 issuing a "read request". In this case, the controller 206 only needs to be powered during the short time period following the detection of the burst. In fact, the burst itself can charge the power source 208 for a brief period, enough to allow the controller 206 to cause transmission of the current signature 212 via the transceiver 204 in response to the read request. The current signature 212 may be extracted from the memory 202 or it may be generated on demand, upon receipt of the read request.

Alternatively, in some embodiments of an "active" tag, transmissions of the current signature 212 via the transceiver 204 are similarly effected in response to detection of a read request via the transceiver 204. In this case, the availability of the power source 208 allows the controller 206 to transmit the current signature 212 at a longer range than for passive devices. Certain active tags also have the capability to switch into a passive mode of operation upon depletion of the power source 208. In other embodiments of an active tag, transmissions of the current signature 212 are effected via the transceiver 204 at instances or intervals that are controlled by the controller 206. This can be referred to as autonomous (or unsolicited) issuance of the current signature 212. To this end, the controller 206 needs to be continuously powered from the power source 208.

Active and passive tags may have other features that will be known to those of skill in the art.

In still other cases, the power source 208 (either continually storing a charge or accumulating a sensed charge) can be connected to the controller 206 via a switch 210, which is optional. The switch 210 can be toggled between a first state during which an electrical connection is established between the power source 208 and the controller 206, and a second state during which this electrical connection is broken. The switch 210 is biased in the second state, and can be placed into the first state. Toggling into the first state can be achieved by a burst of energy that is sensed at a sensor (not shown) or by use of an activation element. In various non-limiting embodiments, the activation element may be a touch-sensitive pad on a surface of the tag 14, or a mechanical component (e.g., a button). Placing the switch 210 into the first state may also trigger the controller 260 to change the current signature 212 in the memory 202.

Figure 3:
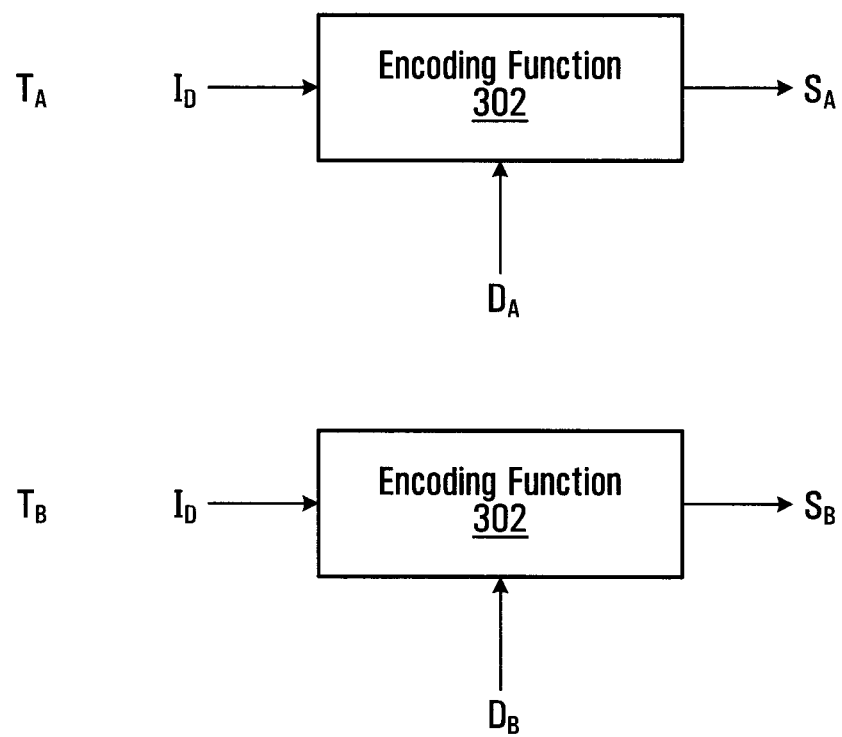
FIG. 3 illustrates a decoding function implemented by a controller in the tag, for generation of a signature at two points in time.

With reference now to FIG. 3, there is shown conceptually how the current signature 212 stored in the memory 202 may change over time. Specifically, different versions of the current signature 212 (denoted $S_A$ and $S_B$) are generated by an encoding function 302 implemented by the controller 206. For notational convenience, the current signature 212 is used to denote which of the two signatures $S_A$, $S_B$ is currently stored in the memory 202. The encoding function 302 generates the signatures $S_A$ and $S_B$ by encoding a common "identifier" (denoted $I_D$) with a respective "additional data set" (denoted $D_A$ and $D_B$) at respective time instants (denoted $T_A$ and $T_B$). Thus, at $T_A$, the signature $S_A$ is generated by encoding the identifier $I_D$ with the additional data set $D_A$, whereas at $T_B$, the signature $S_B$ is generated by encoding the identifier $I_D$ with the additional data set $D_B$. While in this example, two time instants are shown and described, this is solely for simplicity, and it should be understood that in actuality, the current signature 212 may change many times.

The identifier $I_D$ is constant, and in one embodiment conveys information about the item, animal, vehicle, piece of equipment, etc., to which the tag 14 is affixed. Examples of such information include, without limitation: a serial number, a universal product code (UPC), a vehicle registration number (VIN) and a customized identifier. In another embodiment, the identifier $I_D$ conveys information about an expected user of the vehicle, clothing or mobile communication device, computer, restricted access area, network, etc., to which the tag 14 is affixed. Examples of such information include, without limitation: a name, an ID number, a driver's license number, an account number and login credentials.

In accordance with a non-limiting embodiment of the present invention, the additional data sets $D_A$ and $D_B$ are different, which makes both signatures $S_A$, $S_B$ different. In fact, the two signatures $S_A$, $S_B$ will appear scrambled relative to one another due to use of the encryption engine 222 within the encoding function 302. More specifically, the signatures $S_A$ and $S_B$ can be generated from the additional data sets $D_A$ and $D_B$ in a variety of ways, two of which will be described herein below.

First Approach

Figure 4A:
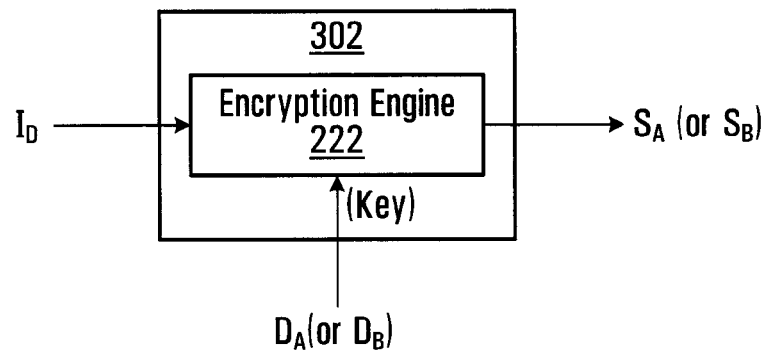
FIGS. 4A and 4B depict two possible functional architectures for generation of a signature.

In a first approach, described with reference to FIG. 4A, the identifier $I_D$ is encrypted by the encryption engine 222 with a dynamic key—represented by the additional data sets $D_A$, $D_B$ themselves, resulting in the two signatures $S_A$, $S_B$. The two signatures $S_A$, $S_B$ will be different because the additional data sets $D_A$, $D_B$ are different. In fact, they will appear scrambled relative to one another when observed by someone who has not applied a decryption process using a counterpart to the keys used by the encryption engine 222.

It will be noted that in order to make the first approach practical, the reader 12 needs to have knowledge of which key (i.e., which of the additional data sets $D_A$, $D_B$) was used for encryption of a received one of the signatures $S_A$, $S_B$, in order to effect proper decryption and recover the identifier $I_D$. For this purpose, in order to assist the reader 12 in identifying the correct key to be used for decryption, and with reference again to FIG. 2, the current signature 212 may be accompanied by an index 214 also stored in the memory 202. The index 214 may point the reader 12 to the correct key to be used. The reader 12 may have access to a key database (not shown) for this purpose.

For example, consider the case where the keys (in this case, the additional data sets $D_A$, $D_B$) correspond to outputs of the pseudo-random number generator 240 having a seed known a priori to the tag 14 and to the reader 12. Here, at $T_A$, the index 214 may indicate the sequential position in the output of the pseudo-random number generator 240 that corresponds to the additional data set $D_A$, while at $T_B$, the index 214 may indicate the sequential position in the output of the pseudo-random number generator 240 that corresponds to the additional data set $D_B$. The reader 12 can then easily find the value occupying the correct sequential position in the output of an identical local pseudo-random number generator and effect successful decryption of the received signature ($S_A$ or $S_B$).

Alternatively, the keys (in this case, the additional data sets $D_A$, $D_B$) are provided by the reader 12. This can be done where the reader 12 (or an entity associated therewith) decides that a change in the current signature 212 is required. As a variant, the reader 12 may issue a trigger which, when received by the controller 206, causes the controller 206 to effect a change in the current signature 212. In such cases, changes to the key (and thus to the current signature 212) are effected by the controller 206 in response to triggers received from the reader 12.

Second Approach

Figure 4B:
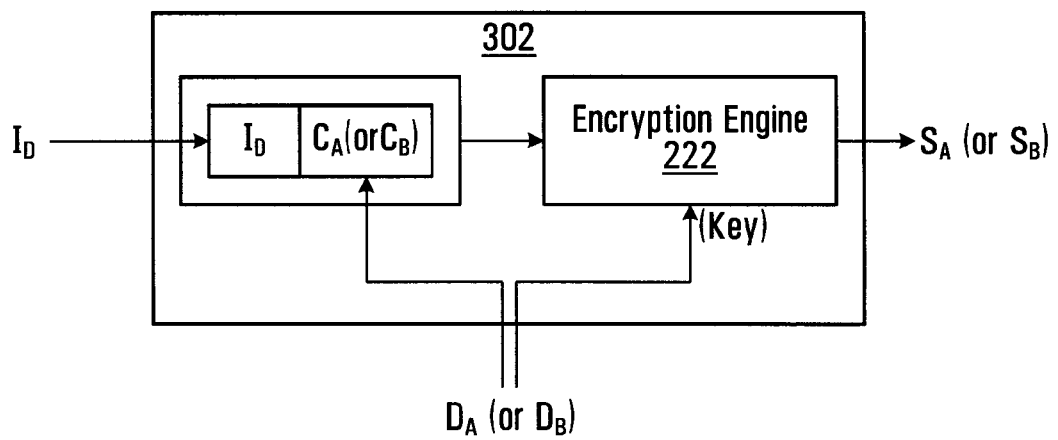

For other applications, the approach of FIG. 4B may be useful. Here, the identifier $I_D$ is augmented with differing scrambling codes (denoted $C_A$ and $C_B$), and then encrypted by the encryption engine 222 with a common key (denoted K), thus producing the two signatures $S_A$, $S_B$. The "additional data set" $D_A$ used for encryption at $T_A$ is therefore composed of the key K and the scrambling code $C_A$, while the "additional data set" $D_B$ used for encryption at $T_B$ is composed of the same key K and the scrambling code $C_B$. The encryption process can be designed so that small differences (in terms of the number of bits where there is a difference) between the scrambling codes $C_A$ and $C_B$ will cause large differences (in terms of the number of bits where there is a difference) in the resultant signatures $S_A$ and $S_B$. Thus, the scrambling codes $C_A$, $C_B$ have the effect of scrambling (i.e., randomizing) the resultant signatures $S_A$, $S_B$.

The controller 206 is responsible for determining which scrambling code is to be used to generate a particular signature at a particular time instant. The current version of the scrambling code can be stored in the memory 202 and is denoted 220 for convenience. It will be appreciated based on the above description that the scrambling code $C_A$ corresponds to the current scrambling code 220 at $T_A$ and that the scrambling code $C_B$ corresponds to the current scrambling code 220 at $T_B$.

Continuing with the second approach, several classes of embodiments are contemplated for changing the current scrambling code 220. In a first class of embodiments relevant to the approach of FIG. 4B, the current scrambling code 220 is changed in a way that can be predicted by the reader 12, that is to say, where the reader 12 (or an entity associated therewith) has knowledge of how each successive scrambling code is generated.

For example, the current scrambling code 220 can be changed each time (or, generally, each $N^{th}$ time where N≥1) that the controller 206 receives a read request or releases the current signature 212 in response to a read request. This can ensure that the current signature 212 is different each $N^{th}$ time that the controller 206 receives a read request. Alternatively, the current scrambling code 220 is changed every the current scrambling code 220 can be changed every set period of time (ex. every N seconds, minutes, hours, days, etc.). The variations in the current scrambling code 220 may governed in a variety of ways that are predictable to the reader 12. For example, the controller 206 may implement a counter 230, whose output is incremented (by a step size that can equal unity or can be negative, for example) after each $N^{th}$ time that the controller 206 responds to a read request received from a nearby reader (or each N seconds, etc.). If the current scrambling code 220 is set to correspond to the current output of the counter 230, then the scrambling codes $C_A$, $C_B$ used to generate the two signatures $S_A$, $S_B$ will differ by the step size.

Alternatively, the controller 206 may implement the aforesaid pseudo-random number generator 240, which produces an output that depends on one or more previous values of the output and on a seed. If the current scrambling code 220 is set to correspond to the current output of the pseudo-random number generator 240, then the scrambling codes $C_A$, $C_B$ used to generate the two signatures $S_A$, $S_B$ will differ in accordance with the characteristics of the pseudo-random number generator 240.

Other variants will become apparent to those of skill in the art without departing from the scope of the present invention.

In a second class of embodiments relevant to the approach of FIG. 4B, the additional data sets $D_A$, $D_B$ are not only predicted by the reader 12 but are actually controlled by the reader 12. This can be useful where the reader 12 (or an entity associated therewith) decides that a change in the current signature 212 is required. Alternatively, and recognizing that the key K is common to both of the additional data sets $D_A$, $D_B$, the reader 12 could supply the unique portions of the additional data sets $D_A$, $D_B$, namely the scrambling codes $C_A$, $C_B$.

As a variant, the reader 12 may simply issue a trigger which, when received by the controller 206, causes the controller 206 to effect a change in the current signature 212. In such cases, changes to the current signature 212 are effected by the controller 206 in response to triggers received from the reader 12.

In a third class of embodiments relevant to the approach of FIG. 4B, it may be desired to change the signatures $S_A$, $S_B$ in a stochastic way, that is to say, without the need to follow an underlying pattern that could be predicted by the reader 12.

For example, the controller 206 may implement the aforementioned geo-location module 250, which is configured to output a current spatial position of the tag 14 or of an item or person to which it is affixed. If the current scrambling code 220 is set to correspond to the current output of the geo-location module 250, then the scrambling codes $C_A$, $C_B$ used to generate the two signatures $S_A$, $S_B$ will differ in a stochastic fashion.

Alternatively, the controller 206 may implement a clock module 260, which is configured to determine a current time. If the current scrambling code 220 is set to correspond to a value measured by the clock module 260 (e.g., number of milliseconds elapsed since midnight of the day before), then the scrambling codes $C_A$, $C_B$ used to generate the two signatures $S_A$, $S_B$ will differ in a stochastic fashion.

Figure 5:
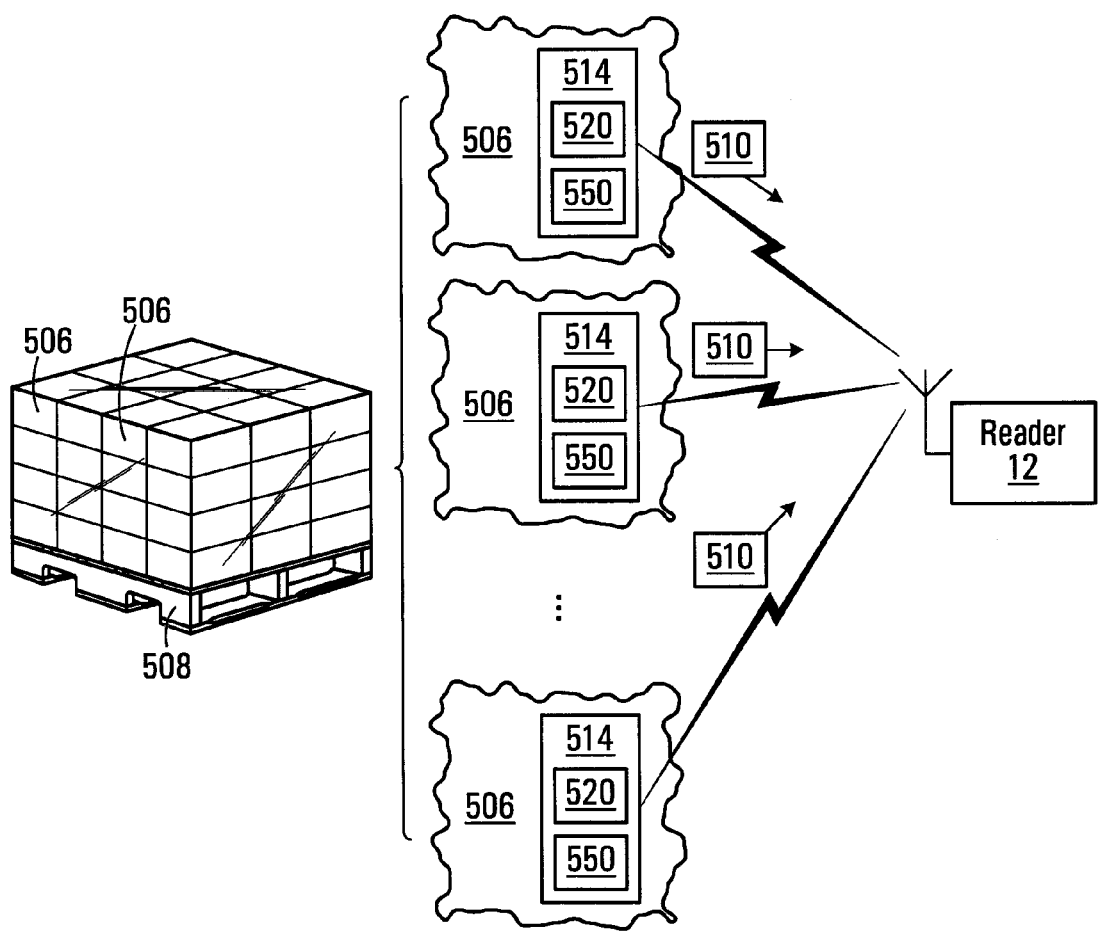
FIG. 5 illustrates application of an embodiment of the present invention in an inventory management context.

While the above embodiments have focused on temporal variations in the current signature 212 stored in the memory 202 of the tag 14, it is also within the scope of the present invention for the current signature 212 stored in the memory 202 of two different tags to be different at a common time instant (e.g., at a time when the tags are being read in bulk). This can be referred to as spatial scrambling. More particularly, with reference to FIG. 5, a plurality of tags 514 are affixed to a number of units 506 of a particular article. The units 506 may be arranged on a pallet 508, on a shelf or in a container, for example. To take a simple non-limiting example, the article in question can be a pair of denim jeans of a certain brand, size, style and color. Of course, the article could be any other item of which multiple units are available, such as a consumer product, food product, vehicle, etc. Other possibilities that may appear to one of skill in the art are within the scope of the present invention.

The tags 514 store respective signatures 510 that are each derived by encrypting an identifier 550 (common to the tags 514) and a respective one of a plurality of current scrambling codes 520 (different for the various tags 514) with a common key. The common identifier 550 can be used to identify the article in question (in this case, a pair of jeans of a particular brand, size, style, color, etc.). To ensure that the signatures 510 appear scrambled while nevertheless encrypting the common identifier 550, approaches such as the following may be taken.

In one non-limiting approach, a centralized entity generates unique current scrambling codes 520 and unique signatures 510 for each of the tags 514. The tags 514 are pre-loaded with their respective unique signatures 510 before being affixed to the units 506. In this approach, the unique signatures 510 are fixed, as a result of which the tags 514 can be greatly simplified since they do not need to perform any processing functions. Practically speaking, this allows a distributor to purchase a plurality of tags 514 that have been pre-loaded with unique signatures 510 in order to securely identify the units 506 of a particular article.

In another non-limiting approach, the tags 514 may each operate a respective clock module which, though structurally identical, may output different results, due to differences in oscillation characteristics (e.g., the oscillation crystals used, etc.) This will result in differences between the current scrambling code produced based on an output of the clock module of one of the tags 514 and the current scrambling code produced based on an output of the clock module of another one of the tags 514, albeit at the same time instant.

In yet another non-limiting approach, different current scrambling codes 520 can be produced as a result of the tags 514 each operating a respective pseudo-random number generator using a different seed, which could be pre-loaded by the above mentioned centralized entity.

Still other ways of making the current scrambling codes 520 different among the various tags 514 are within the scope of the present invention.

It is noted that the signatures 510 will tend to be widely varying even if the differences in the current scrambling codes 520 used to generate them are small, this effect being due to application of an encryption process, even when a common key is used. In fact, to an observer not equipped with the complementary key for decryption (which may be the same as the common key in a symmetric encryption scenario), the signatures 510 corresponding to the various units 506 on the pallet 508 will appear scrambled. This provides protection against external observers (e.g., thieves, corporate intelligence investigators) who may have gathered knowledge of signatures output by one or more units of the article in the past (e.g., from a previous purchase—or knowledge of a previous shipment—of the same brand, size, style and color of jeans) and are now on the lookout for the presence of units of the same article on the pallet 508. On the other hand, by using the appropriate key in order to decrypt any of the signatures 510, then no matter how diverse one such signature is from another, the common identifier 550 will be revealed alongside a stochastically derived scrambling code.

In order to allow the reader 12 to identify the appropriate key for decryption, each of the signatures 510 may be accompanied by the aforesaid index 214 stored in the memory 202. The index 214 may point the reader 12 to the correct key for decryption. For example, the index 214 could be a piece of public information such as a manufacturer identification code or a product category, such information being common to the units 506 but sufficiently generic to be of little value to an outside observer. This will allow the reader 12 (or an entity associated therewith) to select the correct key for decryption by accessing a table of keys (not shown) on the basis of the index. Such an approach can be useful to accelerate the decryption process and reduce the incidence of false positives (successful but inadvertent decryption of the wrong identifier) when multiple keys are potentially available to the reader 12.

It should also be appreciated that the signatures 510 on the various tags 514 can, in addition, be designed to change in a dynamic fashion (as described earlier), thus providing, in addition to spatial scrambling of the signatures 510, temporal scrambling of the signatures 510 that leads to even greater security vis-à-vis external observation.

In view of the foregoing, it should thus be appreciated that a common identifier, which is encoded within a plurality of signatures that vary over space (for multiple tags) and/or time (for the same tag), can be extracted by the reader 12 (or an entity associated therewith) by utilizing the appropriate key for decryption. This allows the reader 12 (or an entity associated therewith) to perform (I) validation of the identifier based on the signature and/or the scrambling code; and/or (II) an action related to identification, based on the identifier.

Both of these scenarios, which are not mutually exclusive, are now described in some detail.

In scenario (I), a dynamic scrambling code is used in the generation of a signature that continually encodes the same identifier, and it is of interest to recover the current scrambling code to detect a potential instance of tag cloning. Accordingly, with reference to FIG. 6A, there is shown a system that is similar to the system of FIG. 1. In addition, the system of FIG. 6A comprises a processing entity 610 that implements a validation operation, as will be described herein below. In various embodiments, the processing entity 610 referred to above may be connected to the reader 12, or it may be a remote entity. Such a remote entity may be reachable over a network, or it may be integrated with the reader 12. The system of FIG. 6A also includes a storage entity, such as a database 602, that is accessible to the processing entity 610 and stores a plurality of records 604, each associated with a respective identifier. For the purposes of the present example, one can consider that each identifier for which there exists a record in the database 602 is indicative of a privilege to access certain property or make certain transactions, although other scenarios are possible without departing from the scope of the present invention.

In accordance with one embodiment of the present invention, each of the records 604 also comprises a field 606 indicative of zero or more scrambling codes 608 that were encoded in signatures which were previously received and which encoded the respective identifier for that record. Thus, receipt of a particular signature that encodes the identifier in a given one of the records 604 as well as one of the scrambling code(s) 608 stored in the corresponding field 606 will indicate that the particular signature has been previously received and therefore its instant receipt may be indicative that a cloning attempt has been made.

Figure 7A:
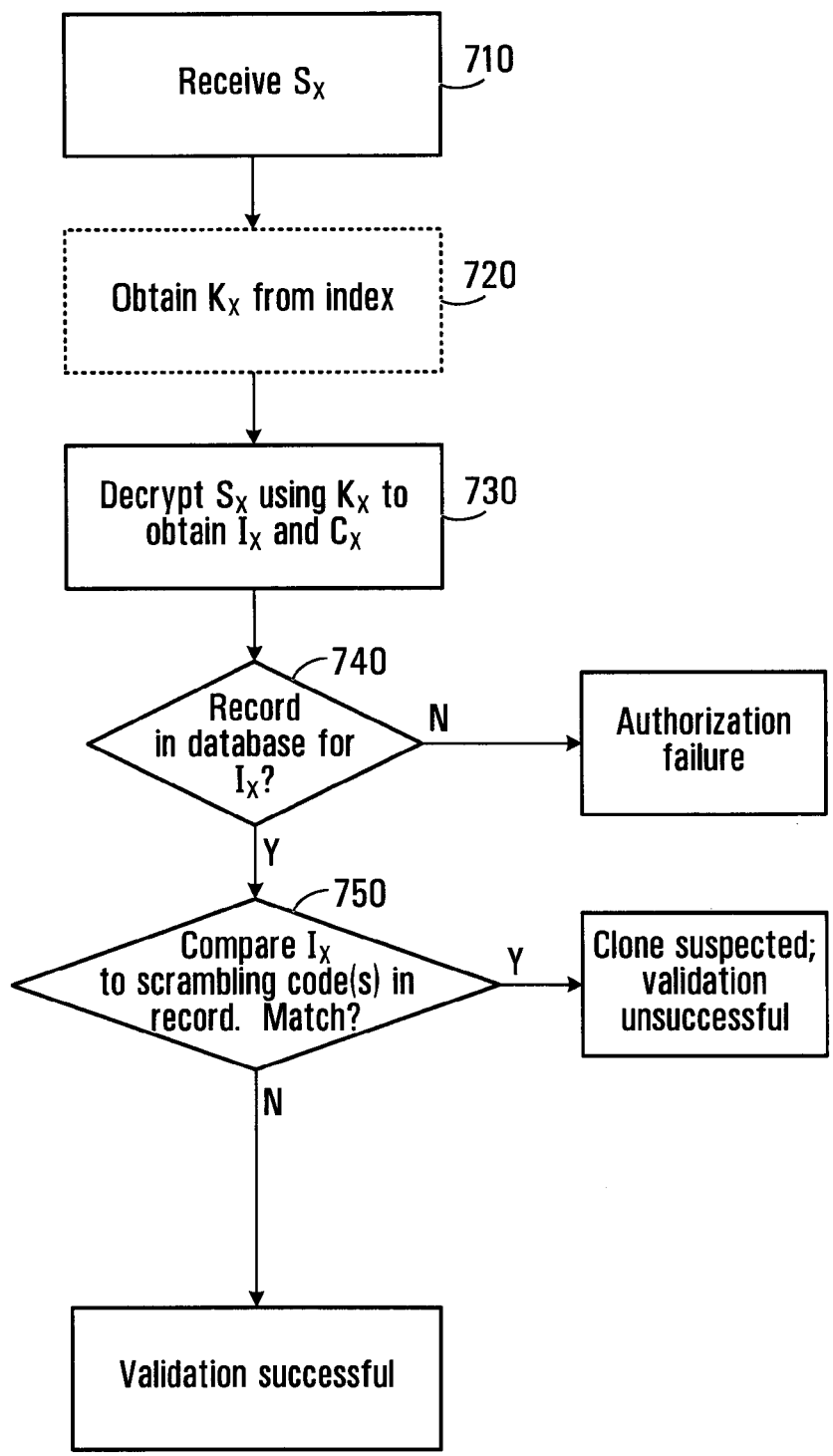
FIG. 7A is a flowchart showing operation of a processing entity of FIG. 6 when considering tags whose signatures encode a variable scrambling code and that are encrypted using a common key that is known to the reader or can be determined from an index supplied with the signature.

More specifically, with reference to the flowchart in FIG. 7A, consider what happens following step 710 when a signature $S_X$ is received at a particular time instant by the reader 12. At the time of receipt, whether the signature $S_X$ encodes any particular identifier or scrambling code is unknown to the reader 12. At step 730, an attempt to decrypt the signature $S_X$ is made by the processing entity 610 using a decryption key $K_X$. The decryption key $K_X$ may be known in advance to the processing entity 610. Alternatively, as shown in step 720, the signature $S_X$ may be accompanied by an index that allows the processing entity 610 to determine the appropriate decryption key $K_X$. The result of the decryption attempt at step 730 is a candidate identifier $I_X$ and a candidate scrambling code, denoted $C_X$.

At step 740, the processing entity 610 consults the database 602 based on the candidate identifier $I_X$ in an attempt to identify a corresponding record and extract therefrom a list of scrambling code(s) that have been received in the past in association with the candidate identifier $I_X$. For the purposes of the present example, it is useful to assume that such a record exists (i.e., the "YES" branch is taken out of step 740), but if there is no such record, this may indicate that there is a high-level failure requiring further action. At step 750, the processing entity 610 compares the candidate scrambling code $C_X$ to the scrambling code(s) 608 in the field 606 of the record identified at step 740 and corresponding to identifier $I_X$.

If there is a match, this indicates that the scrambling code $C_X$ has been used in the past in association with the identifier $I_X$. Under certain conditions, this may lead the processing entity 610 to conclude that the validation operation was unsuccessful.

For example, if the signature $S_X$ was expected to change at least as often as every time that the tag on which it is stored was read, then the fact that the scrambling code $C_X$ matches one of the scrambling code(s) 608 stored in the field 606 of the record corresponding to identifier $I_X$ may lead the processing entity 610 to conclude that the validation operation was unsuccessful. Alternatively, if the signature $S_X$ was expected to change every $N^{th}$ time that the tag on which it is stored was read, then the processing entity 610 may look at how many of the scrambling code(s) 608 stored in the field 606 of the record corresponding to identifier $I_X$ correspond to the scrambling code $C_X$, and if this number is greater than or equal to N, this may lead the processing entity 610 to conclude that the validation operation was unsuccessful. Alternatively still, if the signature $S_X$ was expected to change at least as often as every N seconds etc., then the processing entity 610 may look at how long ago it has been since a matching one of the scrambling code(s) 608 was first stored in the field 606 of the record corresponding to identifier $I_X$, and if this time interval is greater than or equal to a pre-determined number of seconds, minutes, hours, days, etc., this may lead the processing entity 610 to conclude that the validation operation was unsuccessful.

Where a conclusion is reached that the validation operation was unsuccessful, the privilege to access the property or make transactions may be revoked or at least questioned on the basis of suspected tag cloning.

On the other hand, if there is no match between the scrambling code $C_X$ and any of the scrambling code(s) 608 stored in the field 606 of the record corresponding to identifier $I_X$, this may lead the processing entity 610 to conclude that the validation operation was potentially successful. In such a case, the default privilege to access the property or make transactions may be granted (or at least not revoked on the basis of suspected tag cloning).

In accordance with an alternative embodiment of the present invention, the field 606 in the record associated with each particular identifier may be indicative of an "expected" scrambling code, i.e., the scrambling code that should (under valid circumstances) be encoded in a signature received from a tag that encodes the particular identifier. Alternatively, the field 606 in the record associated with each particular identifier may be indicative of an "expected" signature, i.e., the signature that should (under valid circumstances) be received from a tag that encodes the particular identifier. Thus, upon receipt of the signature $S_X$, if it is found to correspond to the expected signature (or if the scrambling code $C_X$ is found to correspond to the expected scrambling code), this may lead the processing entity 610 to conclude that the validation operation was potentially successful. On the other hand, if there is no match between the signature $S_X$ and the expected signature stored in the database 602 (or between the scrambling code $C_X$ and the expected scrambling code), this may lead the processing entity 610 to conclude that the validation operation was unsuccessful.

It should be appreciated that in the above alternative embodiments, the processing entity 610 may obtain knowledge of the expected scrambling code or the expected signature by implementing plural pseudo-random number generators for each of the identifiers, analogous to the pseudo-random number generator 240 implemented by the controller 206 in a given tag 14, which produces an output that depends on one or more previous values of the output and on a seed. Thus, the next output of the pseudo-random number generator implemented by the processing entity 610 for a given identifier allows the processing entity 610 to predict the scrambling code (or the signature) that should be received from a tag legitimately encoding the given identifier. In another embodiment, the processing entity 610 may know what is the expected scrambling code/signature because it has instructed the reader 12 to cause this expected scrambling code/signature to be stored in the memory of the tag.

In accordance with an alternative embodiment of the present invention, the database 602 simply comprises a running list of all signatures that have been received in the past. Thus, upon receipt of the signature $S_X$, if it is found to correspond to one of the signatures on the list, this may lead the processing entity 610 to conclude that the validation operation was unsuccessful. On the other hand, if there is no match between the signature $S_X$ and any of the signatures stored in the database 602, this may lead the processing entity 610 to conclude that the validation operation was potentially successful (or at least not unsuccessful).

It should also be appreciated that having obtained the identifier $I_X$, the processing entity 610 may also perform an action related to identification of an item associated with the particular tag that encoded the identifier $I_X$.

In a first example of an action related to identification, the processing entity 610 may simply note the fact that the item (bearing the identifier $I_X$) was encountered in a vicinity of the reader 12. This information may be stored in a database (not shown) or sent as a message, for example. In an inventory management scenario, the processing entity 610 may consult an inventory list and "check off" the item as having been located, or may signal that the presence of a spurious item (that is not on the inventory list) has been detected.

In another example of an action related to identification, the processing entity 610 may consult another database (not shown) in order to ascertain whether the identifier is on a list of identifiers associated with individuals/objects permitted to access, or prohibited from accessing, certain property. Examples of property include, without limitation: computing equipment, a computer network, a building, a portion of a building, an entrance, an exit and a vehicle.

In another example of an action related to identification, the processing entity 610 may consult another database (not shown) in order to ascertain whether the identifier is on a list of identifiers associated with individuals permitted to effect, or prohibited from effecting, a transaction, which could be a financial transaction or a login to controlled online content, for example.

Figure 7B:
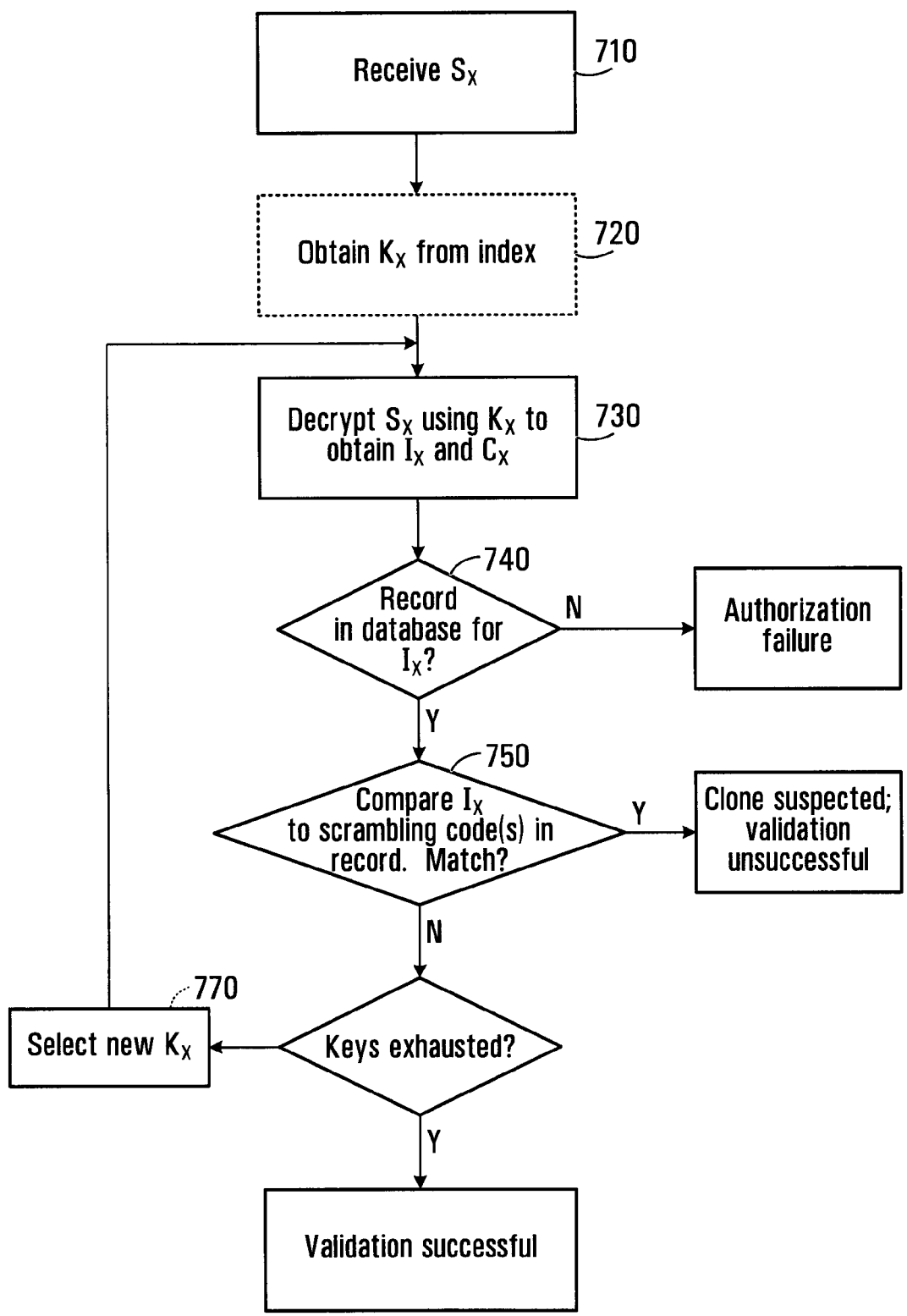
FIG. 7B is a flowchart similar to that of FIG. 7A, but where the common key is unknown to the reader.

FIG. 7B shows a variant where multiple keys are possible but no index (or one that does not permit identification of the appropriate decryption key) is provided along with the signature $S_X$. Specifically, taking the "NO" branch after step 750 does not conclude the validation operation. Rather, the validation operation goes through step 770 where a next key is selected and then the validation operation returns to step 730, whereby steps 730 through 770 are re-executed until the earlier occurrence of (i) taking the "YES" branch at step 750 and (ii) exhaustion of all keys, which can result in the equivalent of taking the "NO" branch out of 740 (i.e., this may indicate that there is a high-level failure requiring further action).

It should be appreciated that in the above embodiments, encryption and decryption can be effected using various techniques known in the art, including encryption using a symmetric key, an asymmetric key pair, a public/private key pair, etc., as well as in accordance with a variety of algorithms and protocols. For example, RSA and ECC are suitable examples of asymmetric encryption algorithms, while AES, DES, and Blowfish are suitable examples of symmetric algorithms. Still other possibilities exist and are within the scope of the present invention.

Figure 6A:
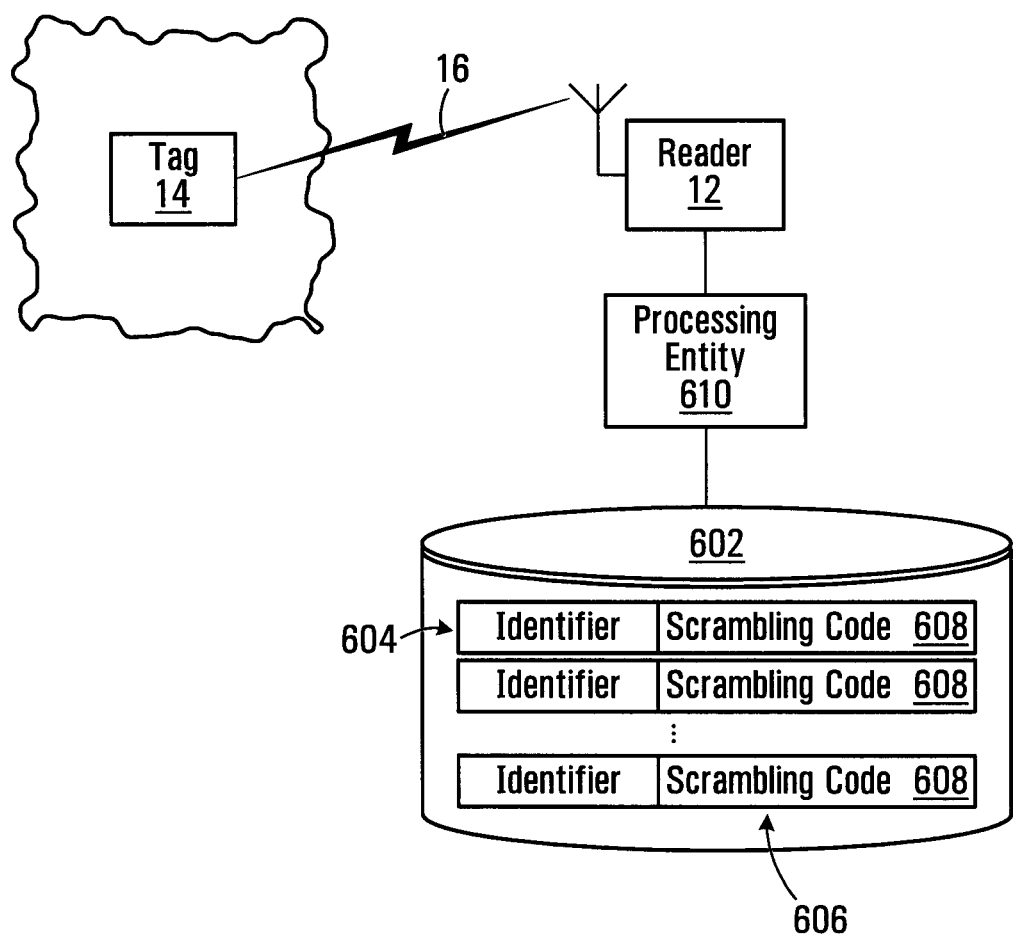
FIG. 6A shows application of a non-limiting embodiment of the present invention in a validation context.
Figure 6B:
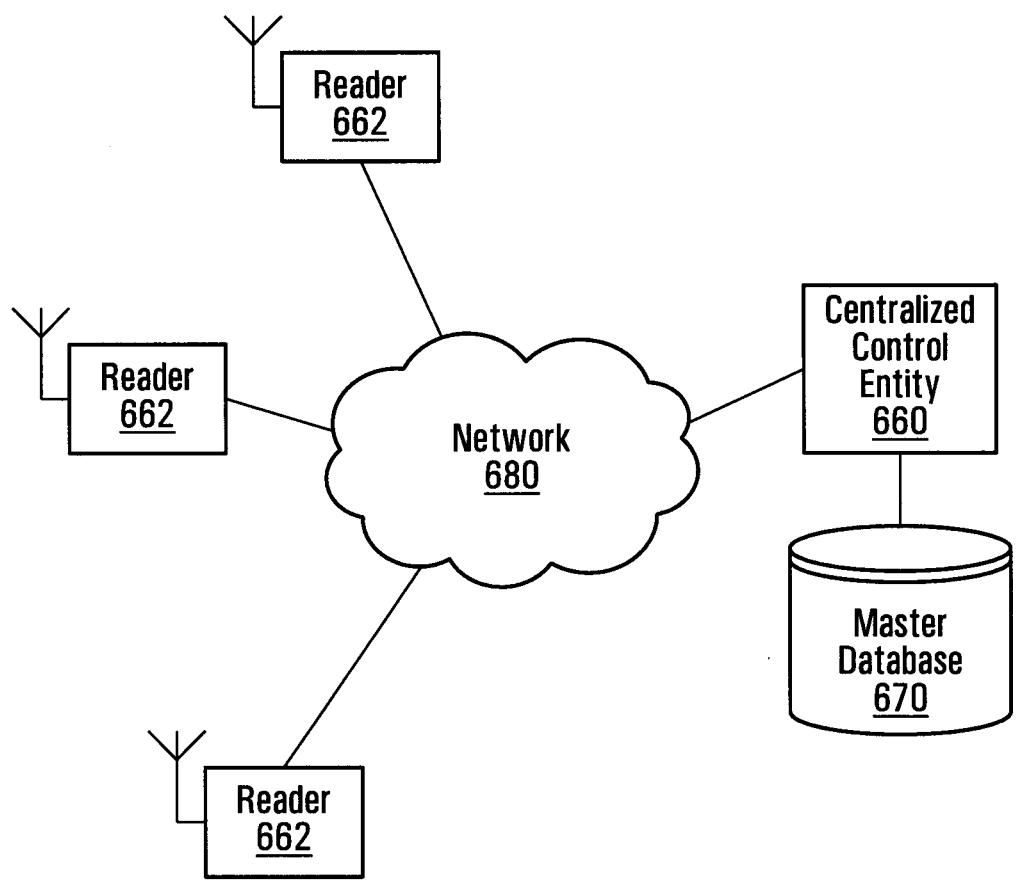
FIG. 6B is a block diagram of a multi-reader architecture, in accordance with a non-limiting embodiment of the present invention.

In the above example with reference to FIGS. 6A, 7A and 7B, although a single reader was described and illustrated, it should be appreciated that it is within the scope of the present invention to provide a multi-reader architecture, as shown in FIG. 6B. A plurality of readers 662 are connected to each other and to a centralized control entity 660 by a network 680, which can be a public packet-switched network, a VLAN, a set of point-to-point links, etc. In such a case, the centralized control entity 660 (e.g., a network controller) can implement the functionality of the processing entities 610, including encryption and validation. To this end, the centralized control entity 660 maintains a master database 670, which includes the equivalent of a consolidated version of various instances of the database 602 previously described as being associated with the reader 12 in the single-reader scenario.

Thus, decryption and validation can be performed entirely in the centralized control entity 660. Alternatively, certain functionality (such as decryption) can be performed by the readers 662 while other functionality (such as validation) can be performed by the centralized control entity 660. Still alternatively, the processing entities 610 can inter-operate amongst themselves in the absence of the centralized entity 660, thereby to implement decryption on a local basis, and the validation operation in a joint fashion. In such a distributed scenario, the master database 670 can still be used, or the processing entities 610 can communicate with one another to share information in their respective databases 602.

Figure 8:
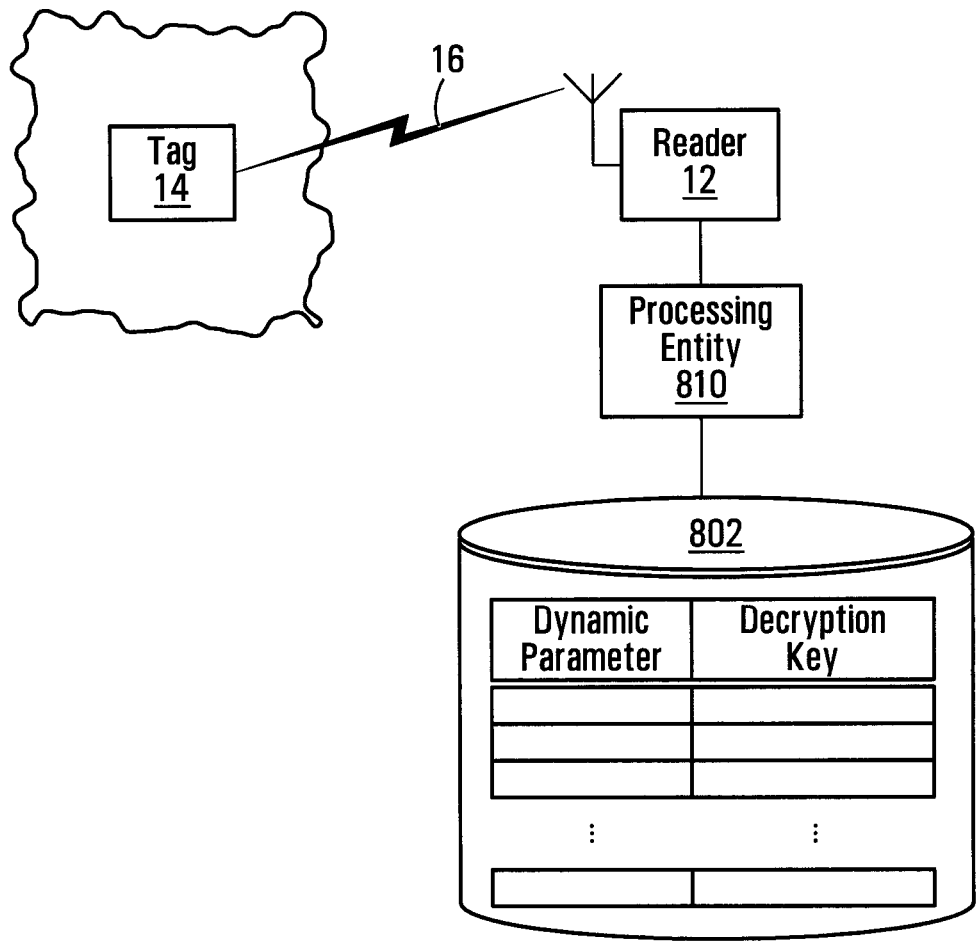
FIG. 8 shows application of a non-limiting embodiment of the present invention in an identification context when considering tags whose signatures are encrypted using a variable key.

In scenario (II), a dynamic key is used in the generation of a signature that encodes a constant identifier, and it is of interest to recover the underlying identifier despite the time-varying key. Accordingly, with reference now to FIG. 8, there is shown a system that is similar to the system of FIG. 1. In addition, the system of FIG. 8 comprises a processing entity 810 that implements an identification operation, as will be described herein below. The processing entity 810 may be connected to the reader 12, or it may be a remote entity. Such a remote entity may be reachable over a network, or it may be integrated with the reader 12. It should be understood that the system in FIG. 8 is being shown separately from the system in FIG. 6; however, it is within the scope of the present invention to combine the functionality of both systems.

Figure 9:
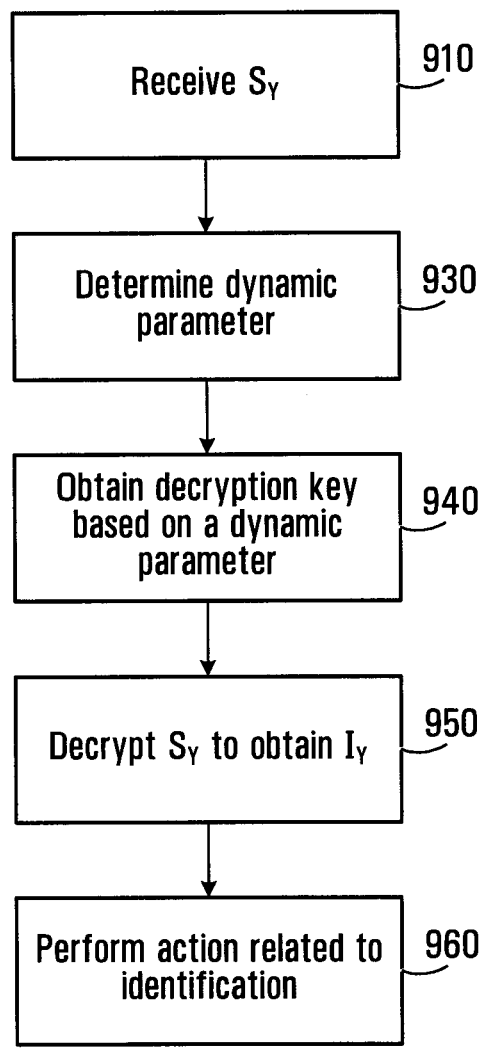
FIG. 9 is a flowchart showing operation of a processing entity of FIG. 8 when considering tags whose signatures are encrypted using a variable key.

With reference to the flowchart in FIG. 9, consider what happens following step 910 when a signature $S_Y$ is received from a particular tag at a particular time instant by the reader 12. The signature $S_Y$ is assumed to have been generated by encrypting an identifier $I_Y$ using an encryption key that varies in a dynamic fashion. To this end, the particular tag may have generated the dynamic encryption key based on, for example:

the output of the aforementioned clock module 260 (e.g., in terms of seconds, minutes or hours of elapsed time since an event known also to the processing entity 810);
the output of the aforementioned geo-location module 250;
an index;
a seed for use by a pseudo-random number generator.

Still other possibilities are within the scope of the present invention. The decryption key can then be determined based on the above quantity. For example, the decryption key could be the above-mentioned output of the clock module or the geo-location module. Alternatively, the encryption key could be the output of a table or a pseudo-random number generator (both known to the processing entity 810) based on the above-mentioned seed, or at a position that corresponds to the above-mentioned index. In the latter case, the index or seed can be supplied along with the signature $S_Y$.

In accordance with the present embodiment, once the signature $S_Y$ is read by the reader 12, the processing entity 810 is expected to determine the appropriate decryption key, denoted $K_Y$. Accordingly, at step 930, the processing entity 810 first determines a dynamic parameter that will allow the decryption key $K_Y$ to be determined. Examples of the dynamic parameter include:

the output of a clock module (which attempts to emulate the aforementioned clock module 260) at the time of receipt of the signature $S_Y$ (e.g., in terms of seconds, minutes or hours of elapsed time since a known event);
the output of a geo-location module (which can be similar to the aforementioned geo-location module 250);
the index or seed provided along with the signature $S_Y$.

Next, at step 940, the processing entity 810 obtains the decryption key $K_Y$ based on the dynamic parameter determined at step 930. For example, where the dynamic parameter corresponds to the output of a clock module or a geo-location module, the decryption key $K_Y$ could be the dynamic parameter itself. Alternatively, where the dynamic parameter is an index or a seed, the decryption key $K_Y$ could be the output of the aforementioned table or pseudo-random number generator known to the processing entity 810, at a position that corresponds to the received index, or using the received seed.

Once the decryption key has been obtained, the signature $S_Y$ is decrypted at step 950 using the decryption key. This leads to extraction of the identifier $I_Y$. It is noted that a scrambling code was not required in this embodiment, although its use is not disallowed.

Having obtained the identifier $I_Y$, the processing entity 810 proceeds to step 960, where it performs an action related to identification of an item associated with the particular tag that encoded the identifier $I_Y$.

In a first example of an action related to identification, the processing entity 810 may simply note the fact that the item (bearing the identifier $I_Y$) was encountered in a vicinity of the reader 12. This information may be stored in a database (not shown) or sent as a message, for example. In an inventory management scenario, the processing entity 810 may consult an inventory list and "check off" the item as having been located, or may signal that the presence of a spurious item (that is not on the inventory list) has been detected.

In another example of an action related to identification, the processing entity 810 may consult another database (not shown) in order to ascertain whether the identifier is on a list of identifiers associated with individuals/objects permitted to access, or prohibited from accessing, certain property. Examples of property include, without limitation: computing equipment, a computer network, a building, a building, a portion of a building, an entrance, an exit and a vehicle.

In yet another example of an action related to identification, the processing entity 810 may consult another database (not shown) in order to ascertain whether the identifier is on a list of identifiers associated with individuals permitted to effect, or prohibited from effecting, a transaction, which could be a financial transaction or a login to controlled online content, for example.

It should be appreciated that the processing entity 810 may also perform an action related to validation of the identifier $I_Y$ in conjunction with the above action related to identification. Specifically, in accordance with one embodiment of the present invention, the processing entity may consult a variant of the aforementioned database 602, where each of the records 604 now includes a field indicative of zero or more signatures which were previously received and which encoded the respective identifier for that record. Thus, receipt of a particular signature that encodes the identifier in a given one of the records 604 as well as one of the signature(s) stored in the corresponding field will indicate that the particular signature has been previously received and therefore its instant receipt may be indicative that a cloning attempt has been made.

In the above example with reference to FIGS. 8 and 9, although a single reader was described and illustrated, it should be appreciated that it is within the scope of the present invention to provide a multi-reader architecture, as in FIG. 6B.

Figure 10:
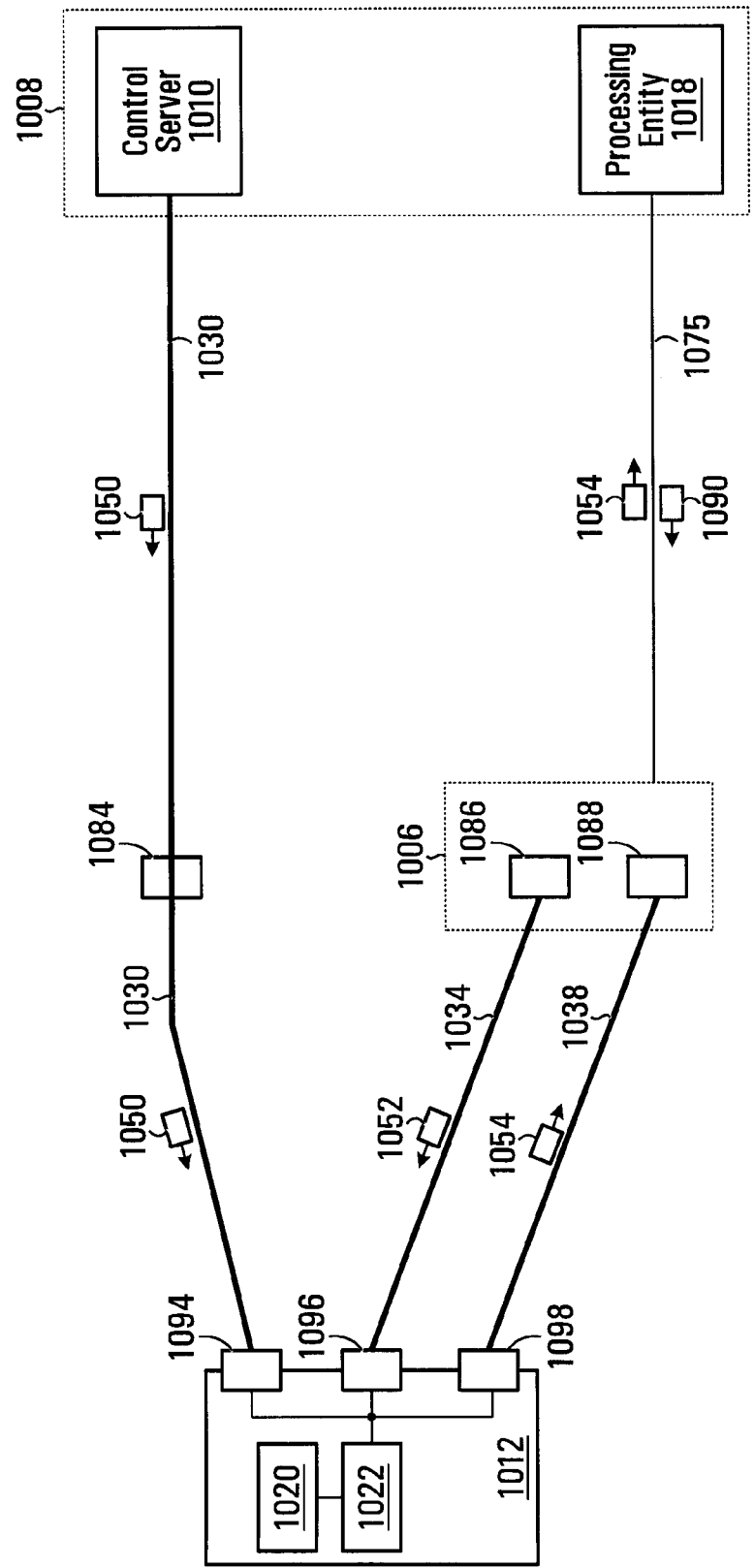
FIG. 10 is a combined block and message flow diagram illustrating an architecture that allows nomadic electronic transactions to be carried out securely by a user of a communication device, in accordance with a non-limiting embodiment of the present invention.

Reference is now made to FIG. 10, which shows a block diagram of an architecture for effecting secure nomadic electronic transactions, including a control server 1010, a communication device 1012, at least one system-side transmitter 1084, 1086, at least one system-side receiver 1088 and a processing entity 1018. Communication device 1012 has memory 1020, a processing unit 1022 and an interface with at least one device-side transmitter 1098 and at least one device-side receiver 1094, 1096.

In a non-limiting example of an embodiment of the present invention, communication device 1012 can be a mobile phone (including BlackBerry® and other networked personal digital assistants) or a laptop computer, to name a few non-limiting possibilities. Depending on the embodiment, communication device 1012 can include appropriate circuitry, software and/or control logic to implement other components, such as a display, microphone, loudspeaker, keypad, modem, operating system, etc., which are standard features of various existing communication devices and need not be described in further detail here. It is also contemplated that electronic touch passes and swipe cards may be provided with the requisite functionality to be usable as communication device 1012.

In accordance with a non-limiting embodiment of the present invention, the control server 1010 is in a domain of responsibility 1008 of a transaction guarantor, which can be a communications service provider or a credit card company, for example. The transaction guarantor performs certain actions to ensure the security of transactions attempted by communication device 1012. To this end, the control server 1010 is configured to transmit "data sets" to various communication devices that subscribe to a back channel-enhanced transaction validation service provided by the control server 1010. In particular, the control server 1010 is configured to generate and transmit particular data sets 1050 to communication device 1012. Communication of the particular data sets 1050 to communication device 1012 is achieved over a first communication path 1030 that has a first portion leading from the control server 1010 to system-side transmitter 1084, followed by a second portion between system-side transmitter 1084 and device-side receiver 1094. The first and second portions of the first communication path 1030 may each be wireless or non-wireless. Further detail regarding the generation and transmission of the particular data sets 1050 transmitted by the control server 1010 will be provided later.

System-side transmitter 1086 and system-side receiver 1088 are in a domain of responsibility 1006 of a local entity, which can comprise a point of sale or a point of wireless access, for example. Non-limiting examples of the local entity include stores, coffee shops, airports and the like. System-side transmitter 1086 is configured to issue "requests" to nearby communication devices that are within the domain of responsibility 1006 of the local entity. In particular, system-side transmitter 1086 transmits a particular request 1052 to communication device 1012 over an upstream local communication path 1034. The upstream local communication path 1034 exists between system-side transmitter 1086 and device-side receiver 1096. The upstream local communication path 1034 may be contactless (e.g., RFID) or may involve some form of contact (e.g., swipe card, electronic touch pass). Further detail regarding requests issued by system-side transmitter 1086 will be provided later on.

Communication device 1012 is configured to release "responses" in reply to received requests. In particular, in reply to the particular request 1052, communication device 1012 releases a particular response 1054 to whichever system-side receiver may be in its vicinity. When this system-side receiver is system-side receiver 1088, communication of the particular response 1054 to system-side receiver 1088 is achieved over a downstream local communication path 1038. The downstream local communication path 1038 exists between device-side transmitter 1098 and system-side receiver 1088. The downstream local communication path 1038 may be contactless (e.g., RFID) or may involve some form of contact (e.g., swipe card, electronic touch pass). Further detail regarding the generation and release of responses by communication device 1012 will be provided later on.

It should be understood that by the upstream local communication path 1034 being "local" is meant that there is a close physical proximity between the members communicating over such path (namely, system-side transmitter 1086 and device-side receiver 1096). Also, by the downstream local communication path 1038 being "local" is meant that there is a close physical proximity between the members communicating over such path (namely, device-side transmitter 1098 and system-side receiver 1088). It should also be understood that the upstream and downstream local communication paths 1034, 1038 may share the same physical medium, namely they may be upstream and downstream versions, respectively, of a single local communication path.

Responses received by system-side receiver 1088 from various communication devices, including communication device 1012, are forwarded to the processing entity 1018 for processing via a communication path 1075, which is an extension of the downstream local communication path 1038 between system-side receiver 1088 and the processing entity 1018. The processing entity 1018 is in the domain of responsibility 1008 of the transaction guarantor. Thus, it will be observed that the responses received by system-side receiver 1088 exit the domain of responsibility 1006 of the local entity and enter the domain of responsibility 1008 of the transaction guarantor.

In particular, system-side receiver 1088 forwards the particular response 1054 received from communication device 1012 via communication path 1075 to the processing entity 1018, which carries out an assessment of the validity of the particular response 1054 in a manner to be described later on in further detail. The processing entity 1018 returns a result of the assessment of validity (hereinafter "the validity assessment result 1090") to system-side receiver 1088 via communication path 1075. Thus, the validity assessment result 1090 crosses back into the domain of responsibility 1006 of the local entity.

If the validity assessment result 1090 is indicative of the particular response 1054 being considered valid, then various further actions of a first kind can be taken by the local entity, depending on the application at hand. Examples of such further actions of the first kind could include granting access to a resource (financial, physical, virtual, electronic or other), to name a few non-limiting possibilities. In another embodiment, even if the validity assessment result 1090 is indicative of the particular response 1054 being considered valid, this could be only one step in a series of steps required before a transaction can be authorized or access to a resource can be granted. For example, additional steps could include one or more of: live interaction with a user (not shown) of communication device 1012, biometric authentication, password validation and eliciting answers to specific questions, to name a few non-limiting possibilities.

On the other hand, if the validity assessment result 1090 is indicative of the particular response 1054 being considered invalid, then various further actions of a second kind can be taken. Examples of such further actions of the second kind include denying access to the resource (financial, physical, virtual, electronic or other), to name a few non-limiting possibilities. Additional or alternative actions can include notifying relevant authorities or freezing an account, to name a few non-limiting possibilities. In another embodiment, even if the validity assessment result 1090 is indicative of the particular response 1054 being considered invalid, this need not automatically provoke denial of access or refusal of a transaction, but instead may initiate the application of additional security measures, which can include one or more of: live interaction with a user (not shown) of communication device 1012, biometric authentication, password validation and eliciting answers to specific questions, to name a few non-limiting possibilities.

In a specific non-limiting example being described here, the process of validating an electronic transaction can amount to ultimately granting or denying access to a financial resource. However, this is not to be considered a limitation of the present invention.

Figure 11:
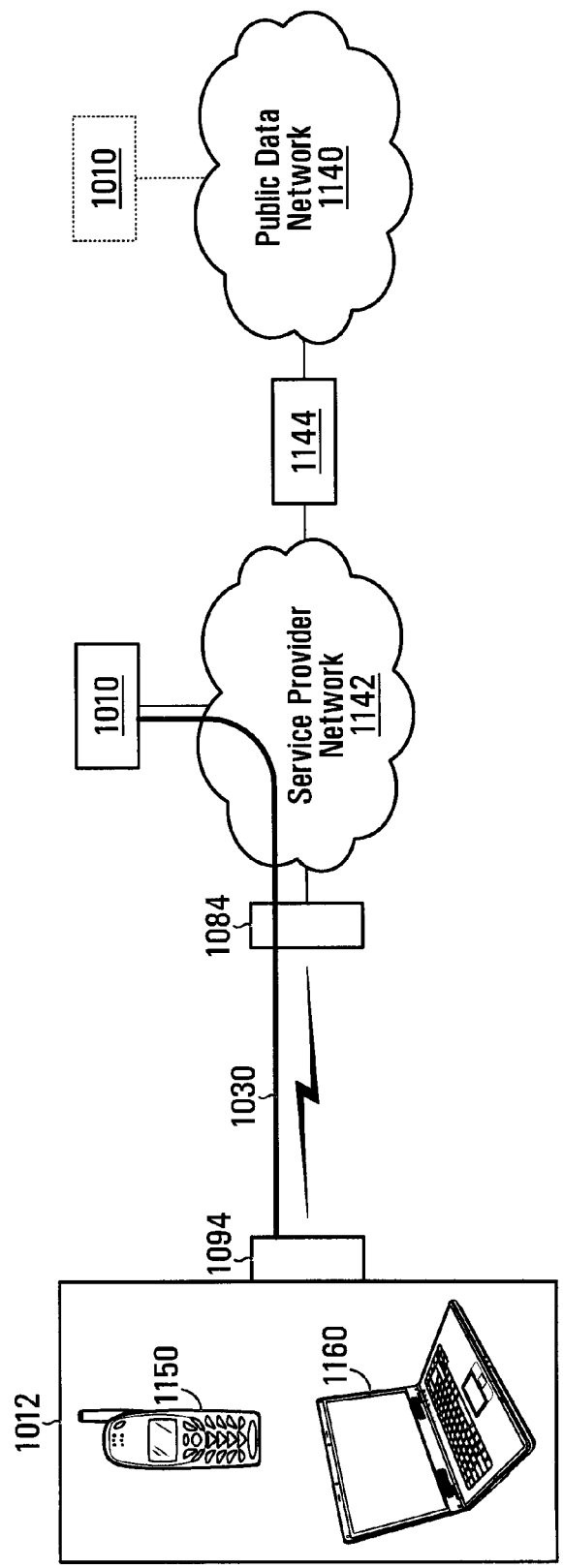
FIG. 11 illustrates a version of the architecture of FIG. 10 in which a communication path is established between the communication device and a control server over a service provider network.

With reference now to FIG. 11, consider a practical but non-limiting situation where communication device 1012 is implemented as a mobile phone 1150 subscribing to a data service or a laptop computer 1160 with access to a public data network 1140 (for example, the Internet). In such cases, assuming communication device 1012 to be operational, it will have the capability to exchange data over an underlying service provider network 1142, which is connected to the public data network 1140 via a gateway 1144. In accordance with a non-limiting embodiment of the present invention, when the account holder subscribes to the aforementioned back-channel-enhanced transaction validation service, communication device 1012's data service or network access is leveraged to serve as a vehicle for establishing the first communication path 1030. Specifically, the control server 1010 is configured to be reachable using the data service or network access provided to communication device 1012. FIG. 11 shows in solid lines the control server 1010 being reached directly over the service provider network 1142, although it should be appreciated that the control server 1010 could also be reached over the public data network 1140, which is accessed from the service provider network 1142 via the gateway 1144. It should be appreciated that in this implementation, system-side transmitter 1084 will already be part of the service provider equipment ordinarily used to deliver the data service or network access to the mobile phone 1150 or the laptop computer 1160, as the case may be. Similarly, device-side receiver 1094 will already be part of the transceiving equipment (not shown) ordinarily used by communication device 1012 to receive the data service or network access.

Now consider two non-limiting example implementations of system-side transmitter 1086, system-side receiver 1088, device-side receiver 1096 and device-side transmitter 1098.

Figure 12:
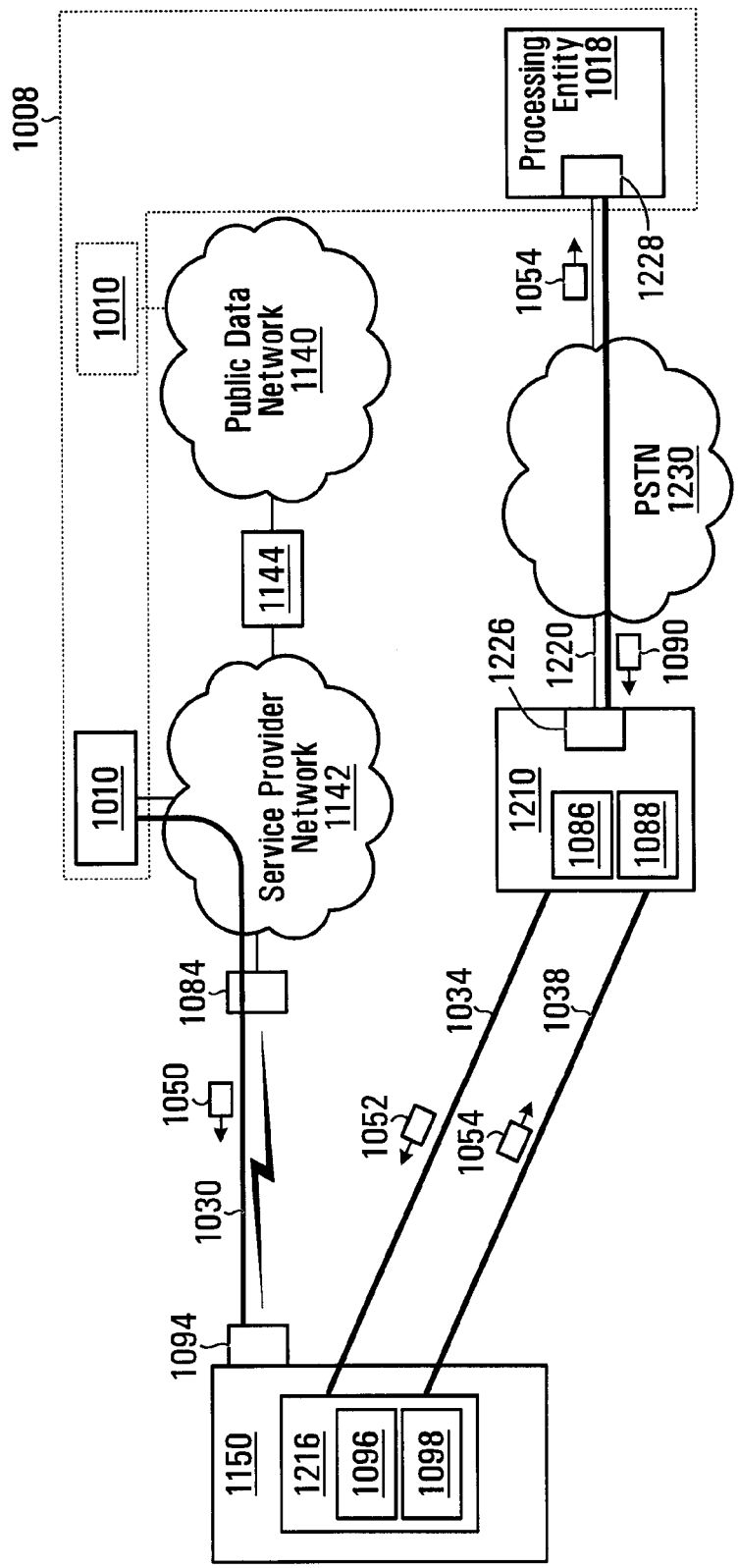
FIG. 12 illustrates further detail added to FIG. 11, for the case where an additional communication path is established between the communication device and system-side equipment leading to a processing entity, for the case where the transaction takes place at a physical point of sale.

In a first non-limiting example implementation, reference is made to FIG. 12, wherein communication device 1012 is the mobile phone 1150 and is used to effect a transaction (for example, the purchase of a television set) at a physical commercial establishment, such as an electronics store. By way of non-limiting example, system-side transmitter 1086 and system-side receiver 1088 are embodied together in an RFID interrogator 1210 at a point of sale, for example at a cash register in the electronics store. At the time the transaction is attempted, the RFID interrogator 1210 issues the particular request 1052 over the upstream local communication path 1034. Also in this first non-limiting example of implementation, device-side receiver 1096 and device-side transmitter 1098 are embodied together as a radio-frequency transceiver of an RFID tag 1216 that is integrated within the mobile phone 1150 (alternatively, it can be said that the mobile phone 1150 is integrated with the RFID tag 1216). Thus, in this example, communication paths 1034 and 1038 can represent two directions of a low-bandwidth short-range radio frequency channel established between the RFID interrogator 1210 and the RFID tag integrated within communication device 1012.

RFID tag 1216 on the mobile phone 1150 responds to the particular request 1052 received from the RFID interrogator 1210 by releasing the aforementioned particular response 1054 over the downstream local communication path 1038. The particular response 1054 is derived from the particular data sets 1050 transmitted from the control server 1010 over the first communication path 1030. The particular response 1054 is captured by the RFID interrogator 1210. The RFID interrogator 1210 forwards the particular response 1054 to the processing entity 1018, which is in the domain of responsibility 1008 of the transaction guarantor.

In one embodiment, the RFID interrogator 1210 may be equipped with a modem 1226 and a public switched telephone network (PSTN) 1230 connection for this purpose. Specifically, the RFID interrogator 1210 can dial out over the PSTN 1230 using the modem 1226 and connect to a modem 1228 of the processing entity 1018, thereby establishing a communication path 1220 over which the particular response 1054 is forwarded to the processing entity 1018. In another embodiment, a persistent connection (e.g., an IP connection) is established between the RFID interrogator 1210 and the processing entity 1018. Yet other ways for the RFID interrogator 1210 to reach the processing entity 1018 exist and will be understood by those of skill in the art as being encompassed within the scope of the present invention.

The processing entity 1018 carries out an assessment of validity of the particular response 1054. The processing entity 1018 then returns the validity assessment result 1090 to the RFID interrogator 1210 over the communication path 1220. If the validity assessment result 1090 is indicative of the particular response 1054 being considered valid, then the electronics store can accept the transaction, with the understanding that payment has effectively been guaranteed by the transaction guarantor, who is then responsible for collecting payment from the account holder under whose name the data service was provided to the mobile phone 1150.

In a second non-limiting example of implementation, reference is made to FIG. 13A wherein communication device 1012 is the laptop computer 1160 and obtains network access (e.g., access to the public data network 1140) via a WiFi hotspot 1308 (e.g., at a restaurant or airport). In this example, there is no RFID tag on the laptop computer 1160 or if there is one, it is not activated. Instead, the laptop computer 1160 employs only one device-side receiver (say, receiver 1094) alongside one device-side transmitter 1098. Similarly, at the WiFi hotspot 1308, there is only a need for one system-side transmitter (say, transmitter 1084) alongside one system-side receiver 1088. Thus, in this example, although the communication paths 1030, 1034 and 1038 will be different, they share the same physical medium and transmission/reception equipment.

Now, consider that the user (not shown) is utilizing his or her network access to effect a transaction (for example, the purchase of a sofa) while visiting a commercial website, such as a virtual furniture store 1306. In one embodiment, the virtual furniture store 1306 has a prior business arrangement with the restaurant or airport that hosts the WiFi hotspot 1308, whereby the WiFi hotspot 1308 will be advised when a visitor to the virtual furniture store 1306 has been detected as being at the WiFi hotspot 1308. Thus, for example, when the virtual furniture store 1306 detects that a transaction is being attempted from the WiFi hotspot 1308, the virtual furniture store 1306 sends a return message 1320 WiFi hotspot 1308 over a secure path 1322 (established over, e.g., a private or virtual private network). The WiFi hotspot 1308 is configured to respond to receipt of the return message 1320 by issuing the particular request 1052 to the laptop computer 1160 over the upstream local communication path 1034. In an alternative embodiment, the WiFi hotspot 1308 may monitor communications from the laptop computer 1160 to detect when a transaction is being attempted with the virtual furniture store 1306 (which can be on a list of commercial websites being monitored), which triggers issuance of the particular request 1052 over the upstream local communication path 1034.

With reference now to FIG. 13B, the laptop computer 1160 responds to the particular request 1052 received from the WiFi hotspot 1308 by releasing the aforementioned particular response 1054 (which, it will be recalled, is derived from the particular data sets 1050 transmitted from the control server 1010 over the first communication path 1030). The particular response 1054 is captured by the WiFi hotspot 1308. In turn, the WiFi hotspot 1308 forwards the particular response 1054 to the processing entity 1018, which is in the domain of responsibility 1008 of the transaction guarantor. This can be done over a link 1330 established with the processing entity 1018 over the public data network 1140, assuming that the processing entity 1018 can be reached in this way. Alternatively, the WiFi hotspot 1308 may be equipped with a modem and a PSTN connection as was the case in an embodiment of the RFID interrogator 1210 described above in respect of FIG. 12.

Figure 13C:
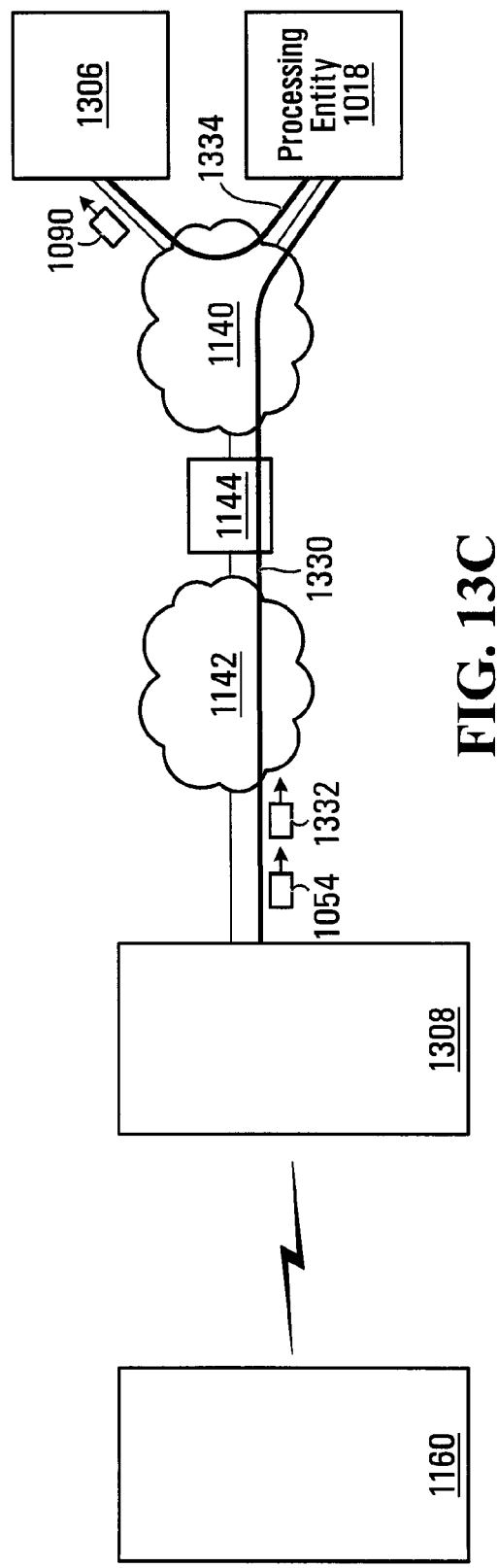

The processing entity 1018 carries out an assessment of validity of the particular response 1054. In one embodiment, the validity assessment result 1090 is returned to the WiFi hotspot 1308 over link 1330, which then relays the validity assessment result 1090 to the virtual furniture store 1306 back over path 1322. Another embodiment is shown in FIG. 13C. In this embodiment, when forwarding the particular response 1054 to the processing entity 1018 over link 1330, the WiFi hotspot 1308 also forwards an address 1332 where the virtual furniture store 1306 can be reached. Upon learning the address 1332, the processing entity 1018 can then provide the validity assessment result 1090 directly to the virtual furniture store 1306, such as by using a communication path 1334 that traverses the public data network 1140. In either case (FIG. 13B or 13C), if the validity assessment result 1090 is indicative of the particular response 1054 being considered valid, the virtual furniture store 1306 then accepts the transaction, with the understanding that payment has effectively been guaranteed by the transaction guarantor, who is then responsible for collecting payment from the account holder under whose name network access was provided to the laptop computer 1160.

Further detail regarding how a transaction is actually validated based on the contents of the particular response 1054 is now provided by considering several operational scenarios.

Figure 14:
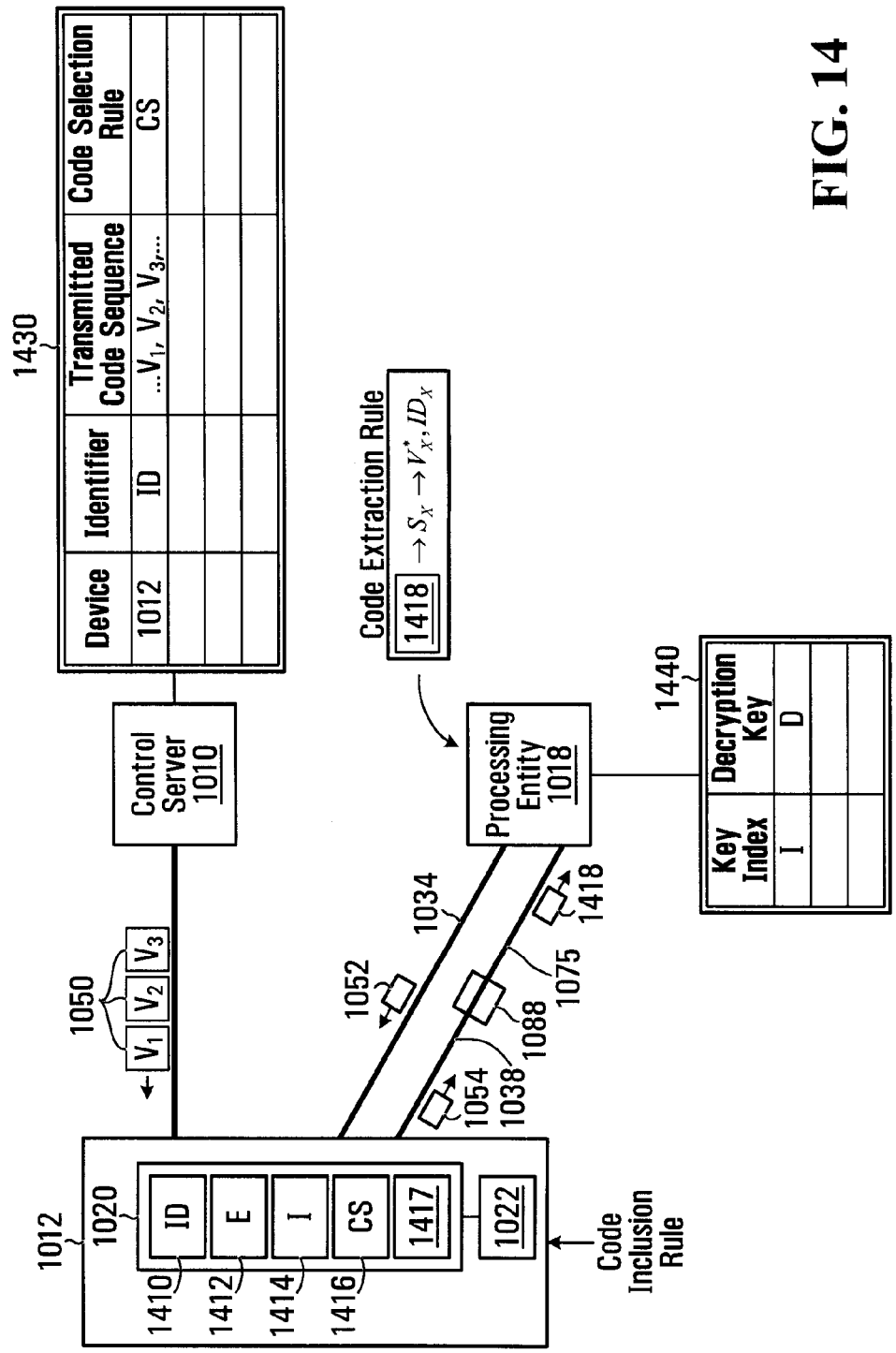
FIG. 14 is a combined block and message flow diagram illustrating generation of a response to a request, according to a first approach under a non-limiting first operational scenario where in order to formulate the response, the communication device generates a signature based on code values contained in data sets received from the control server.

A first operational scenario is now described with reference to FIG. 14. In accordance with the first operational scenario, the memory 1020 includes an identifier memory element 1410 and an encryption key memory element 1412. The identifier memory element 1410 stores an identifier of communication device 1012, such as, for example, a Media Access Control (MAC) address, Internet Protocol (IP) address, manufacturer serial number or Electronic Serial Number (ESN), to name a few non-limiting possibilities. The identifier of communication device 1012 is denoted "ID" and serves to uniquely identify communication device 1012 from among a wider set of communication devices. The encryption key memory element 1412 stores an encryption key denoted "E" that is complementary to a decryption key (denoted "D") that is known to (or can be learned by) the processing entity 1018. For example, the encryption key E can be a private key from a private/public key pair, while the decryption key D can be the corresponding public key. The encryption key E may be used only by communication device 1012 or it may be used by multiple members (communication devices) of a group. Where multiple communication devices using different respective encryption keys can potentially communicate with the processing entity 1018, it is envisaged that eventual decryption can be facilitated without detracting from security by employing key indexes that are uniquely associated in a known way with each encryption/decryption key pair. The key index for keys E and D, denoted I, can be stored in a key index memory element 1414 of the memory 1020.

Turning now to the control server 1010, the following provides some information regarding the generation and transmission of data sets, and specifically the particular data sets 1050 intended for communication device 1012, in the context of the first operational scenario. In particular, each of the particular data sets 1050 can be viewed as including a "code value". The code values, denoted "$V_1$", "$V_2$", "$V_3$", ..., change from one data set to the next in accordance with a "transmitted code sequence" that is known to the control server 1010. The transmitted code sequence can be stored in a database 1430 accessible to the control server 1010 on a basis of the identifier ID. The dynamic nature of the code values $V_1, V_2, V_3, \ldots$, and, in particular, the fact that changes in the code values $V_1, V_2, V_3, \ldots$, are controlled by the control server 1010 in a way that can be different for different communication devices, can contribute to enhancing the security of transactions that may be carried out using communication device 1012.

In accordance with the first operational scenario, the transmitted code sequence may vary in a variety of ways, e.g., in accordance with a function. This function can be deterministic and simple (e.g., "2, 4, 6, ..."), deterministic and complex (e.g., based on an underlying algebraic formula) or stochastic (e.g., based on an output of a random number generator). Whichever function is used, it may be unknown to communication device 1012 and other communication devices. The code values $V_1, V_2, V_3, \ldots$, are formulated into the particular data sets 1050 that are transmitted to communication device 1012 over the first communication path 1030 (which may, but need not, include a wireless portion). It should be appreciated that multiple particular data sets 1050 can be sent together, so as to inform communication device 1012 of several code values at once.

At communication device 1012, the particular data sets 1050 are received from the control server 1010 over the first communication path 1030. The processing unit 1022 derives the code values $V_1, V_2, V_3, \ldots$, from the particular data sets 1050 and stores them in the memory 1020, such as in a "code values" memory element 1417. The code values memory element 1417 may also store one, several or all code values received prior to the receipt of code values $V_1, V_2, V_3, \ldots$. The processing unit 1022 then applies a "code selection rule" CS in order to select a specific code value, denoted V*, for inclusion in the particular response 1054 to the particular request 1052 received from system-side transmitter 1086 over the upstream local communication path 1034. The code selection rule CS, which is associated with communication device 1012, can be stored in a code selection rule memory element 1416 of the memory 1020. The code selection rule CS is also known to the control server 1010; for example, it can be stored in the database 1430 accessible to the control server 1010.

Figure 16:
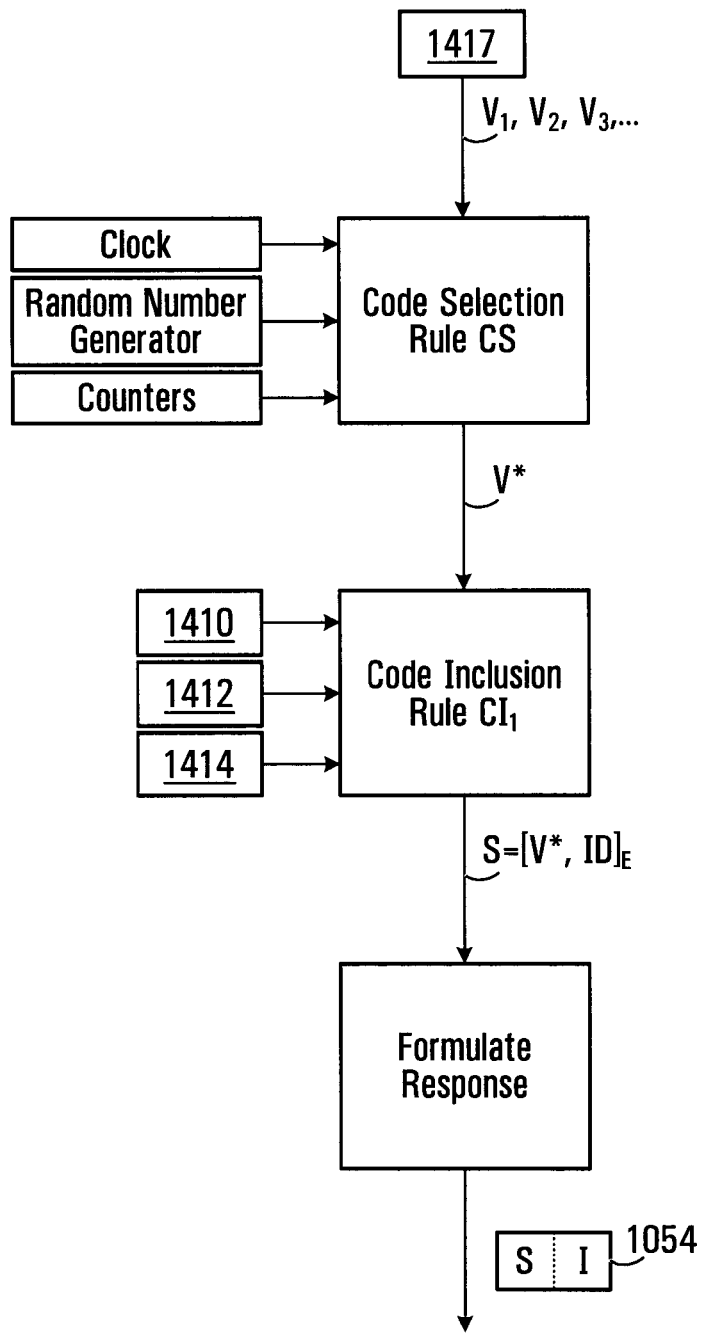
FIG. 16 is a flowchart showing generation of a signature by the communication device based on code values received from the control server.

With reference to FIG. 16, application of the code selection rule CS by the processing unit 1022 may involve parameters, such as the code values in the code values memory element 1417 (including code values $V_1, V_2, V_3, \ldots$), as well as possibly other factors (see below). In some embodiments, selection of the specific code value V* can be triggered by receipt of the particular request 1052. In other embodiments, selection of the specific code value V* can be done in anticipation of receipt of the particular request 1052.

A non-exhaustive list of possible examples of the code selection rule CS is now provided:

Example (a): each received code value is used only once per response.

Example (b): each received code value is included in exactly N consecutive responses, where N>1 and is pre-determined;

Example (c): each received code value is included in all responses sent during a pre-determined time interval (e.g., go to the next code value every 5 minutes, use (or don't use) certain codes during specific hours during the day);

Example (d): each received code value is included in all responses sent during a time interval that varies in a seemingly random fashion although the variations are in accordance with behaviour of a random number generator with a pre-determined seed and pre-determined tap values (e.g., switch to the next code value after the number of seconds indicated by the subsequent output of a random number generator defined by polynomial X and having a seed Y).

Still other possibilities exist and are contemplated as being within the scope of the present invention. Additionally, the processing unit 1022 is presumed to implement or have access to the necessary counters, clocks, random number generators and/or other functional entities needed to execute the code selection rule CS.

Having selected the specific code value V* using the pre-determined code selection rule CS known to the control server 1010, and with continued reference to FIG. 16, the processing unit 1022 then includes the specific code value V* in the particular response 1054 in accordance with a "code inclusion rule" associated with the first operational scenario, denoted $CI_1$.

In accordance with the first operational scenario being described here, the code inclusion rule $CI_1$ consists of encrypting the specific code value V* together with the identifier ID using the encryption key E. The result of this encryption, which can be symbolized as $[V^*, ID]_E$, is referred to as a "signature" and is denoted S. The processing unit 1022 then formulates the particular response 1054 by including therein the signature S. In addition, the particular response 1054 may also include the aforementioned key index I if such a key index is employed. The particular response 1054 is sent via device-side transmitter 1098 over the downstream local communication path 1038. Thereafter, the specific code value V* that was included in the particular response 1054 (by virtue of the signature S) maybe deleted from the code values memory element 1417 or may be kept stored in the memory 1020, depending on the code selection rule CS.

Although the particular response 1054 is assumed to be valid in this example, this truth is not known to an entity in receipt of the particular response 1054. Thus, with reference again to FIG. 14, the particular response 1054 is received by system-side receiver 1088 but is hereinafter referred to as a "received response" and given a different reference number 1418. This serves to illustrate that the validity of the received response is not known a priori by its recipient.

System-side receiver 1088 forwards the received response 1418 over communication path 1075 to the processing entity 1018 which, it is recalled, is in the domain of responsibility 1008 of the transaction guarantor. The processing entity 1018 then carries out an assessment of validity of the received response 1418. This can be done according to at least two approaches. The first approach involves a code extraction step to derive from the received response 1418 what is thought to be an identifier (hereinafter the "putative identifier", denoted $ID_X$) and what is thought to be a specific code value (hereinafter the "putative specific code value", denoted $V^*_X$), followed by processing the putative identifier $ID_X$ and the putative specific code value $V^*_X$. The second approach relies on a comparison of the signature thought to be contained in the received response 1418, hereinafter the "putative signature", denoted $S_X$. Both approaches are discussed below.

According to the first approach, the processing entity 1018 is assumed to know a priori the code inclusion rule $CI_1$ (associated with this first operational scenario) that is used in the formulation of valid responses from communication devices. Thus, for instance, if a given received response is valid, the processing entity 1018 knows that the given received response will include a signature which, when submitted to decryption using a given decryption key, reveals a legitimate code value (which, in the case of the received response 1418, will turn out to be the specific code value V*) and a legitimate identifier (which, in the case of the received response 1054, will turn out to be the identifier of communication device 1012, namely its identifier ID).

In this case, the processing entity 1018 begins a code extraction process. Specifically, the processing entity 1018 obtains the decryption key D by accessing a local database 1440. The database 1440 may contain only the decryption key D or it may contain multiple decryption keys associated with corresponding key indexes, in which case the processing entity 1018 can learn that decryption key D is to be used based on the key index I supplied in the received response 1418. In either case, it is recalled, the processing entity 1018 still does not know whether the received response 1418 is actually valid. Thus, when processing the received response 1418 using the decryption key D (i.e., when applying decryption to the aforementioned putative signature $S_X$), the processing entity 1018 derives the aforementioned putative identifier $ID_X$ and the aforementioned putative specific code value $V^*_X$.

The processing entity 1018 then carries out an assessment of validity of the received response 1418 based on the putative identifier $ID_X$ and the putative specific code value $V^*_X$. More specifically, as part of carrying out the assessment of validity of the received response 1418, the processing entity 1018 may be configured to consider that the received response 1418 is valid if it is determined that the putative specific code value $V^*_X$ either (i) corresponds to an "expected" code value associated with the putative identifier $ID_X$; or (ii) does not correspond to a "forbidden" code value associated with the putative identifier $ID_X$. Two non-limiting implementations of the former case are now described with reference FIGS. 15A and 15B, followed by a description of one non-limiting implementation of the latter.

Figure 15A:
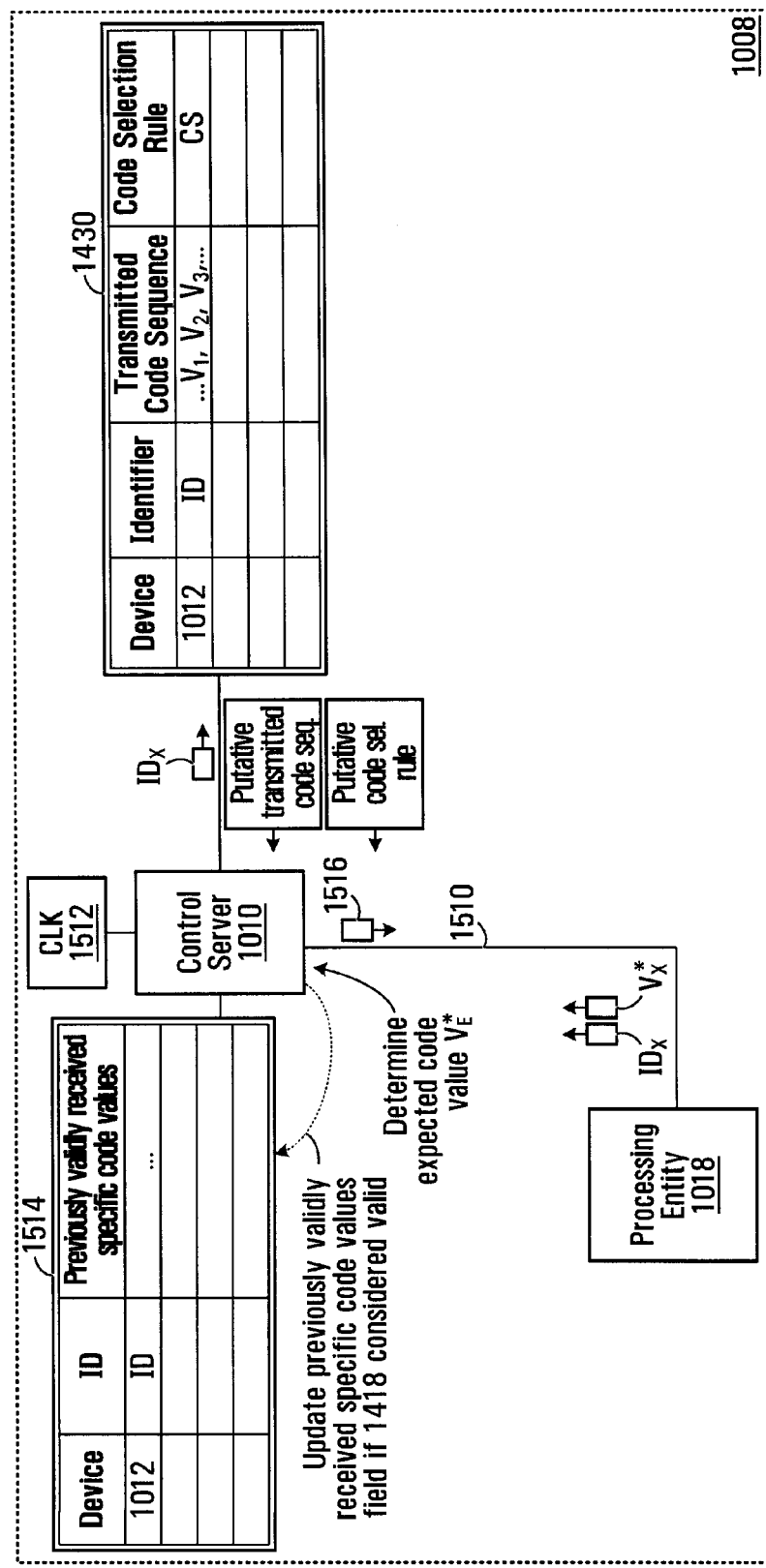
FIGS. 15A and 15B are combined block and message flow diagrams illustrating processing of the response received from the communication device, according to the first approach under the first operational scenario.

Specifically, while still in accordance with the first approach, two non-limiting implementations (namely, "Implementation (a)" and "Implementation (b)") are now presented for the case where the validity of the received response 1418 depends on whether the putative specific code value $V^*_X$ corresponds to an expected code value associated with the putative identifier $ID_X$:

Implementation (a): With reference to FIG. 15A, the processing entity 1018 submits the putative identifier $ID_X$ and putative specific code value $V^*_X$ to the control server 1010 over a communication path 1510 within the domain of responsibility 1008 of the transaction guarantor. Basing itself on the putative identifier $ID_X$, the control server 1010 consults the database 1430 and retrieves (i) the transmitted code sequence specific to the communication device associated with the putative identifier $ID_X$ and (ii) the code selection rule utilized by the communication device associated with the putative identifier $ID_X$. It is noted that still there is no assumption that the received response 1418 is valid and therefore the retrieved transmitted code sequence is merely a putative transmitted code sequence and the retrieved code selection rule is merely a putative code selection rule.

It is recalled that the code selection rule CS actually utilized by communication device 1012 may involve parameters, such as recently and earlier received code values, the number of times a particular code value has been used in a response, the current time, and so on. To allow for the possibility that the putative code selection rule corresponds to the code selection rule CS, the control server 1010 may require access to a clock 1512 and/or a database 1514 of (some or all) previously validly received specific code values, i.e., specific code values that were included in valid responses from the communication device associated with the putative identifier $ID_X$. The putative code selection rule is applied using the putative transmitted code sequence, thus emulating the process that was performed by the originator of the received response 1418—if indeed the received response 1418 is valid.

The output of having applied the putative code selection rule in the aforementioned manner is an expected code value $V^*_E$, which is then compared to the putative specific code value $V^*_X$ by the control server 1010. If there is a match between the expected code value $V^*_E$ and the putative specific code value $V^*_X$, the received response 1418 can be considered valid (i.e., $ID_X$ equals ID, $V^*_X$ equals V*). Accordingly, the database 1514 is updated to reflect the valid receipt of the putative specific code value $V^*_X$ (or, equivalently, the specific code value V*) from communication device 1012.

Otherwise, the received response 1418 can be considered invalid, which can be due to the use of an incorrect identifier (i.e., $ID_X$ does not equal ID), use of an incorrect specific code value (i.e., $V^*_X$ does not equal V*) in signature generation, application of an incorrect code selection rule (i.e., the putative code selection rule does not match the code selection rule CS), or a combination of the above. The validity assessment result 1090 can then be returned to the processing entity 1018 over communication path 1510 in the form of a message 1516.

Figure 15B:
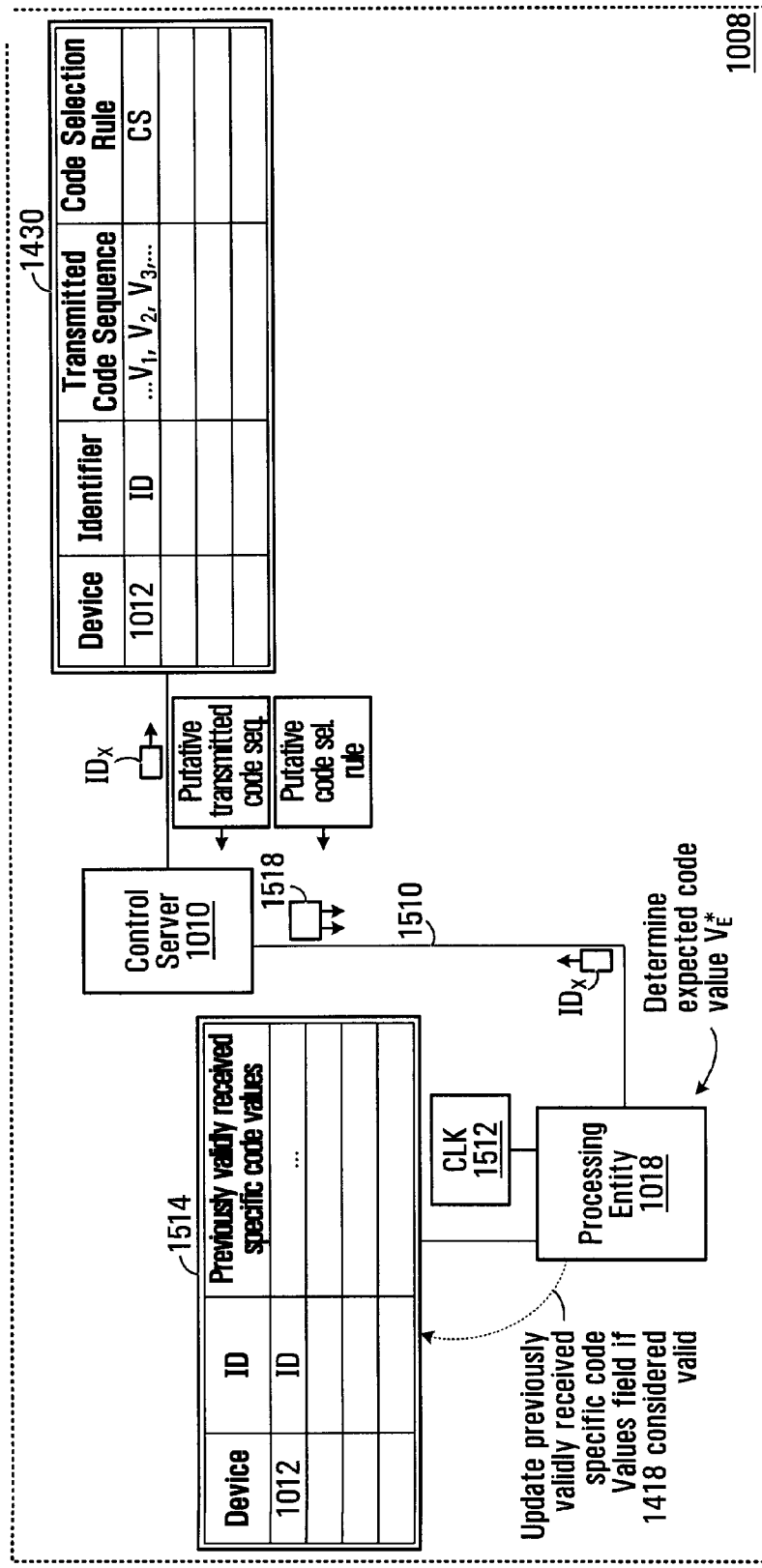

Implementation (b): With reference to FIG. 15B, the processing entity 1018 submits the putative identifier $ID_X$ to the control server 1010 over the aforementioned communication path 1510 within the domain of responsibility 1008 of the transaction guarantor. In response, the control server 1010 consults the database 1430 and retrieves (i) the transmitted code sequence specific to the communication device associated with the putative identifier $ID_X$ and (ii) the code selection rule utilized by the communication device associated with the putative identifier $ID_X$. It is noted that still there is no assumption that the received response 1418 is valid and therefore the retrieved transmitted code sequence is merely a putative transmitted code sequence and the retrieved code selection rule is merely a putative code selection rule. The putative transmitted code sequence and the putative code selection rule are returned to the processing entity 1018 in a message 1518.

It is recalled that the code selection rule CS actually utilized by communication device 1012 may involve parameters, such as recently and earlier received code values, the number of times a particular code value has been used in a response, the current time, and so on. To allow for the possibility that the putative code selection rule corresponds to the code selection rule CS, the processing entity 1018 may require access to the aforementioned clock 1512 and/or the aforementioned database 1514 of (some or all) previously validly received specific code values. The putative code selection rule is applied by the processing entity 1018 using the putative transmitted code sequence, thus emulating the process that was performed by the originator of the received response 1418—if indeed the received response 1418 is valid.

The output of having applied the putative code selection rule in the aforementioned manner is an expected code value $V^*_E$, which is then compared to the putative specific code value $V^*_X$. If there is a match between the expected code value $V^*_E$ and the putative specific code value $V^*_X$, the received response 1418 can be considered valid (i.e., $ID_X$ equals ID, $V^*_X$ equals $V^*$). Accordingly, the database 1514 is updated to reflect the valid receipt of the putative specific code value $V^*_X$ (or, equivalently, the specific code value $V^*$) from communication device 1012.

Otherwise, the received response 1418 can be considered invalid, which, again, can be due to the use of an incorrect identifier (i.e., $ID_X$ does not equal ID), use of an incorrect specific code value (i.e., $V^*_X$ does not equal $V^*$) in signature generation, application of an incorrect code selection rule (i.e., the putative code selection rule does not match the code selection rule CS), or a combination of the above.

The following now describes a possible implementation for the case where the validity of the received response 1418 depends on whether the putative specific code value $V^*_X$ does not correspond to a "forbidden" code value associated with the putative identifier $ID_X$. Specifically, the present implementation relies on the assumption that once a code value appears in the transmitted code sequence, it will not re-appear in the transmitted code sequence until a considerable amount of time has elapsed, for example, after expiry of an industry-accepted time limit for reporting a fraudulent transaction although other metrics are within the scope of the present invention. Thus, for all practical purposes, in this implementation, the code values $V_1, V_2, V_3, \ldots$, are unique to within a subject time interval of considerable duration (e.g., 1 hour, 1 day, 1 month, etc.).

Accordingly, the processing entity 1018 accesses the aforementioned database 1514 and compares the putative specific code value $V^*_X$ to the previously received (i.e., "stale") code values associated with the putative identifier $ID_X$. If there is no match between the putative specific code value $V^*_X$ and any of the "stale" code values associated with the putative identifier $ID_X$, the received response 1418 can be considered valid (i.e., $ID_X$ equals ID, $V^*_X$ equals $V^*$). Accordingly, the database 1540 is updated to reflect the valid receipt of the putative specific code value $V^*_X$ (or, equivalently, the specific code value $V^*$) from communication device 1012.

Otherwise, the received response 1418 can be considered invalid, which, again, can be due to the use of an incorrect identifier (i.e., $ID_X$ does not equal ID), use of an incorrect specific code value (i.e., $V^*_X$ does not equal $V^*$) in signature generation, application of an incorrect code selection rule (i.e., the putative code selection rule does not match the code selection rule CS), or a combination of the above.

It is to be noted that in the aforementioned implementation, the control server 1010 does not participate in the validation process, which can have efficiency gains in some circumstances. However, the implementation could also be modified so as to allow the control server 1010 to perform the validation process. Such a configuration may be advantageous in some cases, such as where plural processing entities (akin to the processing entity 1018) communicate with the control server 1010. In particular, the control server 1010 could maintain a centralized knowledge base (akin to the database 1514) of all specific code values that have been validly received by all system-side receivers (akin to system-side receiver 1088) within a given domain.

Figure 22:
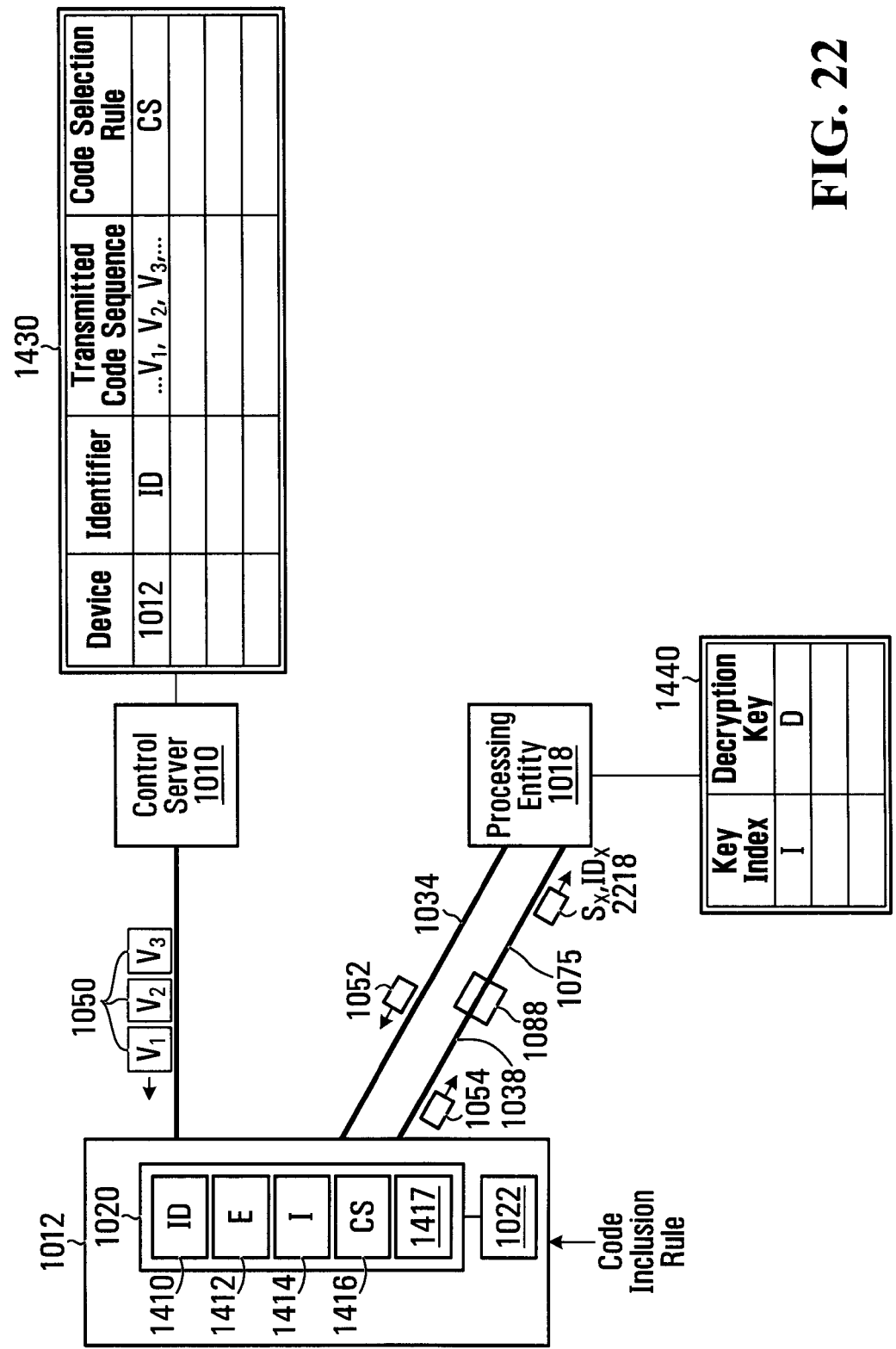
FIG. 22 is a combined block and message flow diagram illustrating generation of a response to a request, according to a second approach under the first operational scenario.

According to the second approach, the processing entity 1018 does not perform a code extraction step. Specifically, reference is made to FIG. 22, which shows the memory 1020 of communication device 1012 as including the aforementioned identifier memory element 1410, which stores the identifier of communication device 1012, namely the identifier ID. Thus, when the processing unit 1022 formulates the particular response 1054, it is assumed to include not only the signature S, but also the identifier ID.

Continuing with the description of the second approach, the particular response 1054 is received as a received response 2218 carrying the aforementioned putative signature $S_X$ and the aforementioned putative identifier $ID_X$. The processing entity 1018 then carries out an assessment of the validity of the received response 2218 based on the putative signature $S_X$ and the putative identifier $ID_X$. More specifically, the processing entity 1018 may be configured to consider that the received response 2218 is valid if it is determined that the putative signature $S_X$ either (i) corresponds to an "expected" signature associated with the putative identifier $ID_X$; or (ii) does not correspond to a "forbidden" signature associated with the putative identifier $ID_X$. Two non-limiting implementations of the former are now described with reference FIGS. 23A and 23B, followed by a description of one non-limiting implementation of the latter.

Accordingly, two non-limiting implementations (namely, "Implementation (a)" and "Implementation (b)") are now presented for the case where the validity of the received response 2218 depends on whether the putative signature $S_X$ corresponds to an expected signature associated with the putative identifier $ID_X$.

Figure 23A:
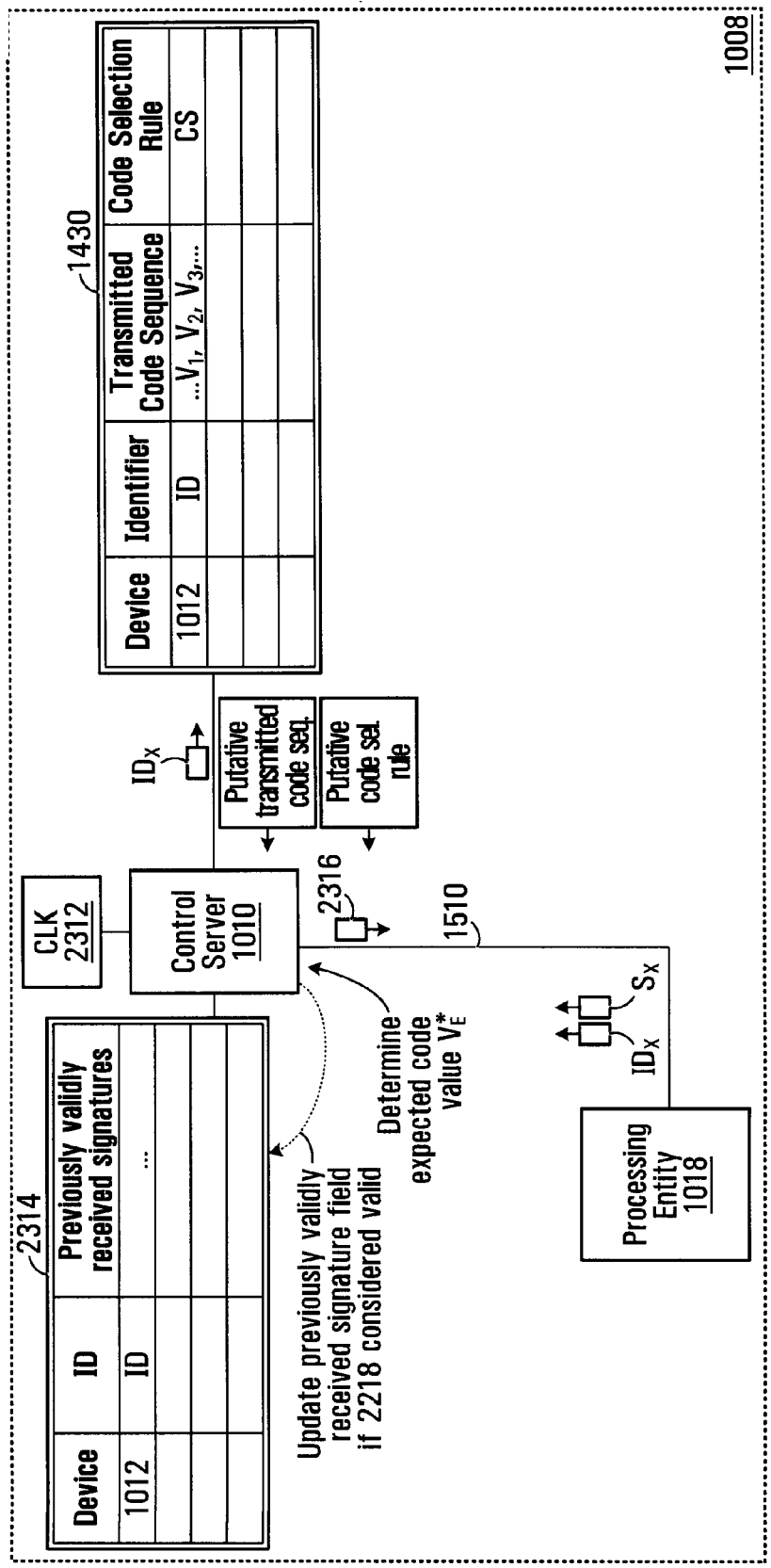
FIGS. 23A and 23B are combined block and message flow diagrams illustrating processing of the response received from the communication device, according to the second approach under the first operational scenario.

Implementation (a): With reference to FIG. 23A, the processing entity 1018 submits the putative signature $S_X$ and the putative identifier $ID_X$ to the control server 1010 over the communication path 1510 within the domain of responsibility 1008 of the transaction guarantor. Basing itself on the putative identifier $ID_X$, the control server 1010 consults the database 1430 and retrieves (i) the transmitted code sequence specific to the communication device associated with the putative identifier $ID_X$ and (ii) the code selection rule utilized by the communication device associated with the putative identifier $ID_X$. It is noted that still there is no assumption that the received response 2218 is valid and therefore the retrieved transmitted code sequence is merely a putative transmitted code sequence and the retrieved code selection rule is merely a putative code selection rule.

It is recalled that the code selection rule CS actually utilized by communication device 1012 may involve parameters, such as recently and earlier received code values, the number of times a particular code value has been used in a response, the current time, and so on. To allow for the possibility that the putative code selection rule corresponds to the code selection rule CS, the control server 1010 may require access to a clock 2312 and/or a database 2314 of (some or all) previously validly received signatures, i.e., signatures that were included in valid responses from the communication device associated with the putative identifier $ID_X$. The putative code selection rule is applied using the putative transmitted code sequence, thus emulating the process that was performed by the originator of the received response 2218—if indeed the received response 2218 is valid.

The output of having applied the putative code selection rule in the aforementioned manner is an expected code value $V^*_E$. Assuming now that the control server 1010 has knowledge of the code inclusion rule $CI_1$, the control server 1010 encrypts the expected code value $V^*_E$ together with the putative identifier $ID_X$ using the encryption key E. It should be noted that the encryption key E is assumed to be known to the control server 1010. The result of this encryption, which can be symbolized as $[V^*_E, ID_X]_E$, is referred to as an "expected signature" and is denoted $S_E$.

The expected signature $S_E$ is then compared to the putative signature $S_X$. If there is a match, the received response 2218 can be considered valid (i.e., $ID_X$ equals ID, $S_X$ equals S). Accordingly, the database 2314 is updated to reflect the valid receipt of the putative signature $S_X$ (or, equivalently, the specific signature S) from communication device 1012.

Otherwise, the received response 2218 can be considered invalid, which can be due to the use of an incorrect identifier (i.e., $ID_X$ does not equal ID), an incorrect signature (i.e., $S_X$ does not equal S), an incorrect code inclusion rule (i.e., the putative code selection rule does not match the code selection rule CS), or a combination of the above. The validity assessment result 1090 can be returned to the processing entity 1018 over the aforesaid communication path 1510 in the form of a message 2316.

Figure 23B:
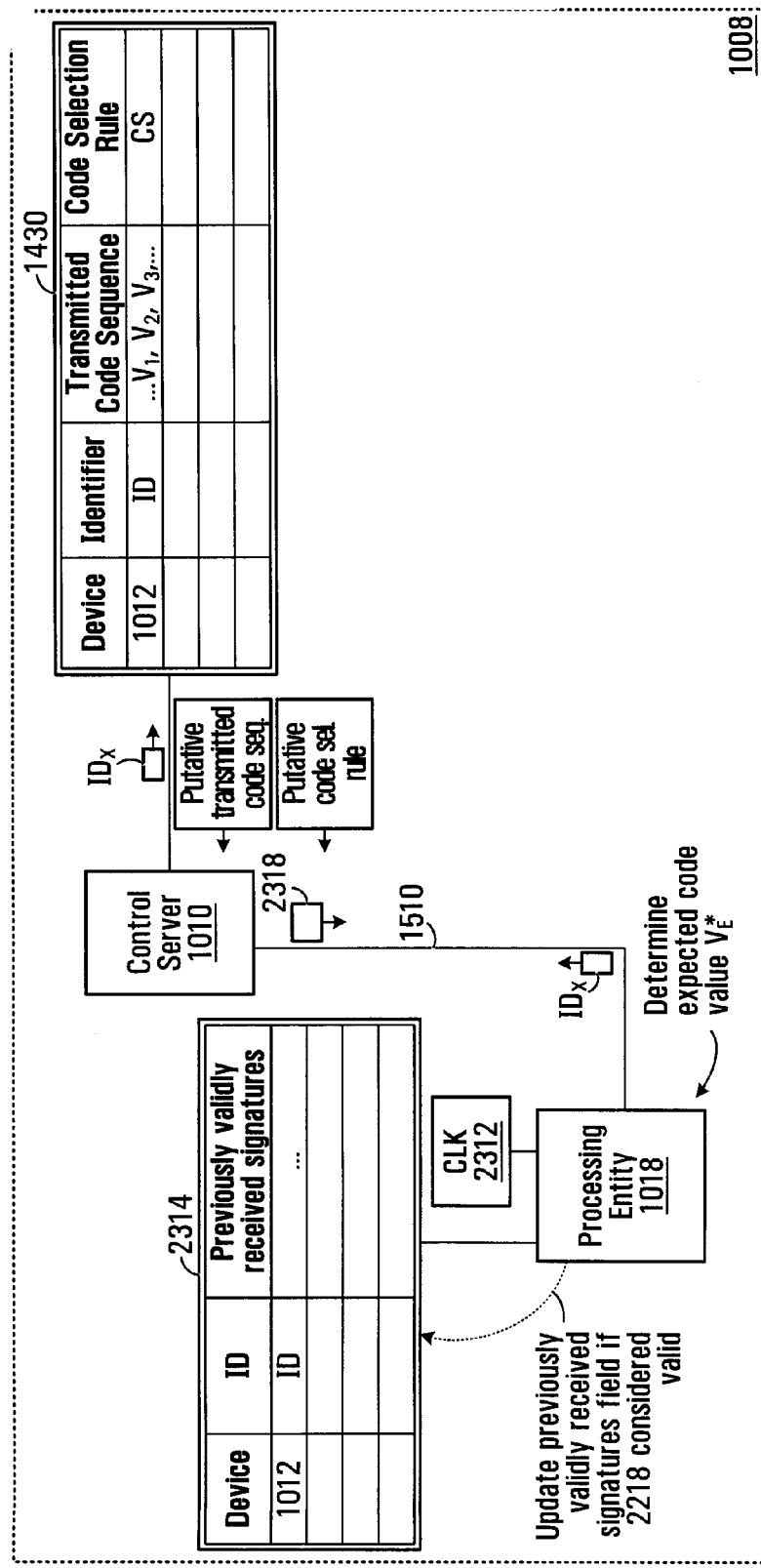

Implementation (b): With reference to FIG. 23B, the processing entity 1018 submits the putative identifier $ID_X$ to the control server 1010 over the aforementioned communication path 1510 within the domain of responsibility 1008 of the transaction guarantor. Basing itself on the putative identifier $ID_X$, the control server 1010 consults the database 1430 and retrieves (i) the transmitted code sequence specific to the communication device associated with the putative identifier $ID_X$ and (ii) the code selection rule utilized by the communication device associated with the putative identifier $ID_X$. It is noted that still there is no assumption that the received response 2218 is valid and therefore the retrieved transmitted code sequence is merely a putative transmitted code sequence and the retrieved code selection rule is merely a putative code selection rule. The transmitted code sequence and the putative code selection rule are returned to the processing entity 1018 in a message 2318.

It is recalled that the code selection rule CS actually utilized by communication device 1012 may involve parameters, such as recently and earlier received code values, the number of times a particular code value has been used in a response, the current time, and so on. To allow for the possibility that the putative code selection rule corresponds to the code selection rule CS, the processing entity 1018 may require access to the aforesaid clock 2312 and/or the aforesaid database 2314 of (some or all) previously validly received signatures, i.e., signatures that were included in valid responses from the communication device associated with the putative identifier $ID_X$. The putative code selection rule is applied using the putative transmitted code sequence, thus emulating the process that was performed by the originator of the received response 2218—if indeed the received response 2218 is valid.

The output of having applied the putative code selection rule in the aforementioned manner is an expected code value $V^*_E$. Assuming now that the processing entity has knowledge of the code inclusion rule $CI_1$ the processing entity 1018 encrypts the expected code value $V^*_E$ together with the putative identifier $ID_X$ using the encryption key E. It should be noted that the encryption key E is assumed to be known to the control server 1010. The result of this encryption, which can be symbolized as $[V^*_E, ID_X]_E$, is referred to as an "expected signature" and is denoted $S_E$.

The expected signature $S_E$ is then compared to the putative signature $S_X$. If there is a match, the received response 2218 can be considered valid (i.e., $ID_X$ equals ID, $S_X$ equals S). Accordingly, the database 2314 is updated to reflect the valid receipt of the putative signature $S_X$ (or, equivalently, the specific signature S) from communication device 1012.

Otherwise, the received response 2218 can be considered invalid, which can be due to the use of an incorrect identifier (i.e., $ID_X$ does not equal ID), an incorrect signature (i.e., $S_X$ does not equal S), an incorrect code inclusion rule (i.e., the putative code selection rule does not match the code selection rule CS), or a combination of the above.

The following now describes a possible implementation for the case where the validity of the received response 2218 depends on whether the putative signature $S_X$ does not correspond to a "forbidden" signature associated with the putative identifier $ID_X$. Specifically, the present implementation relies on the assumption that once a code value appears in the transmitted code sequence, it will not re-appear in the transmitted code sequence until a considerable amount of time has elapsed, for example, after expiry of an industry-accepted time limit for reporting a fraudulent transaction although other metrics are within the scope of the present invention. Thus, for all practical purposes, in this implementation, the code values $V_1, V_2, V_3, \ldots$, (and therefore their corresponding signatures) are unique to within a subject time interval of considerable duration (e.g., 1 hour, 1 day, 1 month, etc.).

Accordingly, the processing entity 1018 accesses the aforementioned database 2314 and compares the putative signature $S_X$ to the previously validly received (i.e., "stale") signatures associated with the putative identifier $ID_X$. If there is no match between the putative signature $S_X$ and any of the "stale" signatures associated with the putative identifier $ID_X$, the received response 2218 can be considered valid (i.e., $ID_X$ equals ID, $S_X$ equals S). Accordingly, the database 2314 is updated to reflect the valid receipt of the putative signature $S_X$ (or, equivalently, the specific signature S*) from communication device 1012.

Otherwise, the received response 2218 can be considered invalid which, again, can be due to the use of an incorrect identifier (i.e., $ID_X$ does not equal ID), use of an incorrect specific code value (i.e., $V^*_X$ does not equal V*) in signature generation, application of an incorrect code selection rule (i.e., the putative code selection rule does not match the code selection rule CS), or a combination of the above.

It is to be noted that in the aforementioned implementation, the control server 1010 does not participate in the validation process, which can have efficiency gains in some circumstances. However, the implementation could be modified so as to allow the control server 1010 to perform the validation process. Such a configuration may be advantageous in some cases, such as where plural processing entities (akin to the processing entity 1018) communicate with the control server 1010. In particular, the control server 1010 could maintain a centralized knowledge base (akin to the database 2314) of all signatures that have been validly received by all system-side receivers (akin to system-side receiver 1088) within a given domain.

Therefore, in accordance with the first operational scenario (and in either the first or the second approach described above), it should be appreciated that communication devices that are not attentive to the receipt of the particular data sets 1050 from the control server 1010 and/or do not implement the correct code selection rule for that device and/or do not implement the correct code inclusion rule will be unable to generate a valid response to the particular request 1052 from system-side transmitter 1088. Thus, the potential for fraud is greatly reduced, while transactions can be carried out with relative ease, simply using a communication device, such as a mobile phone or a laptop computer, without requiring the purchaser to present a traditional payment instrument such as a credit or debit card.

Figure 17:
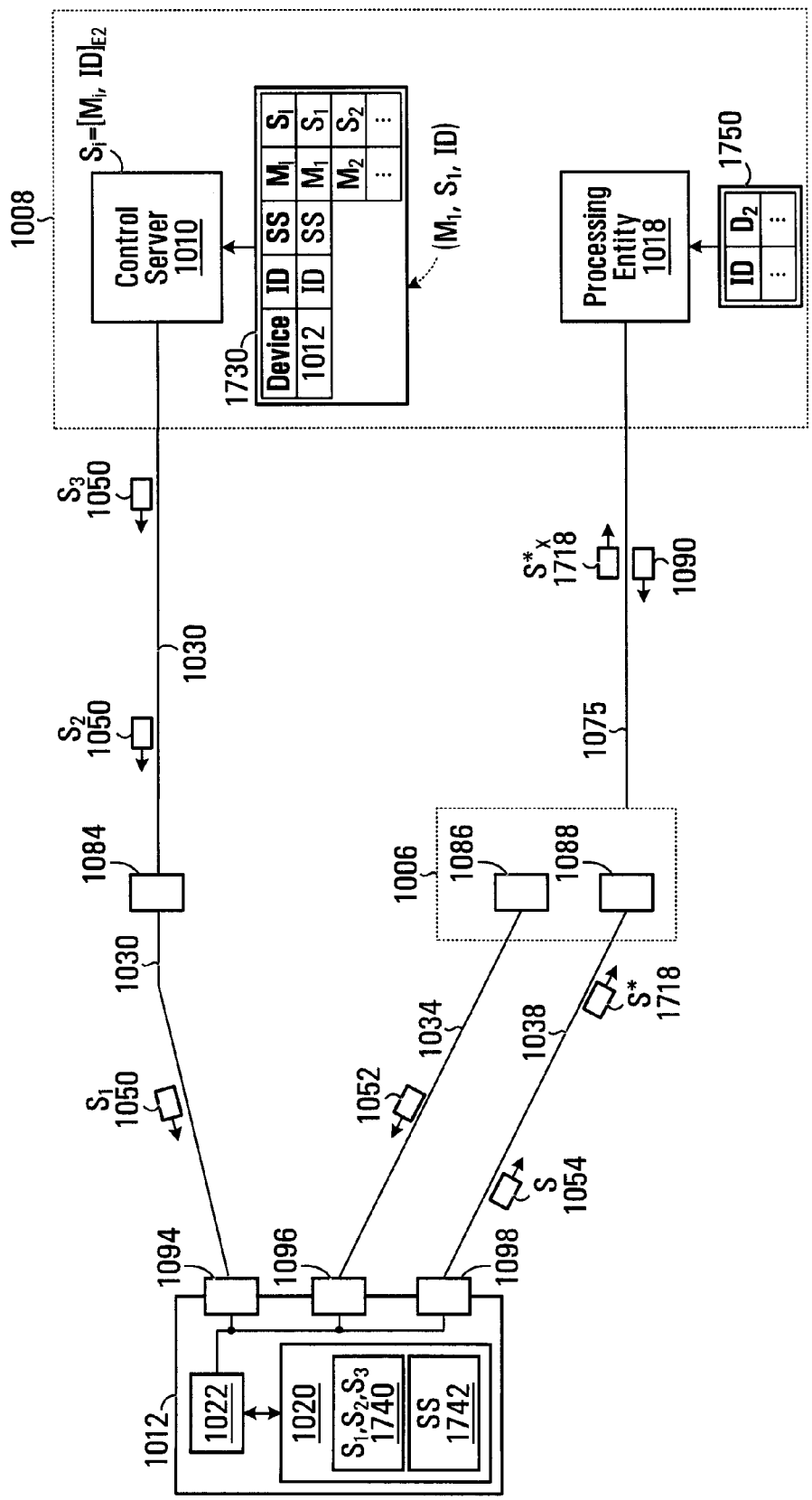
FIG. 17 is a combined block and message flow diagram illustrating generation of a response to a request, according to a first approach under a non-limiting second operational scenario where in order to formulate the response, the communication device relays a signature based on other signatures contained in data sets received from the control server.

A second operational scenario is now described with reference to FIG. 17. In accordance with the second operational scenario, each of the particular data sets 1050 includes a corresponding signature. The signatures, denoted $S_1$, $S_2$, $S_3, \ldots$, change from one data set to the next because they are generated from respective master code values $M_1$, $M_2$, $M_3, \ldots$, that are selected by the control server 1010. In particular, the control server 1010 includes a given master code value $M_i$ in a corresponding signature $S_i$ in accordance with a "code inclusion rule" associated with the second operational scenario, denoted $CI_2$.

In accordance with the second operational scenario being described here, the code inclusion rule $CI_2$ consists of encrypting the given master code value $M_i$ together with the identifier ID using an encryption key denoted E2. The identifier ID serves to uniquely identify communication device 1012 from among a wider set of communication devices. For example, the identifier ID could be a Media Access Control (MAC) address, Internet Protocol (IP) address, manufacturer serial number or Electronic Serial Number (ESN), to name a few non-limiting possibilities. The encryption key E2 can be any suitable encryption key that is associated a complementary decryption key D2. It is also acceptable, in this second operational scenario, for the encryption scheme to be symmetric, whereby the encryption key E2 is the same as the decryption key D2. Encryption of the given master code value $M_i$ together with the identifier ID using the encryption key E2 produces a given signature $S_i$, which is symbolized as $S_i = [M_i, ID]_{E2}$.

The various signatures $S_1, S_2, S_3, \ldots$, are formulated into the particular data sets 1050 that are transmitted to communication device 1012 over the first communication path 1030 (which may, but need not, include a wireless portion). It should be appreciated that multiple particular data sets 1050 can be sent together, so as to inform communication device 1012 of several signatures at once.

In accordance with the second operational scenario being described here, a database 1730 is provided, to which the control server 1010 has access. The database 1730 stores information for each communication device. For example, in the case of communication device 1012, the database 1730 stores: the identifier ID, the sequence of master code values $M_1, M_2, M_3, \ldots$, and/or the sequence of signatures $S_1, S_2, S_3, \ldots$.

At communication device 1012, the particular data sets 1050 are received from the control server 1010 over the first communication path 1030. The processing unit 1022 derives signatures $S_1, S_2, S_3, \ldots$, from the particular data sets 1050 and stores them in the memory 1020 (e.g., in a "signatures" memory element 1740). The signatures memory element 1740 may also store one, several or all signatures received prior to the receipt of signatures $S_1, S_2, S_3, \ldots$. The processing unit 1022 then applies the aforementioned signature selection rule SS in order to select a specific signature, denoted S*, for inclusion in the particular response 1054 to the particular request 1052 received from system-side transmitter 1086 over the upstream local communication path 1034. The signature selection rule SS, which is associated with communication device 1012, can be stored in a signature rule memory element 1742 of the memory 1020. The signature selection rule SS is also known to the control server 1010; for example, it can be stored in the database 1730 accessible to the control server 1010.

Application of the signature selection rule SS by the processing unit 1022 may involve parameters, such as the signatures in the signatures memory element 1740 (including signatures $S_1, S_2, S_3, \ldots$), as well as possibly other factors that are discussed below. In some embodiments, selection of the specific signature S* can be triggered by receipt of the particular request 1052. In other embodiments, selection of the specific signature S* can be done in anticipation of receipt of the particular request 1052.

A non-exhaustive list of possible examples of the signature selection rule SS is now provided:

- Example (a): each received signature is used only once per response.
- Example (b): each received signature is included in exactly N consecutive responses, where N>1 and is pre-determined;
- Example (c): each received signature is included in all responses sent during a pre-determined time interval (e.g., go to the next code value every 5 minutes, use (or don't use) certain codes during specific hours during the day);
- Example (d): each received signature is included in all responses sent during a time interval that varies in a seemingly random fashion although the variations are in accordance with behavior of a random number generator with a pre-determined seed and pre-determined tap values (e.g., switch to the next signature after the number of seconds indicated by the subsequent output of a random number generator defined by polynomial X and having a seed Y).

Still other possibilities exist and are contemplated as being within the scope of the present invention. The processing unit 1022 is presumed to implement or have access to the necessary counters, clocks, random number generators and/or other functional entities needed to execute the signature selection rule SS.

Having selected the specific signature S* using the pre-determined signature selection rule SS known to the control server 1010, the processing unit 1022 then includes the specific signature S* in the particular response 1054. The particular response 1054 is sent via device-side transmitter 1098 over the downstream local communication path 1038. Thereafter, the specific signature S* that was included in the particular response 1054 may, depending on the signature selection rule SS, be deleted from the signatures memory element 1740 or may be kept stored in the memory 1020.

Although the particular response 1054 is assumed to include a valid signature S* in this example, this truth is not known to an entity in receipt of the particular response 1054. Thus, with continued reference to FIG. 17, the particular response 1054 received by system-side receiver 1088 is hereinafter referred to as a "received response" and given a different reference number 1718. The received response 1718 includes a putative specific signature denoted $S^*_X$, which serves to illustrate that the validity of the received response, and more particularly the putative specific signature $S^*_X$, is not known a priori by its recipient.

System-side receiver 1088 forwards the received response 1718 via communication path 1075 to the processing entity 1018 which, it is recalled, is in the domain of responsibility 1008 of the transaction guarantor. The processing entity 1018 then carries out an assessment of validity of the received response 1718. This can be done according to at least two approaches. The first approach involves a code extraction step to derive from the received response 1718 what is thought to be an identifier (hereinafter the "putative identifier", denoted $ID_X$) and what is thought to be a master code value (hereinafter the "putative master code value", denoted $M_X$), followed by processing the putative identifier $ID_X$ and the putative master code value $M_X$. The second approach involves directly processing the putative specific signature $S^*_X$, without a code extraction step. Both approaches are discussed below.

According to the first approach, the processing entity 1018 attempts a code extraction process, which is effectively the reverse of the code inclusion rule $CI_2$. Therefore, the code inclusion rule $CI_2$ must be known to the processing entity

1018. In this case, if a given received response is valid, the processing entity 1018 knows that the given received response will include a signature which, when submitted to decryption using a given decryption key, reveals a legitimate master code value and a legitimate identifier.

Accordingly, the processing entity 1018 obtains the decryption key D2 by accessing a local database 1750. It is recalled that the decryption key D2 is complementary to the encryption key E2 used in the formulation of valid responses. It is known to entities in the domain of responsibility 1008 of the transaction guarantor, such as the control server 1010 and the processing entity 1018. However, the processing entity 1018 does not know whether the received response 1718 is actually valid. Thus, when processing the putative specific signature $S^*_X$ in the received response 1718 using the decryption key D2, the processing entity 1018 is merely able to derive the aforementioned putative identifier $ID_X$ and the aforementioned putative master code value $M_X$.

The processing entity 1018 then carries out an assessment of the validity of the received response 1718 based on the putative identifier $ID_X$ and the putative master code value $M_X$. More specifically, as part of carrying out the assessment of the validity of the received response 1718, the processing entity 1018 may be configured to consider that the received response 1718 is valid if it is determined that the putative master code value $M_X$ either (i) corresponds to an "expected" master code value associated with the putative identifier $ID_X$; or (ii) does not correspond to a "forbidden" master code value associated with the putative identifier $ID_X$. Two non-limiting implementations of the former are now described with reference FIGS. 18A and 18B, followed by a description of one non-limiting implementation of the latter.

Figure 18A:
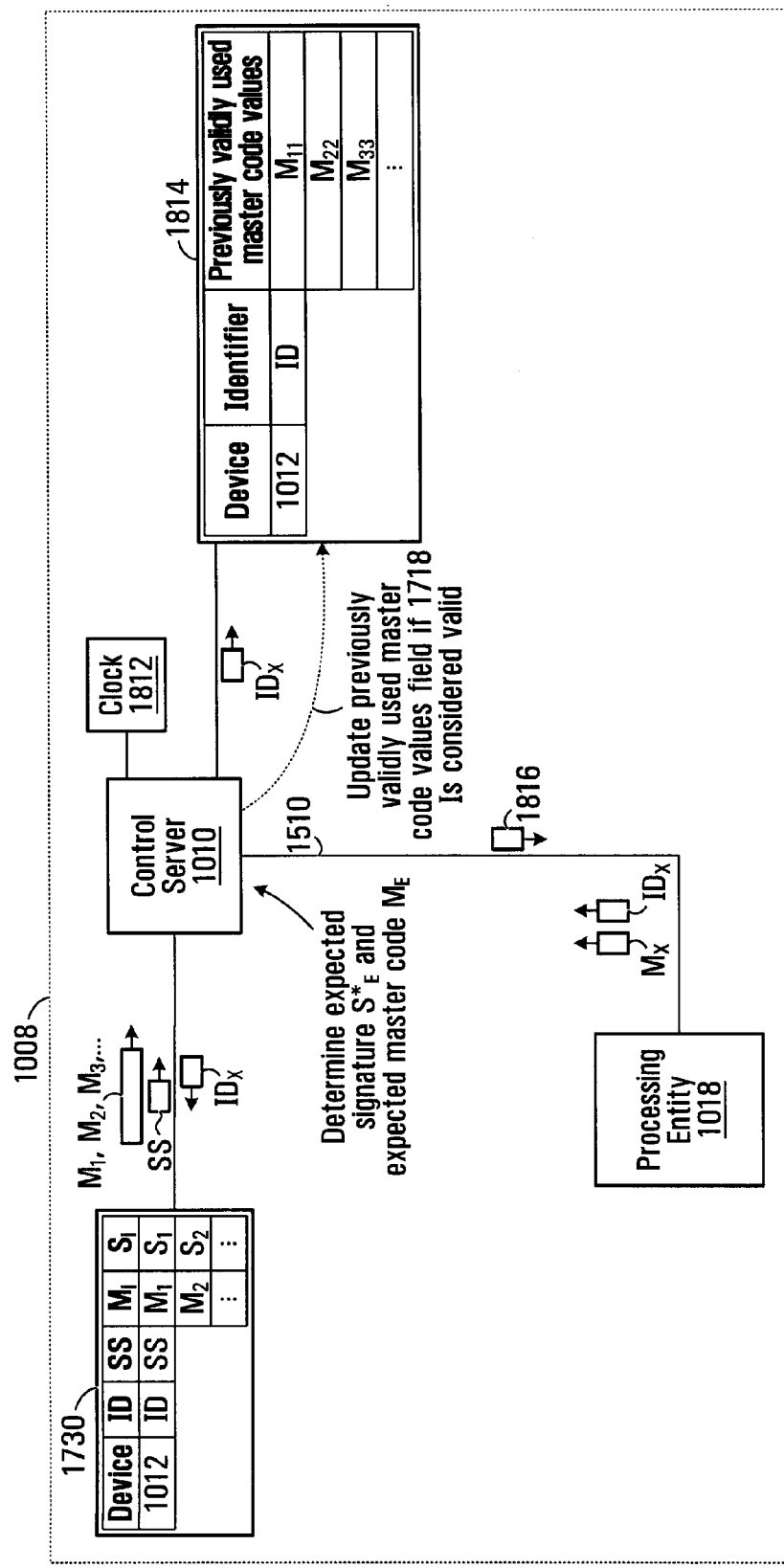
FIGS. 18A and 18B are combined block and message flow diagrams illustrating processing of the response received from the communication device, according to the first approach under the second operational scenario.

Specifically, while still in accordance with the first approach, two non-limiting implementations (namely, "Implementation (a)" and "Implementation (b)") are now presented for the case where the validity of the received response 1718 depends on whether the putative master code value $M_X$ corresponds to an expected master code value associated with the putative identifier $ID_X$:

Implementation (a): With reference to FIG. 18A, the processing entity 1018 submits the putative identifier $ID_X$ and putative master code value $M_X$ to the control server 1010 over the aforesaid communication path 1510 within the domain of responsibility 1008 of the transaction guarantor. Basing itself on the putative identifier $ID_X$, the control server 1010 consults the database 1730 and retrieves (i) sequence of master code values specific to the communication device associated with the putative identifier $ID_X$ and (ii) the signature selection rule utilized by the communication device associated with the putative identifier $ID_X$. It is noted that still there is no assumption that the received response 1718 is valid and therefore the retrieved sequence of master code values is merely a putative sequence of master code values and the retrieved signature selection rule is merely a putative signature selection rule.

It is recalled that the signature selection rule SS actually utilized by communication device 1012 may involve parameters, such as recently and earlier received signatures, the number of times a particular signature has been used in a response, the current time, and so on. To allow for the possibility that the putative signature selection rule corresponds to the signature selection rule SS, the control server 1010 may require access to a clock 1812 and/or a database 1814 of (some or all) previously validly used master code values, i.e., master code values used in the creation of valid signatures that were relayed by communication device associated with the putative identifier $ID_X$. The putative signature selection rule is applied by the control server 1010 using signatures generated by encryption of individual master code values in the putative sequence of master code values together with the putative identifier $ID_X$ using the encryption key E2, thus emulating the selection process that was performed by the originator of the received response 1718—if indeed the received response 1718 is valid.

The output of having applied the putative signature selection rule in the aforementioned manner is an expected signature $S^*_E$, from which an expected master code value $M_E$ is derived by applying the aforementioned code extraction process (i.e., the reverse of the code inclusion rule $CI_2$). The expected master code value $M_E$ is then compared to the putative master code value $M_X$. If there is a match between the expected master code value $M_E$ and the putative master code value $M_X$, the received response 1718 can be considered valid (i.e., $ID_X$ equals ID, $S^*_X$ equals $S^*$). Accordingly, the database 1814 is updated to reflect the use of the putative master code value $M_X$ in the creation of a valid signature relayed by communication device 1012.

Otherwise, the received response 1718 can be considered invalid, which can be due to the use of an incorrect identifier (i.e., $ID_X$ does not equal ID), relaying of an incorrect specific signature (i.e., $S^*_X$ does not equal $S^*$), application of an incorrect signature selection rule (i.e., the putative signature selection rule does not match the signature selection rule SS), or a combination of the above. The validity assessment result 1090 can then be returned to the processing entity 1018 over a communication path 1710 in the form of a message 1816.

Figure 18B:
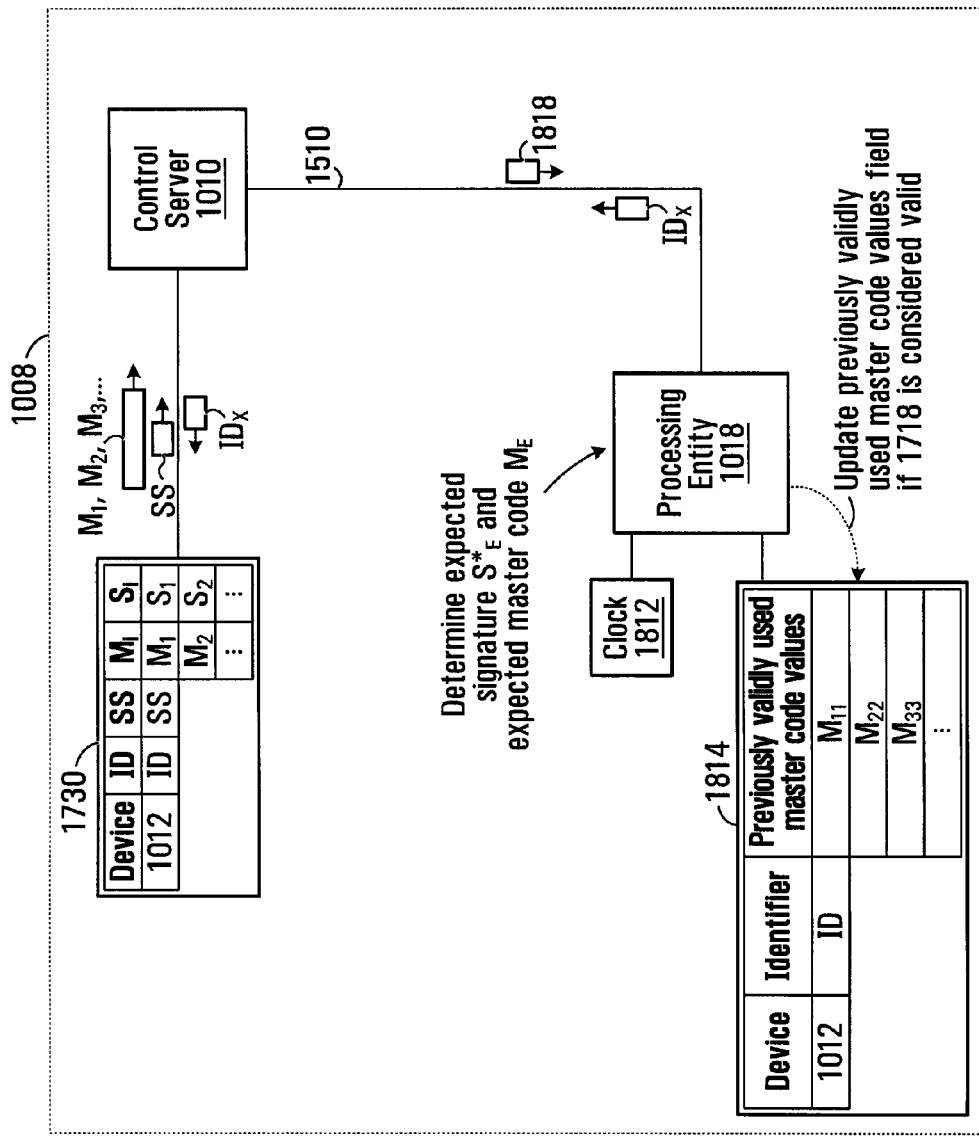

Implementation (b): With reference to FIG. 18B, the processing entity 1018 submits the putative identifier $ID_X$ to the control server 1010 over the aforementioned communication path 1510 within the domain of responsibility 1008 of the transaction guarantor. In response, the control server 1010 consults the database 1730 and retrieves (i) sequence of master code values specific to the communication device associated with the putative identifier $ID_X$ and (ii) the signature selection rule utilized by the communication device associated with the putative identifier $ID_X$. It is noted that still there is no assumption that the received response 1718 is valid and therefore the retrieved sequence of master code values is merely a putative sequence of master code values and the retrieved signature selection rule is merely a putative signature selection rule. The putative sequence of master code values and the putative signature selection rule are returned to the processing entity 1018 in a message 1818 via the communication path 1510.

It is recalled that the signature selection rule SS actually utilized by communication device 1012 may involve parameters, such as recently and earlier received signatures, the number of times a particular signature has been used in a response, the current time, and so on. To allow for the possibility that the putative signature selection rule corresponds to the signature selection rule SS, the processing entity 1018 may require access to the aforesaid clock 1812 and/or the aforesaid database 1814 of (some or all) previously validly used master code values. The putative signature selection rule is applied by the processing entity 1018 using signatures generated by the encryption of individual master code values in the putative sequence of master code values together with the putative identifier $ID_X$ using the encryption key E2, thus emulating the selection process that was performed by the originator of the received response 1718—if indeed the received response 1718 is valid.

The output of having applied the putative signature selection rule in the aforementioned manner is an expected signature $S^*_E$, from which an expected master code value $M_E$ is derived by applying the aforementioned code extraction process (i.e., the reverse of the code inclusion rule $CI_2$). The expected master code value $M_E$ is then compared to the putative master code value $M_X$. If there is a match between the expected master code value $M_E$ and the putative master code value $M_X$, the received response 1718 can be considered valid (i.e., $ID_X$ equals ID, $S^*_X$ equals $S^*$). Accordingly, the database 1814 is updated to reflect the valid use of the putative master code value $M_X$ in the creation of a valid signature relayed by communication device 1012.

Otherwise, the received response 1718 can be considered invalid which, again, can be due to the use of an incorrect identifier (i.e., $ID_X$ does not equal ID), relaying of an incorrect specific signature (i.e., $S^*_X$ does not equal $S^*$), application of an incorrect signature selection rule (i.e., the putative signature selection rule does not match the signature selection rule SS), or a combination of the above.

The following now describes a possible implementation for the case where the validity of the received response 1718 depends on whether the putative master code value $M_X$ does not correspond to a "forbidden" master code value associated with the putative identifier $ID_X$. Specifically, the present implementation relies on the assumption that once a master code value from the sequence of master code values has been used to generate a signature, it will not be re-used to generate a signature until a considerable amount of time has elapsed, for example, after expiry of an industry-accepted time limit for reporting a fraudulent transaction although other time limits are within the scope of the present invention. Thus, for all practical purposes, in this implementation, the master code values $M_1, M_2, M_3, \ldots$, are unique to within a subject time interval of considerable duration (e.g., 1 hour, 1 day, 1 month, etc.).

Accordingly, the processing entity 1018 accesses the aforementioned database 1814 and compares the putative master code value $M_X$ to the previously validly used (i.e., "stale") master code values associated with the putative identifier $ID_X$. If there is no match between the putative master code value $M_X$ and any of the "stale" master code values associated with the putative identifier $ID_X$, the received response 1718 can be considered valid (i.e., $ID_X$ equals ID, $S^*_X$ equals $S^*$). Accordingly, the database 1814 is updated to reflect the valid receipt of the putative master code value $M_X$ in the creation of a valid signature relayed by communication device 1012.

Otherwise, the received response 1718 can be considered invalid which, again, can be due to the use of an incorrect identifier (i.e., $ID_X$ does not equal ID), relaying of an incorrect specific signature (i.e., $S^*_X$ does not equal $S^*$), application of an incorrect signature selection rule (i.e., the putative signature selection rule does not match the signature selection rule SS), or a combination of the above.

It is to be noted that in the aforementioned implementation, the control server 1010 does not participate in the validation process, which can have efficiency gains in some circumstances. However, the implementation could be modified so as to allow the control server 1010 to perform the validation process. Such a configuration may be advantageous in some cases, such as where plural processing entities (akin to the processing entity 1018) communicate with the control server 1010. In particular, the control server 1010 could maintain a centralized knowledge base (akin to the database 1814) of all specific code values that have been validly received by all system-side receivers (akin to system-side receiver 1088) within a given domain.

Figure 19:
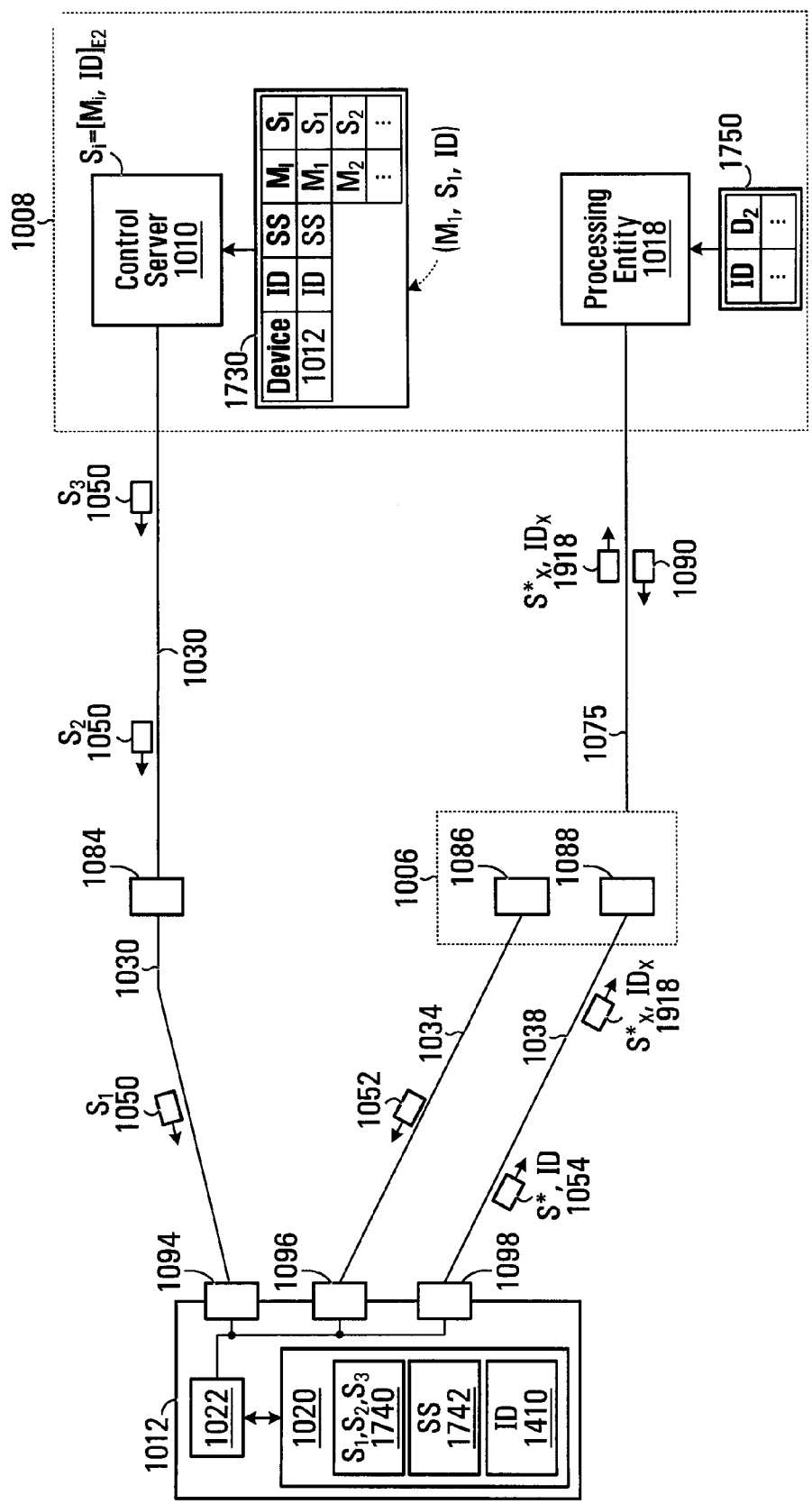
FIG. 19 is a combined block and message flow diagram illustrating generation of a response to a request, according to a second approach under the second operational scenario.

According to the second approach, the processing entity 1018 does not perform a code extraction step. Specifically, reference is made to FIG. 19, which is similar to FIG. 17, except for the fact that the memory 1020 of communication device 1012 is explicitly shown as including the aforementioned identifier memory element 1410. The identifier memory element 1410 stores the identifier of communication device 1012, namely the identifier ID. Thus, when the processing unit 1022 formulates the particular response 1054, it is assumed to include not only the specific signature $S^*$, but also the identifier ID.

Continuing with the description the second approach, the particular response 1054 is received as a received response 1918 carrying the aforementioned putative specific signature $S^*_X$ and a putative identifier $ID_X$. The processing entity 1018 then carries out an assessment of the validity of the received response 1918 based on the putative specific signature $S^*_X$ and the putative identifier $ID_X$. More specifically, the processing entity 1018 may be configured to consider that the received response 1918 is valid if it is determined that the putative specific signature $S^*_X$ either (i) corresponds to an "expected" signature associated with the putative identifier $ID_X$; or (ii) does not correspond to a "forbidden" signature associated with the putative identifier $ID_X$. Two non-limiting implementations of the former are now described with reference FIGS. 20A and 20B, followed by a description of one non-limiting implementation of the latter.

Accordingly, two non-limiting implementations (namely, "Implementation (a)" and "Implementation (b)") are now presented for the case where the validity of the received response 1918 depends on whether the putative specific signature $S^*_X$ corresponds to an expected signature associated with the putative identifier $ID_X$.

Figure 20A:
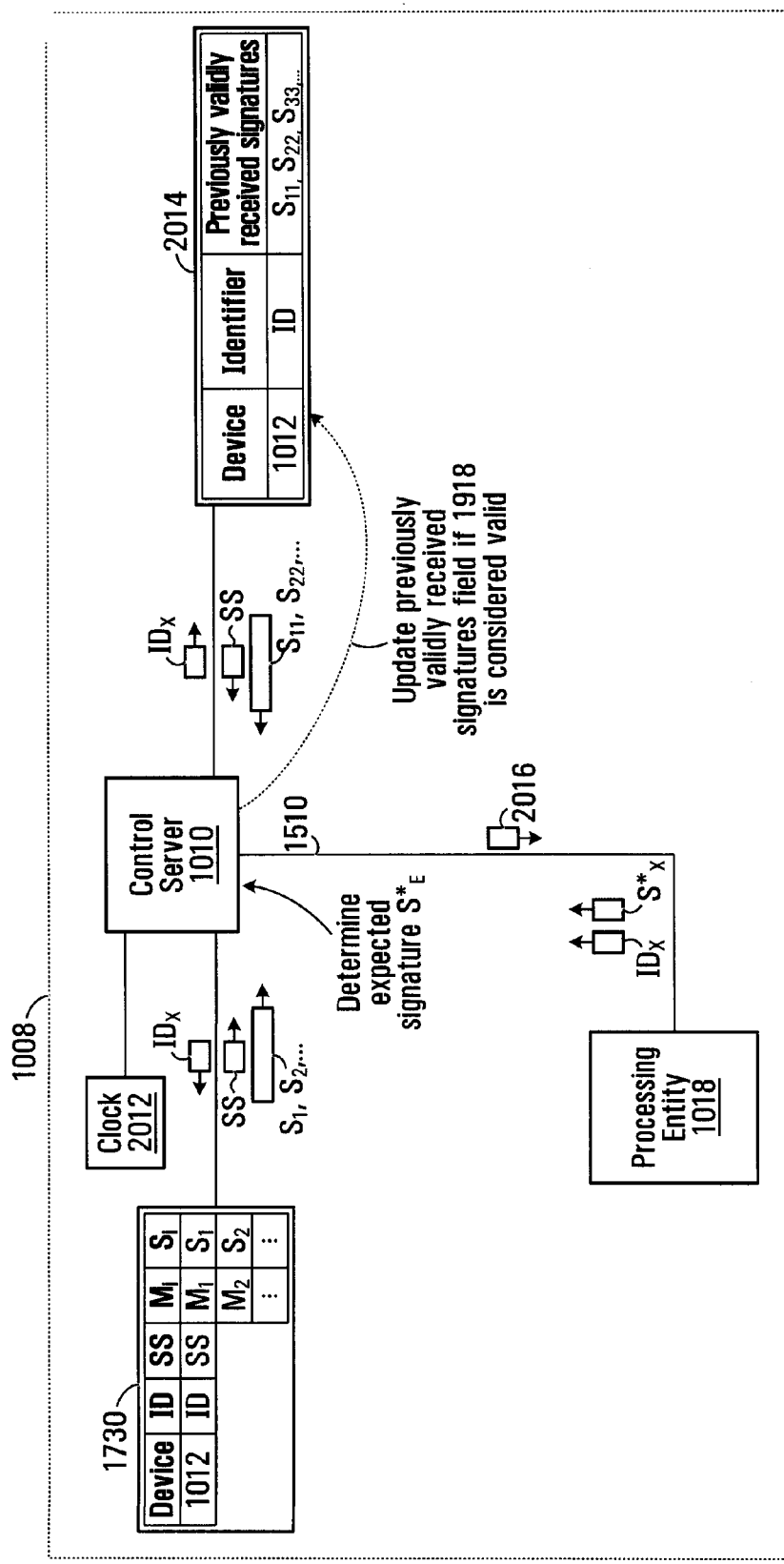
FIGS. 20A and 20B are combined block and message flow diagrams illustrating processing of the response received from the communication device, according to the second approach under the second operational scenario.

Implementation (a): With reference to FIG. 20A, the processing entity 1018 submits the putative specific signature $S^*_X$ and the putative identifier $ID_X$ to the control server 1010 over the communication path 1510 within the domain of responsibility 1008 of the transaction guarantor. Basing itself on the putative identifier $ID_X$, the control server 1010 consults the database 1730 and retrieves (i) the sequence of signatures specific to the communication device associated with the putative identifier $ID_X$ and (ii) the signature selection rule utilized by the communication device associated with the putative identifier $ID_X$. It is noted that still there is no assumption that the received response 1918 is valid and therefore the retrieved sequence of signatures is merely a putative sequence of signatures and the retrieved signature selection rule is merely a putative signature selection rule.

It is recalled that the signature selection rule SS actually utilized by communication device 1012 may involve parameters, such as recently and earlier received signatures, the number of times a particular signature has been used in a response, the current time, and so on. To allow for the possibility that the putative signature selection rule corresponds to the signature selection rule SS, the control server 1010 may require access to a clock 2012 and/or a database 2014 of (some or all) previously validly received signatures (i.e., signatures that were included in valid responses from the communication device associated with the putative identifier $ID_X$). The putative signature selection rule is applied by the control server 1010 using the signatures in the putative sequence of signatures, thus emulating the selection process that was performed by the originator of the received response 1918—if indeed the received response 1918 is valid.

The output of having applied the putative signature selection rule in the aforementioned manner is an expected signature $S^*_E$. The expected signature $S^*_E$ is then compared to the putative specific signature $S^*_X$. If there is a match, the received response 1918 can be considered valid (i.e., $ID_X$ equals ID, $S^*_X$ equals $S^*$). Accordingly, the database 2014 is updated to reflect the valid receipt of the putative specific signature $S^*_X$ (or, equivalently, the specific signature $S^*$) from communication device 1012.

Otherwise, the received response 1918 can be considered invalid, which can be due to the use of an incorrect identifier (i.e., $ID_X$ does not equal ID), an incorrect specific signature (i.e., $S^*_X$ does not equal $S^*$), an incorrect signature selection rule (i.e., the putative signature selection rule does not match the signature selection rule SS), or a combination of the above. The validity assessment result 1090 can be returned to the processing entity 1018 over the aforesaid communication path 1510 in the form of a message 2016.

Figure 20B:
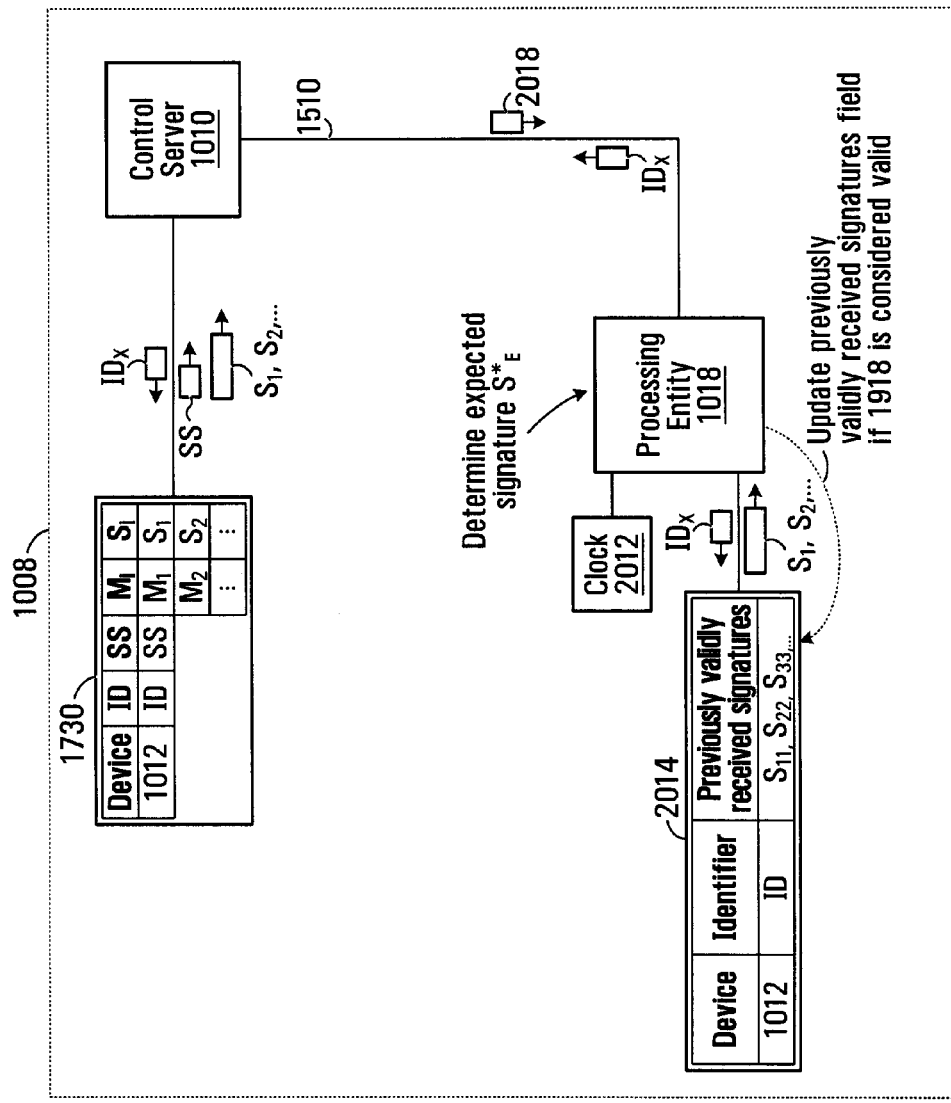

Implementation (b): With reference to FIG. 20B, the processing entity 1018 submits the putative identifier $ID_X$ to the control server 1010 over the aforementioned communication path 1510 within the domain of responsibility 1008 of the transaction guarantor. In response, the control server 1010 consults the database 1730 and retrieves (i) the sequence of signatures specific to the communication device associated with the putative identifier $ID_X$ and (ii) the signature selection rule utilized by the communication device associated with the putative identifier $ID_X$. It is noted that still there is no assumption that the received response 1918 is valid and therefore the retrieved sequence of signatures is merely a putative sequence of signatures and the retrieved signature selection rule is merely a putative signature selection rule. The putative sequence of master code values and the putative code selection rule are returned to the processing entity 1018 in a message 2018.

It is recalled that the signature selection rule SS actually utilized by communication device 1012 may involve parameters, such as recently and earlier received signatures, the number of times a particular signature has been used in a response, the current time, and so on. To allow for the possibility that the putative signature selection rule corresponds to the signature selection rule SS, the processing entity 1018 may require access to the aforesaid clock 2012 and/or the aforesaid database 2014 of (some or all) previously validly received signatures. The putative signature selection rule is applied by the processing entity 1018 using the signatures in the putative sequence of signatures, thus emulating the selection process that was performed by the originator of the received response 1918—if indeed the received response 1918 is valid.

The output of having applied the putative signature selection rule in the aforementioned manner is an expected signature $S^*_E$. The expected signature $S^*_E$ is then compared to the putative specific signature $S^*_X$. If there is a match, the received response 1918 can be considered valid (i.e., $ID_X$ equals ID, $S^*_X$ equals $S^*$). Accordingly, the database 2014 is updated to reflect the valid receipt of the putative specific signature $S^*_X$ (or, equivalently, the specific signature $S^*$) from communication device 1012.

Otherwise, the received response 1918 can be considered invalid, which can be due to the use of an incorrect identifier (i.e., $ID_X$ does not equal ID), an incorrect specific signature (i.e., $S^*_X$ does not equal $S^*$), an incorrect signature selection rule (i.e., the putative signature selection rule does not match the signature selection rule SS), or a combination of the above.

The following now describes a possible implementation for the case where the validity of the received response 1918 depends on whether the putative specific signature $S^*_X$ does not correspond to a "forbidden" signature associated with the putative identifier $ID_X$. Specifically, the present implementation relies on the assumption that once a master signature appears in the sequence of signatures, it will not be re-appear in the sequence of signatures until a considerable amount of time has elapsed, for example, after expiry of an industry-accepted time limit for reporting a fraudulent transaction although other time limits are within the scope of the present invention. Thus, for all practical purposes, in this implementation, the signatures $S_1, S_2, S_3, \ldots$, are unique to within a subject time interval of considerable duration (e.g., 1 hour, 1 day, 1 month, etc.).

Accordingly, the processing entity 1018 accesses the database 2040 and compares the putative specific signature $S^*_X$ to the previously validly received (i.e., "stale") signatures associated with the putative identifier $ID_X$. If there is no match between the putative specific signature $S^*_X$ and any of the "stale" signatures associated with the putative identifier $ID_X$, the received response 1918 can be considered valid (i.e., $ID_X$ equals ID, $S^*_X$ equals $S^*$). Accordingly, the database 2014 is updated to reflect the valid receipt of the putative specific signature $S^*_X$ (or, equivalently, the specific signature $S^*$) from communication device 1012.

Otherwise, the received response 1918 can be considered invalid which, again, can be due to the use of an incorrect identifier (i.e., $ID_X$ does not equal ID), an incorrect specific signature (i.e., $S^*_X$ does not equal $S^*$), an incorrect signature selection rule (i.e., the putative signature selection rule does not match the signature selection rule SS), or a combination of the above.

It is to be noted that in the aforementioned implementation, the control server 1010 does not participate in the validation process, which can have efficiency gains in some circumstances. However, the implementation could be modified so as to allow the control server 1010 to perform the validation process. Such a configuration may be advantageous in some cases, such as where plural processing entities (akin to the processing entity 1018) communicate with the control server 1010. In particular, the control server 1010 could maintain a centralized knowledge base (akin to the database 2014) of all signatures that have been validly received by all system-side receivers (akin to system-side receiver 1088) within a given domain.

Those skilled in the art should appreciate that enhanced security can be achieved by adding a layer of encryption between communication device 1012 and system-side receiver 1088. Thus, for example, prior to issuing the particular response 1054, the processing unit 1022 can encrypt the specific signature $S^*$ with a device private key E3, which is complementary to a device public key D3 that is known or accessible to the processing entity 1018. The device private key E3 may be used only by communication device 1012 or it may be used by multiple members (communication devices) of a group. Thus, decryption using the device public key D3 is one of the steps applied by the processing entity 1018 when processing the received response 1718, 1918. Where multiple communication devices using different respective device private keys can potentially communicate with the processing entity 1018, it is envisaged that eventual decryption can be facilitated without detracting from security by employing key indexes that are uniquely associated in a known way with each private/public key pair.

The key index for keys E3 and D3, denoted I3, can be stored in the aforesaid key index memory element 1414 of the memory 1020. As far as the processing entity 1018 is concerned, it obtains the device public key D3 by accessing the aforesaid local database 1440. The database 1440 may contain multiple device public keys associated with corresponding key indexes, in which case the processing entity 1018 can learn that device public key D3 is to be used based on the key index I3 supplied in the received response 1718, 1918. By employing the above additional layer of encryption, one avoids the situation where the data sent to communication device 1012 (in the particular data sets 1050) is the same as the data sent from communication device 1012 (in the particular response 1054).

Therefore, in accordance with the second operational scenario (and in either the first or the second approach described above), it should be appreciated that communication devices that are not attentive to the receipt of the particular data sets 1050 from the control server 1010 and/or do not implement the correct signature selection rule and/or do not implement the correct code inclusion rule will be unable to generate a valid response to the particular request 1052 from system-side transmitter 1088. Thus, the potential for fraud is greatly reduced, while transactions can be carried out with relative ease, simply using a communication device, such as a mobile phone or a laptop computer, without requiring the purchaser to present a traditional payment instrument such as a credit or debit card.

Those skilled in the art will appreciate that further enhanced security can be achieved by adding an additional layer of encryption between the control server 1010 and communication device 1012. Thus, for example, prior to issuing the particular data sets 1050, the control server 1010 can encrypt the corresponding code values (or signatures) with a server private key E4, which is complementary to a server public key D4 that is known or accessible to communication device 1012 and other communication devices that have the potential to receive data sets from the control server 1010. Thus, decryption using the server public key D4 is one of the steps applied by communication device 1012 when processing the data sets 1050 in order to derive the code values (or signatures) contained therein.

It should also be appreciated that while in some embodiments, the particular data sets 1050 can be transmitted to communication device 1012 in an autonomous fashion (and thus in advance of any requirement to generate a response to a request), in other embodiments, the particular data sets 1050 can be sent to communication device 1012 in a substantially on-demand, or quasi-real-time fashion.

Specifically, one possibility is that communication device 1012 receives the particular request 1052 and then issues its own request to the control server 1010. The second request is received by the control server 1010, which then sends one or more of the particular data sets 1050, and the remainder of the process continues as described above.

Figure 21A:
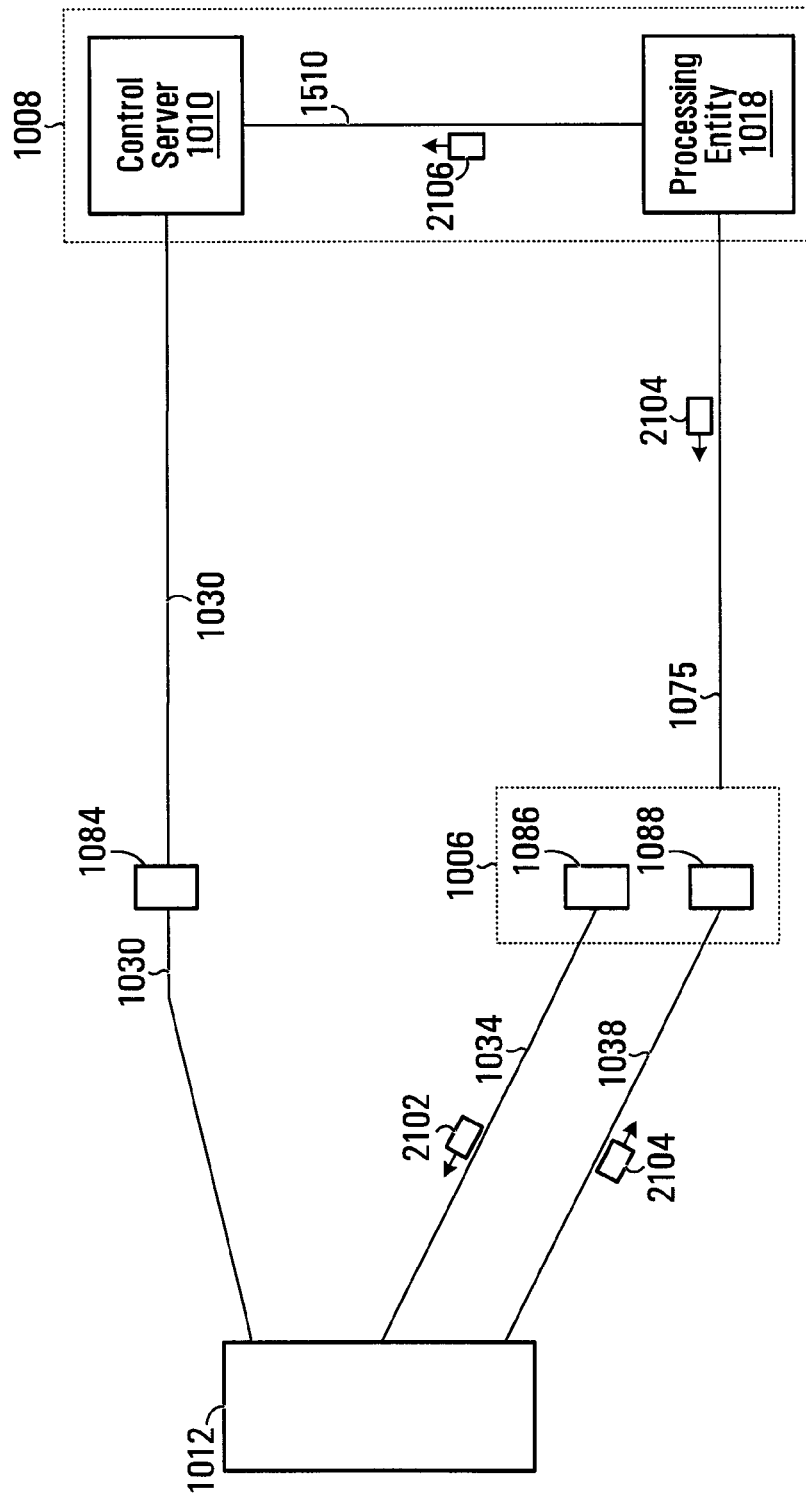
FIGS. 21A and 21B is a combined block and message flow diagram illustrating an identification stage during which the communication device is detected, followed by a validation stage during which a data set is transmitted by the control server to the communication device for use in formulating a response to a request.

Another possibility is that communication device 1012 is identified prior to issuance of the particular request 1052. In particular, as will now be described, an identification stage (see FIG. 21A) is followed by a validation stage (see FIG. 21B). With specific reference to FIG. 21A, system-side receiver 1088 detects the presence/proximity/actions of communication device 1012. For example, the processing entity 1018 may be configured to passively sniff data transmitted by nearby communication devices and captured via system-side receiver 1088. Other, potentially more active ways of determining the identity and/or intentions of communication 1012 device are within the scope of the present invention. For example, active pings 2102 could be issued at periodic intervals, and at some point in time (e.g., when communication device 1012 is sufficiently close), communication device 2102 responds to one such active ping with a response 2104 including preliminary information regarding communication device 1012. The response 2104 reaches the processing entity 1018 over aforementioned local communication path 1075.

This preliminary information regarding communication device 1012 may be in the form of the aforementioned putative identifier $ID_X$. The processing entity 1018 decodes the contents of the response 2104 (including, for example, the putative identifier $ID_X$) and sends it to the control server 1010 in the form of a message 2106 over the aforementioned communication path 1510.

Figure 21B:
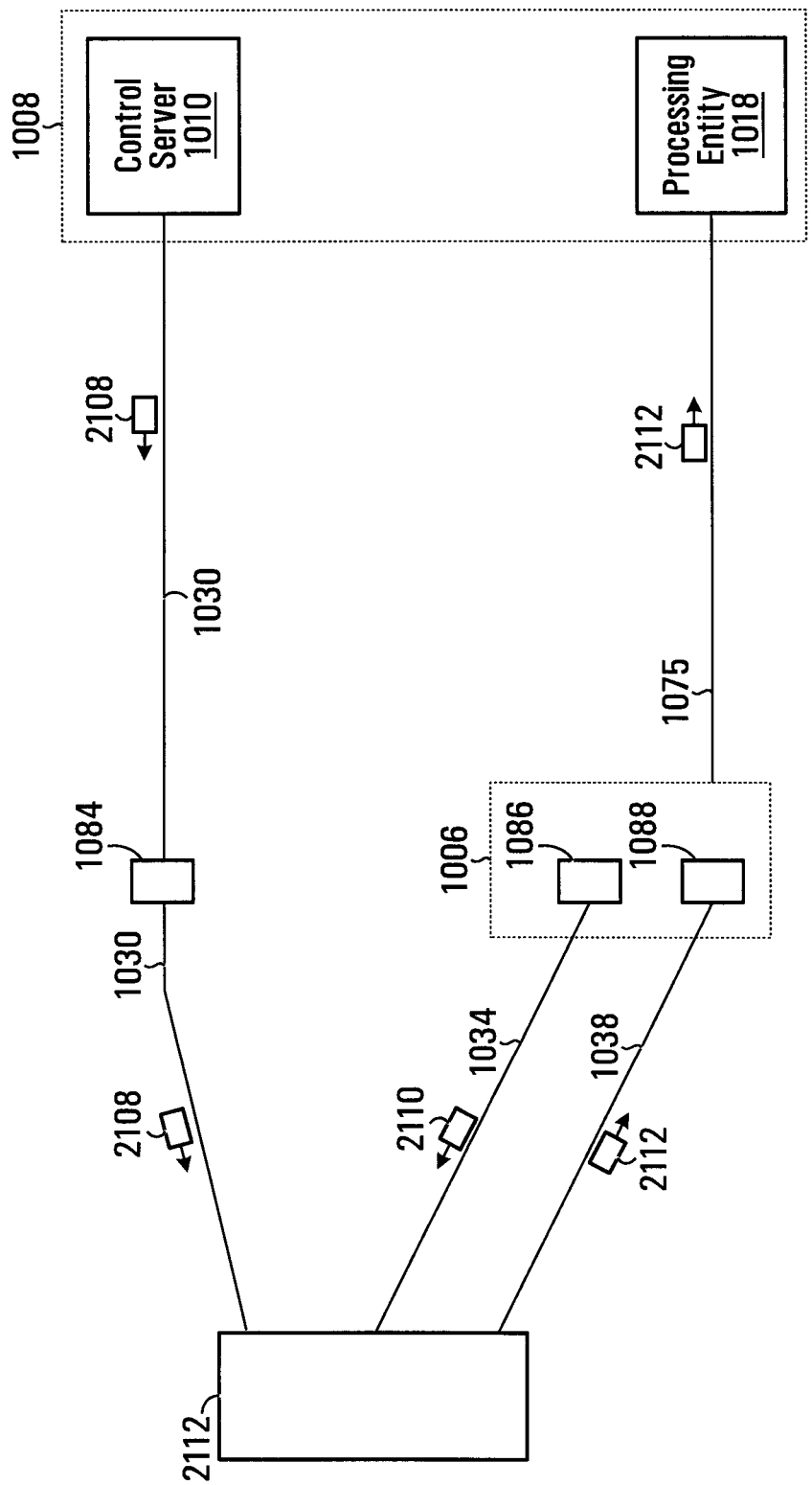

With reference now to FIG. 21B, which illustrates the validation stage, the control server 1010 receives the message 2106 from the processing entity 1018. The control server 1010 interprets the message 2016 as indicating detection of communication device 1012, which then triggers issuance of a targeted data set 2108. In one embodiment, the targeted data set 2108 is generated for the specific purpose of allowing the communication device 1012 to successfully complete a transaction attempt (e.g., a financial transaction). To this end, the targeted data set 2108 may include a particular code value (or signature, depending on the scenario) that is to be processed by a code selection rule (or signature selection rule, as applicable) implemented by the communication device 1012. The particular code value (or signature) can represent a "transaction identifier". The targeted data set 2108 is sent to communication device 1012 over the first communication path 1030, which may include a wireless portion as has been previously described.

Communication device 1012 receives the targeted data set 2108, derives the "transaction identifier" included therein, applies the appropriate code selection rule (or signature selection rule) and formulates a response 2112. It should be appreciated that the response 2112 can be formulated using one of the techniques described above. The response 2112 is sent along the downstream local communication path 1038 in response to a request 2110 received from system-side transmitter 1086 over the upstream local communication path 1034. The response 2112 is then received at the processing entity 1018, which then performs validation using one of the techniques described above.

It is thus appreciated that a certain amount of additional interaction is required among the processing entity 1018, the control server 1010 and communication device 1012 to implement the above two-stage (identification and validation) process. However, it should be understood that when the total loop time between issuance of response 2104 and issuance of response 2112 is kept as low as a few seconds (or less), the inconvenience to a customer in the process of attempting a transaction would be minimized. Moreover, there is a benefit of added security. Specifically, approval of a transaction is now under greater control of the transaction guarantor. Thus, issuance of the targeted data set 2108, which is required for successful transaction authorization, can be made dependent on where communication device 1012 was located when its presence/proximity/actions are detected, as well as other factors such as time of day, previous history, etc. For example, detecting that communication device 1012 at a Starbucks™ outlet as opposed to a Land Rover™ dealership could be determinative of whether the control server 1010 does or does not issue the targeted data set 2108.

Those skilled in the art will appreciate that in some embodiments, the functionality of any or all of the processing entity 610, the processing entity 810, the reader 12 and the readers 1012, the processing entity 1018 and the control server 1010 may be implemented using pre-programmed hardware or firmware elements (e.g., application specific integrated circuits (ASICs), electrically erasable programmable read-only memories (EEPROMs), etc.), or other related components. In other embodiments, the functionality of the entity in question may be achieved using a computing apparatus that has access to a code memory (not shown) which stores computer-readable program code for operation of the computing apparatus, in which case the computer-readable program code could be stored on a medium which is fixed, tangible and readable directly by the entity in question (e.g., removable diskette, CD-ROM, ROM, fixed disk, USB drive), or the computer-readable program code could be stored remotely but transmittable to the entity in question via a modem or other interface device (e.g., a communications adapter) connected to a network (including, without limitation, the Internet) over a transmission medium, which may be either a non-wireless medium (e.g., optical or analog communications lines) or a wireless medium (e.g., microwave, infrared or other transmission schemes) or a combination thereof.

It should also be appreciated that certain adaptations and modifications of the described embodiments can be made. Therefore, the above discussed embodiments are considered to be illustrative and not restrictive.

What is claimed is:

1. A method involving a communication device, comprising:
    detecting a physical proximity of the communication device over a near field communication path existing between the communication device and a local device;
    in response to the detecting, transmitting at least one data set to the communication device over a first communication path that traverses a packet-switched network;
    sending a request to the communication device over the near field communication path;
    receiving a response from the communication device over the near field communication path;
    deriving a received data set from said response;
    validating the response based on the received data set and the at least one previously transmitted data set previously transmitted to the communication device over the first communication path;
    the first communication path existing between a control server and the communication device, and a second communication path existing between the local device and a processing device.

2. The method defined in claim 1, wherein deriving the received data set from the response comprises decrypting the received data set and an identifier of the communication device using a decryption key.

3. The method defined in claim 2, further comprising identifying the decryption key.

4. The method defined in claim 3, wherein identifying the decryption key is based exclusively on information available prior to receipt of the response.

5. The method defined in claim 3, wherein the response comprises a key index, wherein identifying the decryption key comprises consulting a database of stored keys and associated stored indexes to identify as the decryption key a stored key associated with the key index.

6. The method defined in claim 1, further comprising determining from the at least one previously transmitted data set a particular data set expected to be included in the response if the response is valid, wherein validating the response comprises considering the response to be valid if the received data set matches the particular data set.

7. The method defined in claim 1, further comprising determining from the at least one previously transmitted data set at least one particular data set expected to be absent from the response if the response is valid, wherein validating the response comprises considering the response to be valid if the received data set does not match any of the at least one particular data set.

8. The method defined in claim 1, further comprising decrypting a putative identifier and a putative code value from the received data set using a decryption key.

9. The method defined in claim 8, wherein determining the at least one previously transmitted data set comprises determining a particular code value which, when encrypted together with the putative identifier using an encryption key complementary to the decryption key, yields a signature expected to be included in the response if the response is valid, wherein validating the response comprises considering the response to be valid if the putative code value matches the particular code value.

10. The method defined in claim 8, wherein determining the at least one previously transmitted data set comprises determining at least one particular code value which, when encrypted together with the putative identifier using an encryption key complementary to the decryption key, yields a corresponding signature expected to be absent from the response if the response is valid, wherein validating the response comprises considering the response to be valid if the putative code value does not match any of the at least one particular code value.

11. The method defined in claim 1, wherein said transmitting at least one data set to the communication device over the first communication path is carried out by the control server in response to receipt of a message indicating a detected physical proximity of the communication device.

12. The method defined in claim 1, wherein detecting the physical proximity of the communication device comprises obtaining knowledge of an identifier of the communication device.

13. The method defined in claim 12, wherein knowledge of the identifier of the communication device is obtained from a signal transmitted by the communication device over the near field communication path.

14. The method defined in claim 1, wherein the response is received during a transaction attempt carried out using the communication device.

15. The method defined in claim 14, wherein if the response is considered valid, the received data set is indicative of a transaction identifier generated by the control server in anticipation of the transaction attempt.

16. The method defined in claim 14, wherein if the response is considered valid, the received data set is indicative of a transaction identifier generated by the control server after being informed of the transaction attempt.

17. A non-transitory computer-readable storage medium comprising a set of instructions for execution by a processing device comprising a processor:
    where execution of the set of instructions by the processing device causes the processing device to execute a method comprising validating a response received from a communication device over a near field communication path existing between the communication device and a local device, the response having been sent over the near field communication path by the communication device in response to a request sent thereto over the near field communication path, the method further comprising:
    deriving a received data set from the response;
    determining at least one data set that had been previously transmitted to the communication device over a first communication path traversing a packet-switched network in response to detecting a physical proximity of the communication device over the near field communication path, the first communication path existing between a control server and the communication device; and validating the response based on the received data set and the at least one previously transmitted data set;

a second communication path existing between the local device and the processing device.

18. The non-transitory computer-readable storage medium defined in claim 17, wherein a downstream near field communication path exists between the communication device and a system-side receiver of the local device, and an upstream near field communication path exists between the communication device and a system-side transmitter of the local device.

19. A system, comprising:

a control server configured to generate at least one particular data set and transmit the at least one articular data set to a communication device over a first communication path that traverses a packet-switched network in response to detecting a physical proximity of the communication device over a near field communication path, the first communication path existing between the control server and the communication device;

a local device comprising transmit/receive equipment configured to send a request to the communication device over the near field communication path and to obtain a response from the communication device over the near field communication path, the near field communication path existing between the communication device and the local device; and a processing device comprising a processor communicatively coupled both to the local device over a second communication path and to the control server, the processing device configured to derive a received data set from the response and to validate the response based on the received data set and the at least one particular data set.

20. The system defined in claim 19, wherein the control server is configured to send the at least one particular data set in response to receipt of a message indicating detection of the communication device.

21. The system defined in claim 20, wherein the processing device is configured to generate said message in response to detection of the communication device.

22. The system defined in claim 21, wherein to detect the physical proximity of the communication device, the processing device is configured to obtain knowledge of an identifier of the communication device.

23. The system defined in claim 22, wherein knowledge of the identifier of the communication device is obtained from a signal transmitted by the communication device over the near field communication path.

24. The system defined in claim 19, wherein the processing device being configured to derive the received data set from the response comprises the processing device being configured to decrypt the received data set and an identifier of the communication device using a decryption key.

25. The system defined in claim 19, wherein the control server is further reconfigured to include each of the at least one particular data set within encrypted data transmitted to the communication device, the encrypted data being obtained by encrypting the at least one particular data set using an encryption key, wherein the at least one particular data set is capable of being decrypted from the encrypted data by a decryption key that is complementary to the encryption key.

26. The system defined in claim 25, wherein the encryption key is a private key known to the control server, and wherein the decryption key is a public key, knowledge of which is available to the communication device.

27. The system defined in claim 19, wherein the response is received during a transaction attempt carried out using the communication device.

28. The system defined in claim 19, wherein the processing device is further configured to authorize a transaction upon considering the response to be valid and to deny the transaction upon considering the response to be invalid.

29. The system defined in claim 28, wherein the transaction is a financial transaction.

* * * * *